(12) United States Patent
Maeda

(10) Patent No.: US 6,873,099 B2
(45) Date of Patent: Mar. 29, 2005

(54) EL DEVICE, EL DISPLAY, EL ILLUMINATION APPARATUS, LIQUID CRYSTAL APPARATUS USING THE EL ILLUMINATION APPARATUS AND ELECTRONIC APPARATUS

(75) Inventor: Tsuyoshi Maeda, Ryuo-cho (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 10/154,973

(22) Filed: May 28, 2002

(65) Prior Publication Data

US 2003/0071935 A1 Apr. 17, 2003

(30) Foreign Application Priority Data

May 31, 2001 (JP) ....................... 2001-164896
Jun. 1, 2001 (JP) ....................... 2001-167308

(51) Int. Cl.$^7$ ............... H01J 1/62; H01J 63/04
(52) U.S. Cl. ............ 313/504; 313/502; 313/506; 349/69; 349/96; 349/103
(58) Field of Search ................ 313/504, 500, 313/501, 502, 505, 506; 349/69, 96, 102, 103

(56) References Cited

U.S. PATENT DOCUMENTS 5,179,457 A * 1/1993 Hirataka et al. ............ 349/119
6,025,894 A * 2/2000 Shirasaki et al. ............. 349/69
6,249,082 B1 * 6/2001 Fukuyoshi et al. ......... 313/479
6,281,952 B1 * 8/2001 Okamoto et al. ............ 349/12
6,710,840 B2 * 3/2004 Umemoto et al. .......... 349/158

FOREIGN PATENT DOCUMENTS

| JP | A 6-151063 | 5/1994 |
|---|---|---|
| JP | A 8-83688 | 3/1996 |
| JP | A 10-233285 | 9/1998 |
| JP | A 11-283751 | 10/1999 |
| JP | A 11-329742 | 11/1999 |
| JP | A 2000-35506 | 2/2000 |
| JP | A 2000-66026 | 3/2000 |
| JP | A 2000-180607 | 6/2000 |
| JP | A 2000-323272 | 11/2000 |

* cited by examiner

*Primary Examiner*—Joseph Williams
*Assistant Examiner*—Kevin Quarterman
(74) *Attorney, Agent, or Firm*—Oliff & Berridge, PLC

(57) ABSTRACT

An electroluminescent (EL) display apparatus is constructed in such a way that a plurality of EL elements are disposed on one surface of an optically transparent substrate in a matrix so as to be isolated from each other and be powered individually, and at least one of a pair of electrodes is made of an optically transparent electrode, so that, when the EL elements are powered, light is emitted from the light emitting layers, wherein an optical device is provided on the other surface side of the substrate so that at least a portion of an incident light injected into the substrate and forming an angle to cause total reflection at the exit face is scattered and/or diffracted externally, and another portion of the incident light is weakly scattered and/or transmitted externally.

39 Claims, 18 Drawing Sheets

FRONT VIEW OF FILM (MEASURED FROM DIRECTION OF ARROW)

Related Art

EL DEVICE, EL DISPLAY, EL ILLUMINATION APPARATUS, LIQUID CRYSTAL APPARATUS USING THE EL ILLUMINATION APPARATUS AND ELECTRONIC APPARATUS

BACKGROUND OF THE INVENTION

1. Field of the Invention

The present invention relates in general to an electroluminescence (EL) device having an EL element, and relates in particular to an EL device, EL display apparatus, EL illumination apparatus having improved frontal brightness, and liquid crystal and electronic apparatuses based on these apparatuses. The present invention is based on Japanese Unexamined Patent Applications, First Publications, Numbers 2001-164896, and 2001-167308), the contents of which are incorporated herein by reference.

2. Description of the Related Art

One application of an electroluminescence (EL) device known in this field is in EL displays using EL elements.

In the following, an outline of a conventional EL display apparatus will be given with reference to the drawings.

In the following, the surface at which light exits, or at which light would exit if it did not encounter the face at an angle not less than the critical angle is called the "exit face".

FIG. 31 shows a schematic cross sectional view of a conventional display apparatus.

The conventional display apparatus is comprised primarily of a transparent substrate 801, and an EL element 812 provided on one of the surfaces of the transparent substrate 801.

EL element 812 comprises indium tin oxide (referred to as ITO below), etc., and includes successive layers deposited on the transparent substrate 801, starting with a transparent electrode 813 serving as an anode, followed by a bole transport layer 814 for facilitating injection of holes from the transparent electrode 813, a light emitting layer 815 comprising an EL material, and finally, a metal electrode 816 serving as a cathode, so that the transparent electrode 813 opposes the metal electrode 816 across the light emitting layer 815. An EL display apparatus having such an EL element 812 operates by flowing electrical current of a specific magnitude to the transparent electrode 813 and the metal electrode 816 to emit light from the light emitting layer 815 so that the light from the light emitting layer 815 is transmitted through the transparent electrode 813 and the transparent substrate 801 to emit light from the transparent substrate 801 side to the external environment of the EL element 812.

However, of the light emitted from the light emitting layer 815, the light passing through the transparent electrode 813 and forming a wide angle (an angle not less than the critical angle) when at the exit face of the transparent electrode 813, and also, the light passing through the transparent electrode 813 and passing through the transparent substrate 801 which forms a wide angle (an angle not less than the critical angle) when at the exit face of the transparent substrate 801, undergo repeated internal reflection in the transparent electrode 813 and the transparent substrate 801, respectively, and are not emitted externally from the transparent substrate 801. That is, the light which enters the transparent electrode 813 and transparent substrate 801 and forms a wide angle (not less than a critical angle) when at the exit face thereof is not utilized for display purposes, resulting in low brightness of displayed images.

It should be noted here that when a light from a medium having a refractive index n1 is incident at an angle θ1, and travels into a medium having a refractive index n2 at an angle of refraction θ2, the following relation (Snell's law) is established among the parameters θ1, θ2, n1 and n2:

$$n1 \sin θ1 = n2 \sin θ2.$$

The critical angle of light emitted from the light emitting layer and injected into the transparent substrate 801 is obtained by knowing that, for transparent substrate 801, n1=1.49 to 1.6 for glass plate or acrylic resin, which are normally used for this purpose, and that the refractive index of air is 1 so that n2=1, and incident light entering at the critical angle produces transmitted light parallel to the surface of the transparent substrate 801, so that the angle θ2 between the normal direction H and the transparent substrate 801 is 90 degrees, resulting in θ1 of about 40 degrees, and therefore, the critical angle of the light entered into the transparent substrate 801 at the exit face is about 40 degrees.

Therefore, in the conventional EL display apparatuses, this problem is solved as shown in FIG. 31 by forming a scattering layer 820 having isotropic scattering characteristics and a thickness of 50 to 200 μm, by the use of a substrate such as triallylcyanate and a filler of metallic oxide particles dispersed therein, at a surface opposite to the side of the transparent substrate 801 having the EL element 812, so that even when the light injected into the transparent substrate 801 (the light emitted from the light emitting layer 805 and injected into the transparent substrate 801) forms an angle not less than the critical angle at the exit face, it can be transmitted to the external environment of the transparent substrate 801.

However, a problem in the conventional EL display apparatus having such a scattering layer 820 described above is that, although it is possible to output the light L10 injected into the transparent substrate 801 forming an angle not less than the critical angle at the exit face by utilizing isotropic scattering effects (transmitted light L11 is scattered isotropically) to the external environment of the transparent substrate 801, as shown in FIG. 31, isotropic scattering occurs also for the light L12 injected forming an angle less than the critical angle (isotropic scattering of transmitted light L13) at the exit face, resulting in that although brightness is maintained over a wide viewing angle, brightness is low in the frontal direction (normal direction and its vicinity) so that the display images appear dark.

Another method for outputting the light emitted from the light emitting layer and injected into the transparent substrate 801 forming an angle not less than the critical angle at the exit face for delivery to the viewer is to roughen the surface of the transparent substrate 801 to provide concavities and convexities, but in this method also, as in the case of the problem caused by the above scattering layer, brightness in the frontal direction is decreased and the displayed images appear dark.

Also, it has not been possible in the conventional EL display apparatus, having roughened surface on the transparent substrate 801 or having a scattering layer 820, to prevent those rays emitted from the light emitting layer 815 and injected into the transparent electrode 813 to form a wide angle (not less than the critical angle) at the exit face, from causing total internal reflection within the transparent electrode 813.

SUMMARY OF THE INVENTION

In the following, the surface at which light exits, or at which light would exit if it did not encounter the face at an angle not less than the critical angle, is called the "exit face".

The present invention is provided in view of the background described above, and an object of the present invention is to provide an EL device to produce improved brightness in the frontal viewing direction, by allowing the light emitted from the light emitting layer and injected into the transparent electrode or transparent substrate to form a narrow angle (less than the critical angle) at the exit face for delivery to the viewer by weak scattering while permitting the light injected to form a wide angle (more than the critical angle) at the exit face into the transparent electrode or the transparent substrate to be also delivered to the viewer.

Another object of the present invention is to provide an EL display apparatus by using the EL device having improved frontal brightness in an EL display apparatus so as to provide bright display and high quality images.

Another object of the present invention is to provide an EL illumination apparatus using the EL device having improved frontal brightness.

Another object of the present invention is to provide a liquid crystal apparatus based on the EL illumination apparatus having improved frontal brightness.

Another object of the present invention is to provide an electronic apparatus having a display means based on the liquid crystal apparatus using the EL display apparatus or EL illumination apparatus having improved frontal brightness To solve the problems outlined above, the present invention provides an EL device, in Mode 1, comprising a plurality of EL elements, each element comprising a pair of electrodes opposing each other across an organic layer including a light emitting layer, arranged in a matrix pattern on one surface of an optically transparent substrate so as to power EL elements individually, and at least one electrode of the pair of electrodes located on the optically transparent substrate side comprises an optically transparent electrode such that a light emitted from a light emitting layer which is energized is emitted towards the optically transparent substrate; wherein an optical device is provided on another surface of the optically transparent substrate so as to scatter, diffract, or scatter and diffract, at least a portion of light emitted from the light emitting layer, and injected into the optically transparent substrate to form an angle to cause repeated total reflection, for external output while weakly scattering and/or transmitting other light entered into the optically transparent substrate for external output.

In the present EL device, by providing the optical device having the structure described above on the other surface of the optically transparent substrate, at least a portion of the light emitted from the light emitting layer and injected into the optically transparent substrate to form an angle at the exit face (a wide angle, not less than a critical angle) so as to cause repeated total reflection, is scattered and/or diffracted for external output, while other light (injected into the transparent substrate to form a narrow angle, less than the critical angle at the exit face) is weakly scattered and/or transmitted for external output, and therefore, the frontal brightness (normal direction and its vicinity) is improved compared with those conventional optical means based on a scattering layer having isotropic scattering characteristics or those that rely on a roughened surface.

That is, because the EL display apparatus of the present Mode is provided with the optical device that scatters, diffracts, or scatters and diffracts, at least a portion of the light injected into the transparent substrate to form a wide angle (not less than a critical angle) at the exit face, while not affecting or weakly affecting light injected which forms a narrow angle (less than a critical angle) at the exit face, on the surface of a transparent substrate that serves as the support plate for EL element, and therefore, not only is total reflection avoided but also the light emitted straight in the frontal direction (normal direction and its vicinity) is not subjected to scattering so that light generated in the light emitting layer is delivered (emitted) efficiently to the external environment, thus leading to improved brightness.

Also, to solve the problem described above, the present invention provides, in Mode 2, an EL device comprising an EL element comprising a pair of electrodes opposing each other across an organic layer including a light emitting layer, arranged on one surface of an optically transparent substrate so as to power the EL element, and at least one electrode of the pair of electrodes located on the optically transparent substrate side comprises an optically transparent electrode such that a light emitted from a light emitting layer energized is emitted towards the optically transparent substrate; wherein an optical device is provided on other surface of the optically transparent substrate so as to scatter, diffract, or scatter and diffract at least a portion of the light emitted from the light emitting layer and injected into the optically transparent substrate to form an angle at the exit face to cause repeated total reflection, for external output while weakly scattering and/or transmitting other injected light for external output.

In an EL device of such a structure, by providing the optical device On the other surface of the transparent substrate, the frontal brightness (normal direction and its vicinity) is improved.

In the EL device according to Mode 1 or 2, the optical device may scatter at least a portion of the light injected into the transparent substrate to form an angle not less than a critical angle at the exit face for external output, while weakly scattering or transmitting the light injected which forms an angle less than the critical angle at the exit face for external output.

In the present EL device, by providing the optical device having the structure described above on the other surface of the transparent substrate, at least a portion of the incident light injected into the transparent substrate to form such an angle (wide angle, not less than critical angle) at the exit face to cause repeated total reflection, is scattered for external output, while other light (injected into the transparent substrate to form a narrow angle, less than critical angle) at the exit face is weakly scattered and/or transmitted (without scattering) for external output, and therefore, the frontal brightness (normal direction and its vicinity) is improved compared with those conventional optical means based on a scattering layer having isotropic scattering characteristics or those that rely on a roughened surface.

The optical device may diffract at least a portion of the incident light injected into the transparent substrate to form an angle not less than a critical angle at the exit face for external output while transmitting the incident light injected to form an angle less than the critical angle at the exit face for external output.

In the present EL device, by providing the optical device having the structure described above on the other surface of the transparent substrate, at least a portion of the incident light emitted from the light emitting layer and injected into the transparent substrate to form an angle not less than critical angle at the exit face to cause repeated total reflection, is diffracted for external output, and incident light injected to form a less-than-critical-angle at the exit face is transmitted for external output, that is, total reflection is prevented and the frontal output light (normal direction and its vicinity) is transmitted so that the frontal brightness is improved Also, the optical device may scatter and diffract at least a portion of the light injected into the transparent substrate to form an angle not less than a critical angle at the exit face for external output while weakly scattering and/or transmitting the light injected to form an angle less than the critical angle at the exit face for external output.

In the present EL device, by providing the optical device having the structure described above on the other surface of the transparent substrate, at least a portion of the light from the light emitting layer, injected into the transparent substrate to form a not-less-than-critical-angle at the exit face to cause repeated total reflection, is scattered and diffracted for external output, and incident light injected to form a less-than-critical-angle at the exit face is weakly scattered and/or transmitted for external output, so that total reflection is prevented and the frontal output light (normal direction and its vicinity) is hardly scattered and/or transmitted so that the frontal brightness is improved In an EL device according to Mode 1 or 2, the optical device scatters, diffracts, or scatters and diffracts at least a portion of the incident light injected into the transparent substrate that satisfies a condition $\beta 1 \geq \sin^{-1}(1/m1)$, (where $\beta 1$ refers to an inclination angle of the incident light from the normal of the transparent substrate, 1 refers to the index of refraction of air, and m1 refers to the refractive index of transparent substrate) for external output while weakly scattering and/or transmitting the incident light that satisfies a condition $\beta 1 < \sin^{-1}(1/m1)$ for external output.

The value of $\beta 1$ for the incident light of not less-than-critical-angle at the exit face to the normal of the transparent substrate can be computed from Snell's law (n1 sin $\theta 1$=n2 sin $\theta 2$), and by knowing that n1=m1, and refractive index of air is 1 so that n2=n1, $\theta 1=\beta 1$, and, when the incident light is at the critical angle at the exit face so that transmitted light becomes parallel to the surface of the transparent substrate, $\theta 2$ to the normal is 90 degrees, the condition $\beta 1 \geq \sin^{-1}(1/m1)$ can be computed. Therefore, the optical device scatters and/or diffracts at least a portion of the light injected into the transparent substrate that satisfies the condition $\beta 1 \geq \sin^{-1}(1/m1)$, and weakly scatters and/or transmits the light that satisfies the condition $\beta 1 < \sin^{-1}(1/m1)$; then, at least a portion of incident light injected into the transparent substrate to form such a wide angle (not less than a critical angle) at the exit face to cause repeated total reflection, can be scattered and/or diffracted for external output, while other light injected into the transparent substrate and incident to the air at a narrow angle (less than a critical angle) at the exit face is weakly scattered and/or transmitted for external output.

The optical device exhibits a transition behavior of light injected therein, from a scattering and/or diffracting state to a weak scattering and/or transmitting state, to occur over a range of 10 to 20 degrees. Therefore, it is preferable to optimize the optical device in such a way that the light that enters the transparent substrate and is incident to the optical device within a range of 10 degrees of the critical angle at the exit face can also be scattered or diffracted.

Therefore, it is preferable that the EL device scatter and/or diffract at least a portion of the light injected into the transparent substrate that satisfies the condition $\beta 1 \geq \sin^{-1}(1/m1)-10°$, (where $\beta 1$ refers to an inclination angle of the incident light from the normal of the transparent substrate, 1 refers to the index of refraction of air, and m1 refers to an refractive index of the transparent substrate) for external output while weakly scattering and/or transmitting the injected light that satisfies the condition $\beta 1 < \sin^{-1}(1/m1)-10°$ for external output.

Also, the optical device may scatter and/or diffract at least a portion of the light injected into the transparent substrate that satisfies a condition $\beta 1 \geq 40°$, (where $\beta 1$ refers to an inclination angle of the incident light from the normal of the transparent substrate at the exit face) for external output, while weakly scattering and/or transmitting the incident light that satisfies a condition $\beta 1=0°$ for external output.

To obtain specific values (approximation values) of the inclination angle $\beta 1$ to the normal direction that causes a not-less-than-critical angle for the light injected into the transparent substrate, it is permissible to use a glass substrate, or acrylic resin, or the like for the transparent substrate, whose refractive indices range from 1.49 to 1.6 (i.e., n1=1.49 to 1.6), and knowing that the refractive index of air is 1 (n2=1), and incident light entering with the critical angle produces transmitted light parallel to the surface of the transparent substrate so that the angle $\theta 2$ between the transmitted light and the normal of the transparent substrate is 90 degrees. From Snell's law, $\theta 1$ is about 40 degrees, and therefore, the critical angle $\beta 1$ of the light injected into the transparent substrate is about 40 degrees.

Therefore, if the optical device scatters and/or diffracts at least a portion of the light injected into the transparent substrate that satisfies the condition $\beta 1 \geq 40°$, and weakly scatters and/or transmits the injected light that satisfies the condition $\beta 1=0°$, then, at least a portion of the light injected into the transparent substrate to form a wide angle (not less than the critical angle) at the exit face to cause repeated total reflection, can be scattered and/or diffracted for external output, while the light portion injected into the transparent substrate in the frontal direction (normal direction) can be weakly scattered and/or transmitted for external output.

Also, it is preferable that the optical device may scatter and/or diffract at least a portion of the light injected into the transparent substrate that satisfies a condition $\beta 1 \geq 40°$, (where $\beta 1$ refers to an inclination angle of the incident light from the normal of the transparent substrate) for external output, while weakly scattering and/or transmitting the incident light that satisfies a condition $\beta 1 < 40°$ for external output. If the optical device satisfies these conditions, then, at least a portion of the light injected into the transparent substrate to form a wide angle (not less than critical angle) at the exit face to cause repeated total reflection, can be scattered and/or diffracted for external output, while weakly scattering and/or transmitting the light injected into the transparent substrate almost entirely for external output.

In an EL device according to Mode 1 or 2, the optical device may scatter and/or diffract at least a portion of the light injected into the optical device through the transparent substrate that satisfies a condition $\beta 2 \geq \sin^{-1}(1/m2)$, (where $\beta 2$ refers to an inclination angle of the incident light from the normal of the optical device, 1 refers to the index of refraction of air, and m2 refers to a refractive index of the optical device) for external output while weakly scattering and/or transmitting the incident light that satisfies a condition $\beta 2 < \sin^{-1}(1/m2)$ for external output.

The value of $\beta 2$ for the incident light of not less than-critical-angle to the normal of the optical device can be computed from Snell's law (n1 sin $\theta 1$=n2 sin $\theta 2$), and by knowing that n1=m2, and the refractive index of air is 1 so that n2=1, $\theta 1=\theta 2$, and, when the incident light is at the critical angle so that transmitted light becomes parallel to the surface of the transparent substrate, θ2 to the normal of the transparent substrate is 90 degrees, the condition $\beta1 \geq \sin^{-1}(1/m2)$ can be computed. Therefore, if the optical device scatters and/or diffracts at least a portion of the light injected into the optical device through the transparent substrate that satisfies the condition $\beta2 \geq \sin^{-1}(1/m2)$, and weakly scatters and/or transmits incident light that satisfies the condition $\beta2 < \sin^{-1}(1/m2)$, then, at least a portion of the light injected into the optical device through the transparent substrate to form a wide angle (not less than the critical angle) at the exit face to cause repeated total reflection, can be scattered and/or diffracted for external output, while other light portions injected into the optical device to form a narrow angle (less than critical angle) at the exit face can be weakly scattered and/or transmitted for external output.

The optical device exhibits a transition angle region of the incident light injected into the optical device through the transparent substrate, from the scattering and/or diffracting state to the low diffracting state, over a range of 10 to 20 degrees, so that it is preferable to optimize the optical device so that the light injected through the transparent substrate into the optical device to form an angle range from the critical angle to 10 degrees of the critical angle at the exit face can also be subjected to scattering and/or diffracting.

It follows that it is preferable that the optical device scatters and/or diffracts at least a portion of the light injected into the optical device through the transparent substrate that satisfies a condition $\beta2 \geq \sin^{-1}(1/m2)-10°$, (where β2 refers to an angle of inclination from the normal of the optical device, 1 refers to the index of refraction of air, and m2 refers to the refractive index of the optical device) for external output, while the injected light that satisfies the condition $\beta2 < \sin^{-1}(1/m2)-10°$ is weakly scattered and/or transmitted for external output.

The optical device may scatter and/or diffract at least a portion of the incident light injected into the optical device through the transparent substrate that satisfies a condition $\beta2 \geq 40°$, (where β2 refers to an inclination angle of the incident light from the normal of the optical device) for external output, while weakly scattering and/or transmitting the incident light that satisfies a condition $\beta2=0°$ for external output.

To obtain specific values (approximation values) of the inclination angle β2 to the normal of the optical device that causes a not-less-than-critical angle for the light injected from the light emitting layer into the optical device through the transparent substrate, by knowing that the optical device has an average refractive index of about 1.57 (n1≈1.57) and that the refractive index of air is 1 (n2=1), and the incident light entering at the critical angle produces transmitted light parallel to the surface of the optical device, where θ2 is 90 degrees. From Snell's Jaw, θ1 is about 40 degrees, and therefore, the critical angle β2 of the light injected into the optical device at the exit face is about 40 degrees.

Therefore, if the optical device scatters and/or diffracts at least a portion of the light injected into the optical device through the transparent substrate that satisfies the condition $\beta2 \geq 40°$, and weakly scatters and/or transmits the light that satisfies the condition $\beta2=0°$, then, at least a portion of the light injected into the optical device through the transparent substrate to form a wide angle at the exit face (not less than the critical angle) to cause repeated total reflection, can be scattered and/or diffracted for external output, while the light portion frontally injected (normal direction) can be weakly scattered and/or transmitted for external output.

Also, it is preferable that the optical device scatter and/or diffract at least a portion of the light injected into the optical device through the transparent substrate that satisfies a condition $\beta2 \geq 40°$, (where β2 refers to an inclination angle of the incident light from the normal of the optical device) for external output, while weakly scattering and/or transmitting the light that satisfies a condition $\beta2<40°$ for external output. If the optical device satisfies these conditions, then, at least a portion of the light injected into the transparent substrate through the transparent substrate to form a wide angle (not less than the critical angle) at the exit face can be scattered and/or diffracted for external output, while weakly scattering and or transmitting the light injected to form an angle less than the critical angle at the exit face almost entirely for external output Also, in the EL device in Mode 1 or 2, the refractive index m1 of the transparent substrate and the refractive index m2 of the optical device may be equal to each other or may be substantially equal to each other.

Also, in any of the EL devices in the above described present invention, it is preferable that the refractive index m1 of the transparent substrate and the refractive index m2 of the optical device be related such that m1≦m2; so that the light emitted from the light emitting layer and injected into the optically transparent substrate does not perform total reflection and is delivered (emitted) to the viewer efficiently In an EL device in Mode 1 or 2, the optical device may output the light injected into the transparent substrate to form an angle not less than a critical angle at the exit face, externally at a haze value higher than 50%, and may output the light injected to form less than the critical angle at the exit face, externally at a haze value lower than 20%. If the optical device is able to perform in such a way that the light injected into the transparent substrate to form an angle not less than the critical angle at the exit face to be output externally with a haze value higher than 50%, then the light injected to form an angle not less than the critical angle at the exit face can be output externally due to scattering effects and the like caused by the optical device Also, if the optical device is able to perform in such a way that the light injected into the transparent substrate to form an angle less than the critical angle at the exit face can be output externally with a haze value lower than 20%, then, the light injected to form less than the critical angle can be transmitted externally (with almost no scattering) substantially linearly by the optical device.

Therefore, when the optical device is provided, the frontal brightness (normal direction and its vicinity) is improved compared with the conventional devices that exhibit equal scattering characteristics in all incident directions, in other words, those optical devices having a scattering layer of isotropic scattering characteristics or those that rely on a roughened surface.

In the EL device in Mode 1 or 2, the optical device may be those formed by laminating a plurality of optical films.

The optical device may be those formed by laminating a plurality of optical films whose axes of directivity for a parallel light transmittance are shifted successively.

The optical film may be a hologram.

To solve the problems described above, the present invention provides an EL display apparatus in Mode 1 based on an EL device comprising a plurality of EL elements, each element comprising a pair of electrodes opposing each other across an organic layer including a light emitting layer, arranged in a matrix pattern on one surface of an optically transparent substrate so as to power EL elements individually, and at least one electrode of the pair of electrodes located on the transparent substrate side comprises a transparent electrode such that a light emitted from the light emitting layer energized is emitted towards the transparent substrate; wherein an optical device is provided on other surface of the transparent substrate so as to scatter and/or diffract at least a portion of the light from the light emitting layer, injected into the optically transparent substrate and having an angle to cause repeated total reflection, for external output, while weakly scattering and/or transmitting other injected light for external output.

According to the present EL display apparatus, because the frontal brightness is improved, a display viewed from the frontal direction (normal direction and its vicinity) appears bright so that its display quality is improved. Also, such an EL display apparatus does not need a separate illumination device so that, compared with liquid crystal display devices that require illumination, apparatus thickness can be reduced. Also, because the light appearing on the optical device side of the EL display apparatus is generated in the light emitting layer, images produced by the light emitting elements provide a wider angle of view compared with the images produced by a liquid crystal display apparatus. Further, this EL display apparatus provides higher response speed compared with a liquid crystal display apparatus.

The EL display apparatus described above may comprise a red-light-emitting element, a green-light-emitting element, and a blue-light-emitting element.

By providing such an EL display apparatus, frontal direction (normal direction and its vicinity) images appear clearly, and a full-color display may be possible.

In any one of the EL display apparatuses described above, a phase plate ($\lambda/4$) and a polarizing plate, may be provided successively starting from an optical device side, on a surface of the optical device opposite to a transparent substrate.

If the phase plate and the polarizing plate are not provided, when the non-transparent electrode and the transparent electrode are placed in opposition and the former is made of a reflective material such as aluminum, intense (bright) surrounding light is reflected by the non-transparent electrode such that black displays cannot be viewed. In the present EL display apparatus, because the phase plate and the polarizing plate are provided, when the surrounding light is intense (bright), the surrounding light is circularly polarized when it is transmitted the first time through the phase plate, and this light is reflected at the electrode and is output as circularly polarized light in the reverse direction, and because this circularly polarized light in the reverse direction is not transmitted through the polarizing plate, black display can be viewed.

To solve the problems described above, an EL illumination apparatus of the present invention includes an EL device comprising an EL element comprising a pair of electrodes opposing each other across an organic layer including a light emitting layer, arranged on one surface of a transparent substrate so as to power the EL element such that a light emitted from the light emitting layer energized is emitted towards the transparent substrate; wherein an optical device is provided on another surface of the transparent substrate so that the optical device scatters and/or diffracts at least a portion of the light injected into the optically transparent substrate and having an angle at the exit face to cause repeated total reflection for external output, while weakly scattering and/or transmitting other incident light for external output.

Such an EL illumination apparatus provides improved frontal brightness because the EL device of the present invention is used for the EL illumination apparatus.

The EL illumination apparatus constructed as described above may comprise at least one of a red-light-emitting element, a green-light-emitting element, a blue-light-emitting element, and a white-light-emitting element.

According to such an EL illumination apparatus, depending On the EL element chosen, or the combination of EL elements chosen, red-, green-, blue-, or white-light, or light of any other color can be delivered efficiently to the viewer to provide an EL illumination apparatus having improved frontal brightness.

Also, in the illumination apparatus constructed as described above, an EL element may be a blue-light-emitting element, and a means may be provided between the EL element and a transparent substrate, or between the transparent substrate and an optical device, or on a surface of the optical device, for converting the wavelength of a blue light emitted from the light emitting layer.

Such an EL illumination apparatus delivers white-light efficiently and provides improved frontal brightness.

To solve the problems described above, the present invention provides a liquid crystal apparatus comprising a liquid crystal panel comprising a pair of substrates and a liquid crystal layer held between the pair of substrates, and an EL illumination apparatus of the present invention having the above construction on a side opposite to the liquid crystal layer of the one substrate of the liquid crystal panel. The above liquid crystal panel may be provided with a semi-transparent reflective layer on a liquid crystal layer side of the one substrate.

According to such a liquid crystal apparatus, clear images are displayed and image quality is improved, because the EL illumination apparatus of the present invention having improved frontal brightness is provided.

To solve the problems described above, the present invention provides an electronic device comprising the above EL display apparatus of the present invention or the above liquid crystal apparatus provided with an EL illumination apparatus of the present invention, as a display means.

Such an electronic device provides superior image quality, because it is provided with a display means comprising an EL display apparatus of the present invention or a liquid crystal apparatus comprising an EL illumination apparatus of the present invention that provides clear images and superior image quality.

To solve the problems described above, the present invention provides, in Mode 3, an EL device comprising a plurality of EL elements, each element comprising a pair of electrodes opposing each other across an organic layer including a light emitting layer, arranged in a matrix on one surface of a transparent substrate so as to power EL elements individually, and at least an electrode of the pair of electrodes that is located on the transparent substrate side comprises a transparent electrode such that a light emitted from a light emitting layer energized is emitted towards the transparent substrate; wherein an optical device is provided between the transparent substrate and the transparent electrode so as to scatter and/or diffract at least a portion of the light injected into the transparent electrode to form a range of angles at the exit face to cause repeated total reflection for output to the transparent substrate, while weakly scattering and/or transmitting the light injected into the transparent electrode to form anther range of angles at the exit face for output to the transparent substrate, and further, the optical device scatters and/or diffracts at least a portion of the light injected into the transparent substrate to form another range of angles at the exit face to cause repeated total reflection for external output through the transparent substrate, while weakly scattering and/or transmitting the light injected to form another range of angles at the exit face for external output from the transparent substrate.

In the present EL device, by providing the optical device having the structure described above between the transparent substrate and the transparent electrode, at least a portion of the light injected into the transparent electrode to form another range of angles (wide angle, not-less-than-critical angle) at the exit face to cause repeated total reflection, is scattered and/or diffracted at the transparent substrate, and other light injected into the transparent substrate to form a range of angles (narrow angle, less-than-critical angle) at the exit face is weakly scattered and/or transmitted to the transparent substrate.

Further, the optical device scatters and/or diffracts at least a portion of incident light injected into the transparent substrate to form a range of angles at the exit face to cause total reflection (wide angle, injected into the transparent electrode to form a not-less-than-critical angle at the exit face) for external output through the transparent substrate, while other light injected into the transparent substrate to form a low angle at the exit face (less-than-critical angle) is weakly scattered and/or transmitted for external output from the transparent substrate. Therefore, frontal brightness (normal direction and its vicinity) is improved compared with those conventional optical means based on a scattering layer having isotropic scattering characteristics or those that rely on a roughened surface.

Further, the optical device provided in the present EL device does not need to scatter and/or diffract all the light injected into the transparent electrode and incident to the optical device at a range of angles (wide angle, a not-less-than-critical angle) to cause total reflection, it only needs to scatter and/or diffract a portion of the light injected into the transparent electrode to form a range of angles to cause total reflection at the exit face for output to the transparent substrate. Also, the optical device provided in the present EL device does not need to scatter and/or diffract all the incident light injected into the transparent electrode to form a range of angles (wide angle, not-less-than-critical angle) at the exit face to cause total reflection, it only needs to scatter and/or diffract a portion of the light injected into the transparent electrode to form a range of angles to cause total reflection at the exit face for external output through the transparent substrate to obtain the described effects That is, in the present EL device, the optical device used in the device performs in such a way that at least a portion of the light injected into the transparent electrode to form a wide angle (not-less-than-critical angle) at the exit face is scattered and/or diffracted, and the light injected into the transparent electrode to form a narrow angle (less than critical angle) at the exit face is not affected or weakly scattered, and further that, at least a portion of the light injected into the transparent substrate to form a wide angle (not less than critical angle) at the exit face is scattered and/or diffracted, and the light injected into the transparent substrate to form a narrow angle (less than critical angle) at the exit face is not affected or weakly scattered. By providing the optical device between the transparent substrate, serving as the support substrate to the EL element, and the transparent electrode, not only is total reflection avoided, but also frontal output light (normal direction and its vicinity) output is not subjected to scattering so that light generated in the light emitting layer is delivered (emitted) efficiently to the exterior, thus leading to improved frontal brightness.

Also, in the present EL device, by considering that the EL device is being applied to display means such as an EL display apparatus, the optical device is provided between the transparent substrate and the transparent electrode. This is because, when the optical device is provided on the exterior of the transparent substrate, clear images are not obtained because of blurring produced due to parallax. In the present mode, by considering that the EL device is applied to an EL display apparatus, the optical device is optimally located so that clear images are obtained by eliminating blurring caused by parallax.

Also, to solve the problems described above, the present invention provides an EL device, in Mode 4, comprising an EL element comprising a pair of electrodes opposing each other across an organic layer including a light emitting layer, arranged on one surface of a transparent substrate so as to power the EL element, and at least an electrode of the pair of electrodes that is located on the transparent substrate side comprises a transparent electrode such that a light emitted from a light emitting layer energized emitted towards the transparent substrate; wherein an optical device is provided between the transparent substrate and the transparent electrode so as to scatter and/or diffract at least a portion of the light injected into the transparent electrode to form an angle to cause repeated total reflection at the exit face for output to the transparent substrate, while weakly scattering and/or transmitting the light injected into the transparent electrode to form another range of angles at the exit face for output to the transparent substrate, and further, the optical device scatters and/or diffracts at least a portion of the light injected into the transparent substrate to form a range of angles to cause repeated total reflection at the exit face for external output from the transparent substrate while weakly scattering and/or transmitting the light injected into the transparent substrate to form another range of angles at the exit face for external output from the transparent substrate.

In the present EL device, by providing the optical device constructed as described above between the transparent substrate and the transparent electrode, frontal brightness (normal direction and its vicinity) is improved.

In au EL device described in Mode 3 or 4, the optical device may scatter at least a portion of the light injected into the transparent electrode to form an angle not less than a critical angle at the exit face for output to the transparent substrate while weakly scattering or transmitting the light injected into the transparent electrode to form an angle less than the critical angle at the exit face for output to the transparent substrate, and further, the optical device may scatter at least a portion of the light injected into the transparent substrate to form an angle not less than a critical angle at the exit face for external output while weakly scattering or transmitting the light injected to form an angle less than the critical angle at the exit face for external output.

In the present EL device, by providing the optical device between the transparent substrate and the transparent electrode, the optical device used in the EL device performs in such a way that at least a portion of the light injected into the transparent electrode to form an angle not less than the critical angle at the exit face is scattered for output to the transparent substrate, and the light injected into the transparent electrode to form an angle less than the critical angle at the exit face is weakly scattered or transmitted (without scattering) to the transparent substrate, and further that at least a portion of the light injected into the transparent substrate to form an angle not less than the critical angle at the exit face is scattered for external output, and the light injected to form an angle less than the critical angle at the exit face into the transparent substrate is weakly scattered or transmitted (without scattering) for external output. That is, total reflection is prevented while the frontal output light (normal direction and its vicinity) is little affected or transmitted so that the frontal brightness is improved.

The optical device may diffract at least a portion of the light injected into the transparent electrode and forming an angle not less than a critical angle at the exit face for output to the transparent substrate while transmitting the light injected and forming an angle less than the critical angle at the exit face for output to the transparent substrate, and further, the optical device may diffract at least a portion of the light injected into the transparent substrate and forming an angle not less than a critical angle at the exit face for external output while transmitting the light injected into the transparent substrate and forming an angle less than the critical angle at the exit face for external output.

In the present EL device, by providing the optical device between the transparent substrate and the transparent electrode, the optical device used in the EL device performs in such a way that at least a portion of the light injected into the transparent electrode and forming a not-less-than-critical angle at the exit face is diffracted for output to the transparent substrate, and the light injected into the transparent electrode and forming a less-than-critical angle at the exit face is transmitted to the transparent substrate, and further that, at least a portion of the light injected into the transparent substrate and forming a not-less-than-critical angle at the exit face is scattered for external output, and the light injected into the transparent substrate and forming a less than critical angle at the exit face is weakly scattered or transmitted for external output. That is, total reflection is prevented while the frontal output light (normal direction and its vicinity) is little affected or transmitted so that the frontal brightness is improved.

Also, the optical device may scatter and diffract at least a portion of the light injected into the transparent electrode and forming an angle to cause repeated total reflection at the exit face for output to the transparent substrate while weakly scattering and/or transmitting incident light injected into the transparent electrode and forming another range of angles at the exit face for output to the transparent substrate, and further, the optical device may scatter and diffract at least a portion of the incident light injected into the transparent substrate and forming a range of angles to cause repeated total reflection at the exit face for external output while weakly scattering and/or transmitting incident light injected into the transparent substrate and forming less than the critical angle at the exit face for external output.

In the present EL device, by providing the optical device between the transparent substrate and the transparent electrode, the optical device used in the EL device performs in such a way that at least a portion of the light injected into the transparent electrode and forming a not-less-than-critical angle at the exit face is scattered and diffracted for output to the transparent substrate, and the light injected into the transparent electrode and forming a less-than-critical angle at the exit face is transmitted to the transparent substrate, and further that, at least a portion of the light injected into the transparent substrate and forming a not less than critical angle at the exit face is scattered and transmitted for external output, and the light injected into the transparent substrate and forming a less-than-critical angle at the exit face is weakly scattered and/or transmitted for external output. That is, total reflection is prevented while the frontal output light (normal direction and its vicinity) is little affected or transmitted so that the frontal brightness improved.

Also, in the EL device described in Mode 3 or 4, the optical device scatters and/or diffracts at least a portion of the incident light injected into the transparent electrode that satisfies a condition $\beta3 \geq \sin^{-1}(m2/m3)$, (where $\beta3$ refers to an inclination angle of the incident light from the normal of the transparent electrode, m2 refers to the refractive index of the optical device, and m3 refers to the refractive index of the transparent electrode) for output to the transparent substrate, while weakly scattering and/or transmitting incident light that satisfies a condition $\beta3 < \sin^{-1}(m2/m3)$ to the transparent substrate.

The value of $\beta3$ for the incident light of not-less-than-critical-angle to the normal of the transparent electrode 2 can be computed from Snell's law (n1 sin θ1=n2 sin θ2), and by knowing that n1=m3, n2=$m_3$, and θ1=$\beta3$, and, when the incident light is at the critical angle so that transmitted light becomes parallel to the surface of the transparent substrate, θ2 to the normal is 90 degrees, the condition $\beta3 \geq \sin^{-1}(m2/m3)$ can be computed. Therefore, if the optical device scatters and/or diffracts at least a portion of incident light injected into the transparent electrode that satisfies the condition $\beta3 \geq \sin^{-1}(m2/m3)$, and weakly scatters and/or transmits incident light that satisfies the condition $\beta3 < \sin^{-1}(m2/m3)$, then, at least a portion of incident light from the light emitting layer, injected into the transparent electrode and forming a wide angle at the exit face (injected and forming a not-less-than-critical angle at the exit face into the transparent electrode) to cause repeated total reflection, can be scattered and/or diffracted for output to the transparent substrate, while other light portion injected into the transparent electrode and forming a narrow angle at the exit face (injected and forming a less-than-critical angle at the exit face into the transparent electrode) can be weakly scattered and/or transmitted for output to the transparent substrate.

The optical device exhibits a transition region of the light injected into the optical device, from the scattering and/or diffracting state to the low scattering and/or diffracting state, to occur over a range of 10 to 20 degrees, so that it is preferable to optimize the optical device so that the light injected into the optical device and forming an angle within 10 degrees of the critical angle at the exit face can also be subjected to scattering and/or diffracting.

It is preferable, therefore, that the optical device scatter and/or diffract at least a portion of the light injected into the transparent electrode that satisfies a condition $\beta3 \geq \sin^{-1}(m2/m3)-10°$, (where $\beta3$ refers to an inclination angle of the incident light from the normal of the transparent electrode, m2 to the refractive index of the optical device and m3 refers to the refractive index of the transparent electrode) for output to the transparent substrate, while weakly scattering and/or transmitting incident light that satisfies a condition $\beta3 < \sin^{-1}(m2/m3)-10°$ to the transparent substrate.

Also, the optical device may highly scatter and/or diffract at least a portion of the light injected into the transparent electrode that satisfies a condition $\beta3 \geq 40°$ (where $\beta3$ refers to the angle of inclination of the incident light from the normal of the transparent electrode) for output to the transparent substrate while weakly scattering and/or transmitting the incident light that satisfies a condition $\beta3=0°$ for output to the transparent substrate.

To obtain specific values (approximation values) of the inclination angle $\beta3$ to the normal that causes a not-lessthan-critical angle for the light injected into the transparent electrode at the exit face, it is permissible to use an ITO or IZO whose refractive indexes range 1.8 to 2.0 (n1=1.8 to 2.0), and the refractive index of the optical device is 1.57 (n2=1.57). The light entering and forming the critical angle at the exit face produces transmitted light parallel to the surface of the transparent electrode so that the angle θ2 between the transmitted light and the normal of the transparent substrate is 90 degrees. From Snell's law, θ1 is about 55 degrees, and therefore, the critical angle β3 of the light injected into the transparent electrode at the exit face is about 55 degrees.

Therefore, if the optical device scatters and/or diffracts at least a portion of the light injected into the transparent electrode that satisfies the condition β3≧55°, and weakly scatters and/or transmits the light that satisfies the condition β3=0°, then, at least a portion of the light injected into the transparent electrode and forming a wide angle (not less than critical angle) at the exit face to cause repeated total reflection, can be scattered and/or diffracted for output to the transparent substrate, while the light portion injected into the transparent electrode in the normal direction can be weakly scattered and/or transmitted for output to the transparent substrate.

Also, it is preferable that the optical device scatter and/or diffract at least a portion of the light injected into the transparent electrode that satisfies a condition β3≧55° (where β3 refers to the angle of inclination of the incident light from the normal of the transparent electrode) for output to the transparent substrate, while weakly scattering and/or transmitting the light that satisfies a condition β3<55° for output to the transparent substrate. If the optical device is able to satisfy such conditions, then, at least a portion of light injected into the transparent electrode and forming a wide angle (not less than critical angle) at the exit face to cause repeated total reflection, can be scattered and/or diffracted for output to the transparent substrate, while the light portion injected into the transparent electrode and forming a-less-than-critical angle at the exit face can be weakly scattered and/or transmitted for output to the transparent substrate.

In an EL device described in Mode 3 or 4, the optical device may scatter and/or diffract at least a portion of the light injected into the optical device through the transparent electrode that satisfies a condition β2≧sin$^{-1}$(m1/m2), (where β2 refers to an inclination angle of an incident light from the normal of the optical device, m1 refers to the refractive index of the transparent substrate and m2 refers to the refractive index of the optical device) is scattered and/or transmitted for output to the transparent substrate, while incident light that satisfies a condition β2≧sin$^{-1}$(m1/m2) is weakly scattered and/or transmitted to the transparent substrate.

The value of β2 for the incident light of not-less-than-critical angle to the normal of the transparent electrode can be computed from Snell's law (n1 sin θ1=n2 sin θ2), and by knowing that n1=m2, n2=m1, and θ1=β2, and, when the incident light is at the critical angle so that transmitted light becomes parallel to the surface of the transparent substrate, the angle θ2 of the transmitted light to the normal is 90 degrees, the condition β2≧sin$^{-1}$(m1/m2) can be computed.

Therefore, if the optical device scatters and/or diffracts at least a portion of the light injected into the optical device through the transparent electrode that satisfies the condition β2≧sin$^{-1}$(m1/m2) for output to the transparent substrate, and weakly scatters and/or transmits incident light that satisfies the condition β2<sin$^{-1}$(m1/m2), then, at least a portion of the light injected into the optical device through the transparent electrode and forming such an angle (a wide angle, not less than critical angle) at the exit face to cause repeated total reflection can be scattered and/or diffracted to the transparent substrate, while other light portion (injected into the optical device and forming a narrow angle at the exit face, less than the critical angle) can be weakly scattered and/or transmitted for output to the transparent substrate.

The optical device exhibits a transition region of the light injected into the optical device through the transparent electrode, from the scattering and/or diffracting state to the low diffracting state, to occur over a range of 10 to 20 degrees, so that it is preferable to optimize the optical device so that the light injected through the transparent electrode into the optical device and forming an angle within 10 degrees of the critical angle at the exit face can also be subjected to scattering and/or diffracting.

Therefore, it is preferable that the optical device scatter and/or diffract at least a portion of the light injected into the optical device through the transparent electrode that satisfies the condition β2≧sin$^{-1}$(m1/m2)−10°, (where β2 refers to an angle of inclination of the incident light from the normal of the optical device, m1 to the refractive index of the transparent substrate 1 and m2 refers to the refractive index of the optical device) for output to the transparent substrate, while incident light that satisfies the condition β2<sin$^{-1}$(m1/m2)−10° is weakly scattered and/or transmitted to the transparent substrate.

Also, it is preferable that the optical device scatter and/or diffract at least a portion of the light injected into the optical device through the optically transparent electrode that satisfies a condition β2≧70° (where β2 refers to the angle of inclination of the incident light from the normal of the optical device) for output to the transparent substrate while weakly scattering and/or transmitting the incident light that satisfies the condition β2=0° for output to the transparent substrate.

To obtain specific values (approximation values) of the inclination angle β2 to the normal that causes an angle not less than the critical angle for the light injected into the optical device through the transparent electrode, knowing that the optical device has an average refractive index of 1.57 (n1=1.57), and knowing that the light entering at the critical angle produces transmitted light parallel to the surface of the transparent electrode so that the angle θ2 between the transmitted light and the normal of the optical device is 90 degrees, and from Snell's law, θ1 is about 70 degrees, and therefore, the critical angle β2 of the light injected into the optical device at the exit face of the optical device is about 70 degrees Therefore, if the optical device scatters and/or diffracts at least a portion of the light injected into the optical device through the transparent electrode that satisfies the condition β2≧70°, and weakly scatters and/or transmits incident light that satisfies the condition β2=0°, then, at least a portion of the light injected into the optical device through the transparent electrode and forming a wide angle (not less than the critical angle) at the exit face of the optical device to cause repeated total reflection, can be scattered and/or diffracted and output to the transparent substrate, while the light portion injected into the optical device in the normal direction can be weakly scattered and/or transmitted and output to the transparent substrate.

Also, it is preferable that the optical device scatter and/or diffract at least a portion of the light injected into the optical device through the optically transparent electrode that satisfies a condition $\beta 2 \geq 70°$ (where $\beta 2$ refers to the angle of inclination of the incident light from the normal of the optical device) for output to the transparent substrate while weakly scattering and/or transmitting the incident light that satisfies a condition $\beta 2 < 70°$ for output to the transparent substrate If the optical device can satisfy these conditions, then, at least a portion of the light injected into the optical device through the transparent electrode and forming an angle (wide angle, not less than critical angle) at the exit face of the optical device to cause repeated total reflection, can be scattered and/or diffracted for output to the transparent substrate, while the light portion injected and forming a less-than-critical angle at the exit face of the optical device can be weakly scattered and/or transmitted for output to the transparent substrate.

Also, in an EL device described in Mode 3 or 4, the optical device may scatter and/or diffract at least a portion of the light injected into the transparent substrate that satisfies a condition $\beta 1 \geq \sin^{-1}(1/m1)$, (where $\beta 1$ refers to an inclination angle of the incident light from the normal of the transparent substrate, 1 refers to the index of refraction of air, and m1 refers to a refractive index of the transparent substrate) for external output, while weakly scattering and/or transmitting the light that satisfies a condition $\beta 1 < \sin^{-1}(1/m1)$ for external output.

The value of $\beta 1$ for the incident light of not-less-than-critical-angle to the normal of the transparent substrate can be computed from Snell's law (n1 sin $\theta 1$=n2 sin $\theta 2$), and by knowing that n1=m1, and refractive index of air is 1 so that n2=n1, $\theta 1$=$\beta 1$, and, when the incident light is at the critical angle so that transmitted light becomes parallel to the surface of the transparent substrate, the angle of the transmitted light $\theta 2$ to the normal of the transparent substrate is 90 degrees, the condition $\beta 1 \geq \sin^{-1}(1/m1)$ can be computed. Therefore, if the optical device scatters and/or diffracts at least a portion of incident light injected into the transparent substrate that satisfies the condition $\beta 1 \geq \sin^{-1}(1/m1)$, and weakly scatters and/or transmits incident light that satisfies the condition $\beta 1 < \sin^{-1}(1/m1)$, then, at least a portion of the light injected into the transparent substrate and forming a wide angle (an angle not less than the critical angle) at the exit face to cause repeated total reflection, can be scattered and/or diffracted for external output, while other light portion injected into the transparent substrate and forming a narrow angle (a less-than-critical angle) at the exit face is weakly scattered and/or transmitted for external output.

The optical device exhibits a transition region of the light injected into the optical device, from the scattering and/or diffracting state to the low diffracting state, to occur over a range of 10 to 20 degrees, so that it is preferable to optimize the optical device so that the light injected into the transparent substrate and forming an angle at the exit face of the transparent substrate within lo degrees of the critical angle can also be subjected to scattering and/or diffracting.

Therefore, it is preferable that the optical device scatter and/or diffract at least a portion of the light injected into the transparent substrate that satisfies a condition $\beta 1 \geq \sin^{-}(1/m1)-10°$, (where $\beta 1$ refers to an inclination angle of the incident light from the normal of the transparent substrate, 1 refers to the index of refraction of air, and m1 refers to an refractive index of the transparent substrate) for external output while weakly scattering and/or transmitting the incident light that satisfies a condition $\beta 1 < \sin^{-1}(1/m1)-10°$ for external output.

Also, the optical device may scatter and/or diffract at least a portion of the light injected into the transparent substrate that satisfies a condition $\beta 1 \geq 40°$, (where $\beta 1$ refers to an inclination angle of the incident light from the normal of the transparent substrate) for external output, while weakly scattering and/or transmitting the light that satisfies a condition $\beta 1 = 0°$ for external output.

To obtain specific values (approximation values) of the inclination angle $\beta 1$ to the normal that causes an angle not less than the critical angle for the light injected into the transparent substrate, it is permissible to use a glass substrate or acrylic resin for the transparent substrate, whose refractive index ranges from 1.49 to 1.6 (i.e., n1=1.49 to 1.6). The refractive index of air is 1 (n2=1), and incident light entering at the critical angle produces transmitted light parallel to the surface of the transparent substrate so that the angle $\theta 2$ between the transmitted light and the normal of the transparent substrate is 90 degrees. From Snell's law, $\theta 1$ is about 40 degrees. Therefore, the critical angle $\beta 1$ of the light injected into the transparent substrate 1 is about 40 degrees.

Therefore, if the optical device scatters and/or diffracts at least a portion of light injected into the transparent substrate that satisfies the condition $\beta 1 \geq 40°$, and weakly scatters and/or transmit the light that satisfies the condition $\beta 1 = 0°$, then, at least a portion of the light injected into the transparent substrate and forming such a wide angle (not less than critical angle) at the exit face to cause repeated total reflection, can be scattered and/or diffracted for external output, while the light portion injected into the transparent substrate in the normal direction can be weakly scattered and/or transmitted for external output.

Also, it is preferable that the optical device scatter and/or diffract at least a portion of the light injected into the transparent substrate that satisfies a condition $\beta 1 \geq 40°$, (where $\beta 1$ refers to an inclination angle of the incident light from the normal of the transparent substrate) for external output, while weakly scattering and/or transmitting the incident light that satisfies a condition $\beta 1 < 40°$ for external output. If the optical device can satisfy these conditions, then, at least a portion of the light injected into the transparent substrate and forming a wide angle (not less than the critical angle) at the exit face of the transparent substrate to cause repeated total reflection, can be scattered and/or diffracted for external output, while the light portion injected at a less than critical angle can be weakly scattered and/or transmitted for external output.

Also, in an EL device described in Mode 3 or 4, because an optical device having the structure described above is provided between the transparent substrate and the transparent electrode, the light scattered and/or diffracted by the optical device can be injected into the transparent substrate and forming an angle at the exit face of the optical device less than the critical angle, so that the light output from the optical device into the transparent substrate can be efficiently delivered externally without exhibiting repeated total reflection.

Also, in an EL device described in Mode 3 or 4, the refractive index m1 of the transparent substrate and the refractive index m2 of the optical device are equal to each other or substantially equal to each other.

Also, in an EL device described in Mode 3 or 4, the refractive index m1 of the transparent substrate and the refractive index m2 of the optical device are related such that $m1 \geq m2$, so that the light output from the light emitting layer into the transparent substrate can be efficiently delivered externally without exhibiting repeated total reflection.

Also, in an EL device described in Mode 3 or 4, the optical device may output the light injected into the optically transparent electrode and forming an angle not less than a critical angle at the exit face of the transparent electrode, to the transparent substrate at a haze value not less than 50%, and outputs the light injected into the optically transparent electrode and forming less-than-the-critical angle at the exit face of the transparent electrode to the transparent substrate at a haze value lower than 20%.

If the optical device is able to perform in such a way that at least a portion of the light injected into the transparent electrode and forming an angle not less than the critical angle at the exit face of the transparent electrode is output to the transparent substrate with a haze value higher than 50%, then the light injected and forming an angle at the exit face of the transparent electrode not less than the critical angle can be output to the transparent electrode due to scattering effects and the like caused by the optical device. Also, if the optical device is able to perform in such a way that the light injected into the transparent electrode and forming an angle less than the critical angle at the exit face of the transparent electrode at the exit face of the transparent electrode can be output to the transparent substrate with a haze value lower than 20%, then, the light injected into the transparent electrode and forming less than the critical angle at the exit face of the transparent electrode can be transmitted without scattering or travel almost linearly by the optical device to the transparent substrate.

Therefore, according to the present EL device, frontal brightness (normal direction and its vicinity) is improved compared with those conventional optical means based on a scattering layer having isotropic scattering characteristics or those that rely on a roughened surface.

Also, in an EL device described in Mode 3 or 4, the optical device may output the light injected into the optically transparent substrate and forming an angle not less than a critical angle externally at a haze value exceeding 50%, and outputs the light injected into the optically transparent substrate and forming less than the critical angle externally at a haze value lower than 20%.

If the optical device is able to perform in such a way that at least a portion of the light injected into the transparent substrate and forming an angle not less than the critical angle is output externally with a haze value higher than 50%, then at least a portion of the light injected into the transparent substrate and forming an angle not less than the critical angle at the exit face can be output externally through the optically transparent substrate due to scattering caused by the optical device. Also, if the optical device is able to perform in such a way that at least a portion of the incident light injected into the transparent substrate and forming an angle less than the critical angle at the exit face can be output externally with a haze value lower than 20%, then, at least a portion of the incident light injected into the transparent substrate and forming less than the critical angle at the exit face can be transmitted (without scattering) or with almost no scattering by the optical device to travel almost linearly for external output through the transparent substrate.

Therefore, according to the present EL device, frontal brightness (normal direction and its vicinity) is improved compared with those conventional optical means based on a scattering layer having isotropic scattering characteristics or those that rely on a roughened surface.

Also, in an EL device of Mode 3 or 4, the optical device may be formed by laminating a plurality of optical films or a plurality of optical layers The optical device disclosed above may be formed by laminating a plurality of optical films or optical layers whose directivity axes for a parallel light transmittance are shifted successively.

The optical film or optical layer may be a hologram.

To solve the problems described above, the present invention provides an EL display apparatus, as the Mode 2, an EL display apparatus based on an EL device comprising a plurality of EL elements, each element comprising a pair of electrodes opposing each other across an organic layer including a light emitting layer, arranged in a matrix pattern on one surface of a transparent substrate so as to power EL elements individually, and at least one electrode of the pair of electrodes located on the transparent substrate side comprises an optically transparent electrode such that a light emitted from a light emitting layer energized is emitted towards the transparent substrate; wherein an optical device is provided between the transparent substrate and transparent electrode so as to scatter and/or diffract at least a portion of the light from the light emitting layer, injected into the transparent electrode and forming a range of angles to cause repeated total reflection at the exit face, for output to the transparent substrate while weakly scattering and/or transmitting the light injected into the transparent electrode with another range of angles for output to the transparent substrate, and further, the optical device scatters and/or diffracts at least a portion of the light injected into the transparent substrate and forming such a range of angles to cause repeated total reflection at the exit face for external output through the transparent substrate, while weakly scattering and/or transmitting the light injected into the transparent substrate and forming another range of angles at the exit face for external output through the transparent substrate.

According to the present EL display apparatus, because an EL device in Mode 3 having an improved frontal brightness is used in the EL display apparatus, the display viewed from the frontal direction (normal direction and its vicinity) appears bright so that its display quality is improved. Also, in the present invention, by considering that the EL device is being applied to an EL display apparatus, the optical device is optimally located so that clear images are obtained by eliminating blurring caused by parallax Also, such an EL display apparatus does not need a separate illumination device so that, compared with liquid crystal display devices that require illumination, apparatus thickness can be reduced.

Also, because the light appearing on the optical device side of the EL display apparatus is generated in the light emitting layer, images produced by the light emitting elements provide a wider angle of view compared with the images produced by liquid crystal display apparatus. Further, this EL display apparatus provides higher response speed compared with liquid crystal display apparatus.

In an EL display device in Mode 2, a red-light-emitting element, a green-light-emitting element and a blue-light-emitting element may be provided.

By providing such an EL display apparatus, frontal images (normal direction and its vicinity) appear clearly and a full-color EL display nay be enabled. In the full-color EL display apparatus also, the optical device is optimally located so that clear images are obtained by eliminating blurring caused by parallax.

In such an EL display apparatuses described above, a phase plate (λ4) and a polarizing plate, may be provided successively from an optical device side, on a surface of the transparent substrate opposite to the optical device.

If the phase plate and the polarizing plate are not provided, when the non-transparent electrode and the transparent electrode are placed in opposition and the former is made of a reflective material such as aluminum, and when the surrounding light is intense (bright), the surrounding light is reflected by the non-transparent electrode such that black display cannot be recognized. In the present EL display apparatus, because the phase plate and the polarizing plate are provided, when the surrounding light is intense (bright), the surrounding light is circularly polarized when it is transmitted the first time through the phase plate, and this light is reflected at the electrode and is output as circularly polarized light in the reverse direction, and because this circularly polarized light in the reverse direction is not transmitted through the polarizing plate, black display can be observed.

To resolve the problems described above, the present invention provides an EL illumination apparatus, in Mode 2, based on an EL device comprising an EL element comprising a pair of electrodes opposing each other across an organic layer including a light emitting layer, arranged on one surface of a transparent substrate so as to power the EL element, and at least one electrode of the pair of electrodes located on the transparent substrate side comprises an optically transparent electrode such that a light emitted from a light emitting layer energized is emitted towards the transparent substrate; wherein an optical device is provided between the transparent substrate and the optically transparent electrode so as to scatter and/or diffract at least a portion of the light from the light emitting layer, injected into the transparent electrode and forming a range of angles to cause repeated total reflection at the exit face, for output to the transparent substrate while weakly scattering and/or transmitting the light injected into the transparent electrode and forming another range of angles at the exit face for output to the transparent substrate, and further, the optical device scatters and/or diffracts at least a portion of the light injected into the transparent substrate and forming a range of angles to cause repeated total reflection at the exit face for external output through the transparent substrate, while weakly scattering and/or transmitting the light injected into the transparent substrate and forming another range of angles at the exit face for external output through the transparent substrate.

According to such an EL illumination apparatus, because the EL device in Mode 4 is used, the frontal brightness is improved.

An El illumination apparatus in Mode 2 may comprise at least one of a red-light-emitting element, a green-light-emitting element, a blue-light-emitting element, and a white-light emitting element.

According to such an EL illumination apparatus, depending on the EL element chosen, or the combination of EL elements chosen, red-, green-, blue-, or white-light or any other color-light can be delivered efficiently to the viewer to provide an EL illumination apparatus having improved frontal brightness.

Also, an EL illumination apparatus may comprise a blue-light-emitting element, and a means is provided between an optically transparent electrode and an optical device, or between an optical device and a transparent substrate, or on a surface of the transparent substrate opposite to the optical device for wavelength converting of a blue light emitted from the light emitting layer.

Such an EL illumination apparatus delivers white-light efficiently and provides improved frontal brightness.

To resolve the problems described above, the present invention provides a liquid crystal apparatus, in Mode 2, comprising a liquid crystal panel having a pair of substrates and a liquid crystal layer held between the pair of substrates, and an EL illumination apparatus of the present invention of the above constitution on a side opposite to the liquid crystal layer of the one substrate of the liquid crystal panel. The liquid crystal panel may have a semi-transparent reflective layer on a liquid crystal layer side of the one substrate.

According to such a liquid crystal apparatus, clear images are obtained and the image quality is improved, because the EL illumination apparatus of the present invention having improved frontal brightness is provided.

To resolve the problems described above, the present invention provides, in Mode 2, an electronic device having a display means based on a liquid crystal apparatus provided with an EL display apparatus in Mode 2 or an EL illumination apparatus in Mode 2.

Such an electronic device produces superior image quality because it is provided with an EL display apparatus or a liquid crystal apparatus provided with an EL illumination apparatus of the present invention that provides clear display and superior image quality.

DESCRIPTION OF THE PREFERRED EMBODIMENTS

Preferred embodiments will be explained in the following with reference to the drawings.

In the following, the surface at which light exits, or at which light would exit if it did not encounter the face at an angle not less than the critical angle, is called the "exit face".

Embodiment 1 of EL Display Apparatus

Figure 1:
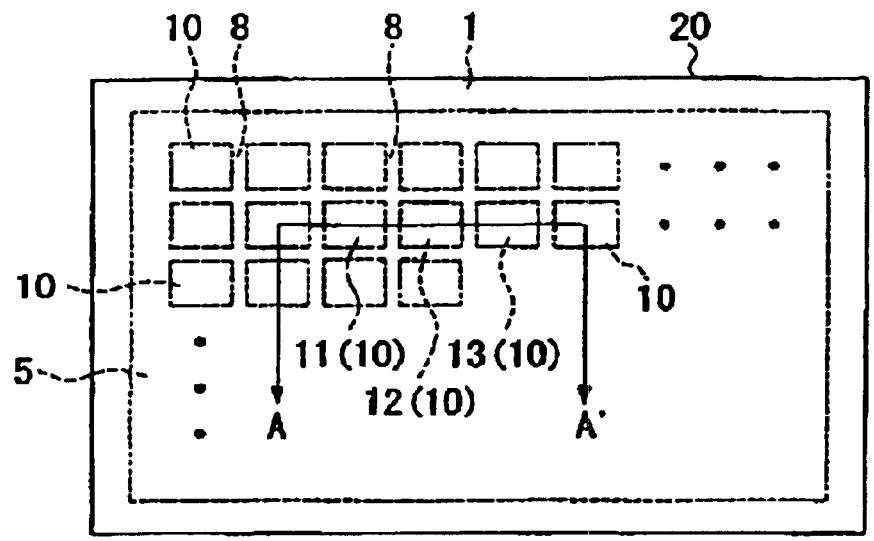
FIG. 1 is a plan view of an EL display apparatus in Embodiment 1, having the EL device of the present invention, seen from the substrate side.
Figure 2:
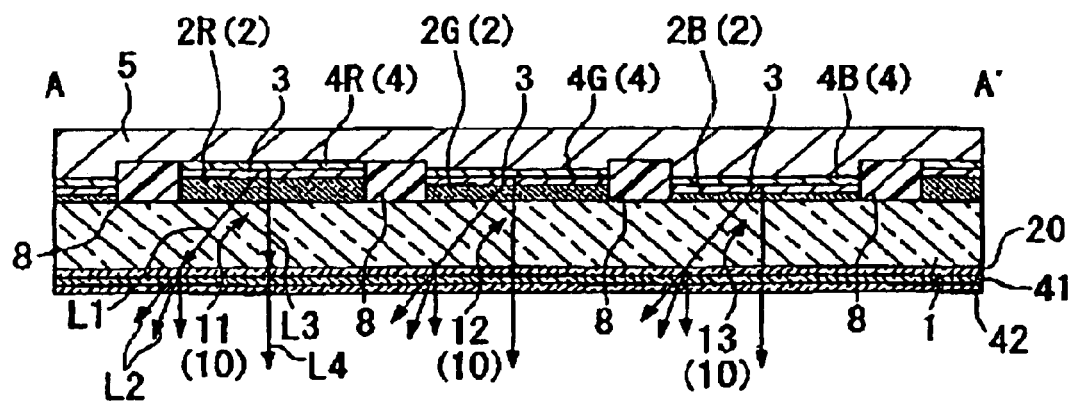
FIG. 2 is a schematic cross section view through a plane A–A' in FIG. 1 of a portion of the EL display apparatus.
Figure 3:
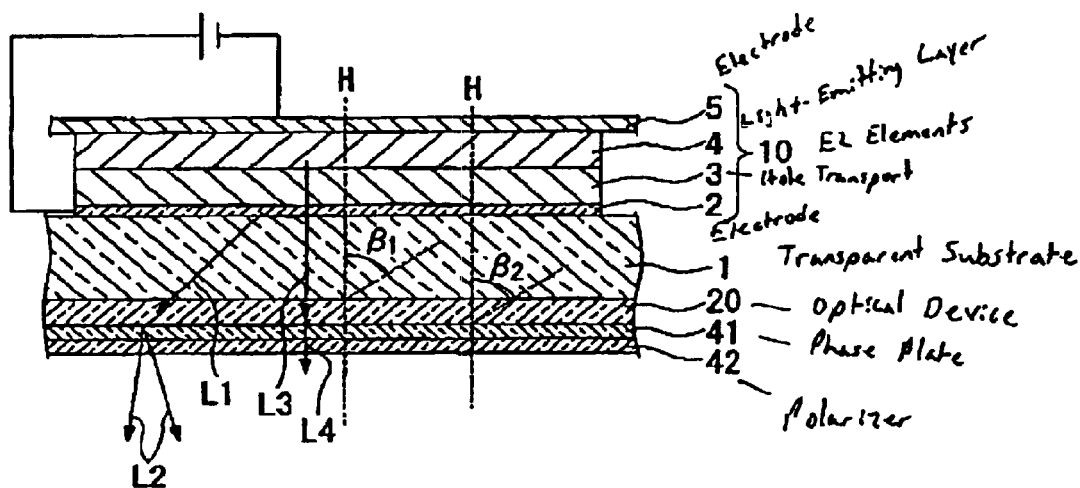
FIG. 3 is a schematic enlarged cross sectional view of the essential parts of the EL display apparatus in FIG. 1 represented by one EL element and its vicinity.

FIG. 1 shows a plan view seen from the substrate side of an EL display apparatus based on the EL device of the present invention. FIG. 2 is a schematic cross sectional view of a portion of the EL display apparatus through a plane A–A' in FIG. 1. FIG. 3 is a schematic enlarged cross sectional view of the essential parts of the EL display apparatus in FIG. 1, represented by one EL element of the plurality of EL elements and its vicinity.

In FIGS. 1 and 2, reference numeral 1 relates to an (optically) transparent substrate such as glass. On one surface of the transparent substrate 1 are EL elements 10 having a light emitting layer 4 disposed between a pair of opposing electrodes 2 and 5 arranged in a matrix pattern for generating either red, green, or blue which can be powered individually by mutually intersecting electrodes 2 and 5 arranged in a lattice form. Of the two electrodes 2 and 5, the electrode 4 disposed nearer to the transparent substrate 1 is an optically transparent electrode.

Around each of the plurality of EL elements 10 are provided isolation walls 8, made of black resin resist and the like, for isolation of the adjacent EL elements 10. In the EL display apparatus shown in FIGS. 1 and 2, EL elements 10 are referred to by different reference numerals such that red-light-emitting elements are designated by 11 in the light emitting layer 4R, green-light-emitting elements are designated by 12 in the light emitting layer 4G; and blue-light-emitting elements are designated by 13 in the light emitting layer 4B.

An optical device 20 is provided on the other surface (surface opposite to the side having the plurality of EL elements 10) of the transparent substrate 1. The optical device 20 scatters and/or diffracts the light, emitted from each light emitting layer and injected into the transparent substrate 1, which light results in repeated total reflection, for external output, and to weakly scatter and/or transmit other light for external output. The structure and action of the optical device 20 will be explained in detail later.

As shown in FIG. 2, on the side opposite to the transparent substrate 1 of the optical device 20 are provided successively a phase plate (λ/4 plate) 41 and a polarizing plate 42 starting from the optical device 20 side. Here, the phase plate (λ/4 plate) 41 and the polarizing plate 42 are omitted from FIG. 1.

Green light emitting element 12 comprises successive lamination of transparent electrode 2G comprising ITO film, a hole transport layer 3 for facilitating injection of holes from the transparent electrode 2G, light emitting layer 4G comprising an EL material, and a metal electrode 5, in such a way that the transparent electrode 2G and the metal electrode 5 are opposite to each other across the light emitting layer 4G.

In the EL element 12 shown in FIG. 2, the transparent electrode 20 serves as the anode, and the metal electrode 5 serves as the cathode. Then, by flowing a given magnitude of electrical current to the transparent electrode 2G and the metal electrode 5, green light is generated in the light emitting layer 4G, and the green light from the light emitting layer 4G is transmitted through the transparent electrode 2G and is injected into the transparent substrate 1.

The light injected into the transparent substrate 1 from the light emitting layer reaches the optical device 20, and is acted on by the optical device 20 according to the angle at the exit face of the transparent substrate 1, and is output towards the phase plate 41 to transmit through the phase plate 41 and the polarizing plate 42, and is delivered to the viewer from the bottom side of the EL display apparatus shown in FIG. 2. The action of the optical device 20 will be explained in detail later.

In the EL element 12 shown in FIG. 2, the film thickness of transparent electrode 20 is constructed to be 150±20 nm.

Hole transport layer 3 may be served by conventional materials used for hole transport including such triphenyl amine derivatives as: 4,4-bis (m-triphenyl amino) biphenyl (TPD); 4,4-bis [N-(1 naphtyl)-N-phenyl amino]biphenyl (α-NPD); 4,4',4"-tris[N-(3 methylphenyl)-N-phenyl amino] triphenyl amine (m-MTDATA) and the like; as well as polyvinylcarbazole; and polyethylene dioxythiophene. The material that can be used for hole transport layer 3 may comprise one material or several kinds of such materials.

The light emitting layer 4G may be made of organic EL materials used for green light emission in the conventional light emitting layer, including preferably such EL materials as quinacrydon and its derivatives. The material that can be used for light emitting layer 4 may comprise one material or several kinds of such materials.

Materials for metal electrode 5 include conventional materials used for metal electrodes, for example, aluminum, silver, silver alloys, magnesium, and the like.

The red-light emitting EL element 11 and blue-light emitting EL element 13 differ from the green-light emitting EL element 12 in the film thickness of transparent electrode 4 and the material used in the light emitting layer 4.

In the red-light emitting EL element 11, the film thickness of the transparent electrode 2R is constructed to be 180±20 nm.

The light emitting layer 4R may be served by organic EL materials used for red light emission in the conventional light emitting layer, including preferably such EL materials as rhodamine and its derivatives. The material that can be used for light emitting layer 4R may comprise one material or several kinds of such materials.

In the blue-light emitting EL element 13, the film thickness of the transparent electrode 2B is constructed to be 120±20 nm.

The light emitting layer 4B may be made of organic EL materials used for blue light emission in the conventional light emitting layer, including preferably such EL materials as distyrylbiphenyl and its derivatives, coumarin and its derivatives, and tetraphenyl butadiene and its derivatives. The material that can be used for light emitting layer 4B may comprise one material or several kinds of such materials.

Next, the structure and action of the optical device 20 provided in the EL display apparatus will be explained in detail in the following.

The optical device 20, as shown in FIGS. 2 and 3, is constructed so that at least a portion of the light L1, emitted from the light emitting layer 4 (light emitting layers 4R, 4G, 4B) and injected into the transparent substrate 1 that causes repeated total reflection, is output externally by scattering and/or diffracting, while the other light L3 is weakly scattered and/or transmitted externally (in this embodiment, towards the phase plate 41).

In this EL display apparatus, when a pair of electrodes 2, 5 are energized, the light generated in the light emitting layer 4 is emitted towards the transparent substrate 1 and is input into the transparent substrate 1; however, light L1 which is a portion of the light emitted from the light emitting layer 4 and is injected into the transparent substrate 11 and forms an angle that causes repeated total reflection at the exit face (that is, light injected and forming a wide angle, i.e., not less than the critical angle at the exit face) reaches optical device 20, and is scattered and/or diffracted in the optical device 20 and is output towards the phase plate 41, and the light L2, scattered and/or diffracted and transmitted through the phase plate 41 and the polarizing plate 42, and is output externally from the lower portion of the EL display apparatus shown in FIG. 2.

In the meantime, another light portion L3 of the light emitted from the light emitting layer 4 and injected into the transparent substrate 1 (that is, light injected and forming a narrow angle, i.e., less than the critical angle at the exit face) also reaches optical device 20, and is weakly scattered and/or transmitted in the optical device 20, and is output towards the phase plate 41, and is transmitted through the phase plates 41 and the polarizing plate 42 for external output from the lower portion of the EL display apparatus shown in FIG. 2.

Figure 4:
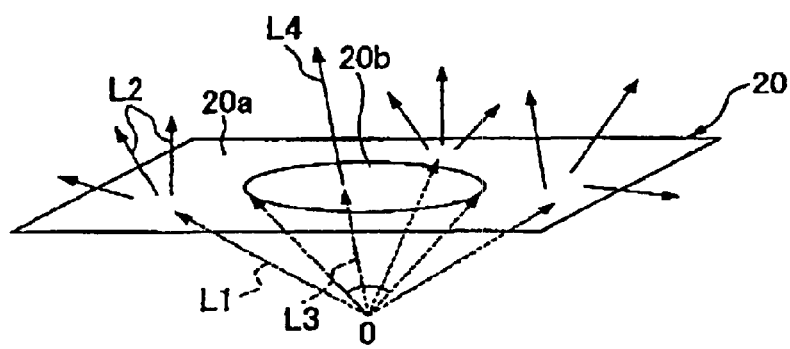
FIG. 4 is a schematic diagram of the action of an optical device provided in the EL display apparatus in FIG. 1.

Another specific example of the optical device 20 includes a device that scatters at least a portion of the wide-angle-light L1 (not less than the critical angle at the exit face), emitted from each light emitting layer and injected into the transparent substrate 1, for external output, while weakly scattering or transmitting at least a portion of the low-angle-light L3 (less than the critical angle at the exit face) for external output. FIG. 4 illustrates the action of the optical device 20 schematically for a light emitted from a point source O, and the encircled region 20b (not including the circumference) relates to the light entering into the transparent substrate 1 provided with a less-than-critical-angle and the region 20a (including circumference) which is outside the circular region 20b, relates to the light entering into the transparent substrate 1 provided with a not-less-than-critical-angle. As shown in FIG. 4, the optical device 20 produces an effect of scattering that portion of the light emitted from the point source O and entering the not-less-than-critical-angle region 20a to be output in a direction opposite to the point source O, and produces an effect of weak scattering or transmitting that portion of the incident light emitted from the point source O and entering the less-than-critical-angle region 20b to be output in a direction opposite the point source O.

Therefore, the optical device 20 scatters portion L1 of the incident light emitted from the light emitting layer 4 and injected into the transparent substrate 1 and forming a not-less-than-critical-angle at the exit face for delivery to the viewer, and to weakly scatter or transmit (without scattering) the portion L3 of the light injected and forming a less-than-critical-angle at the exit face for delivery to the viewer. Consequently, total reflection can be prevented while permitting little scattering or no scattering for the portion L3 of light injected frontally (normal direction and its vicinity), thereby improving frontal brightness.

Also, a specific example of the optical device 20 includes a device that diffracts at least a portion L1 of the light injected into the transparent substrate 1 from the light emitting layer 4 and forming a not-less-than-critical-angle for external output, and transmits the light portion L3 of the light and injected into the transparent substrate 1 from the light emitting layer 4 and forming a less-than-critical-angle at the exit face for external output.

Figure 5:
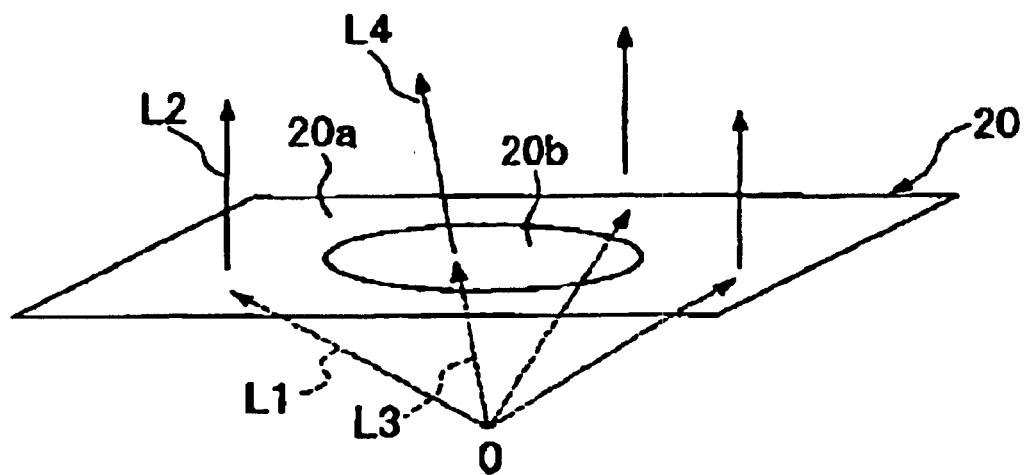
FIG. 5 is a schematic diagram of another action of an optical device provided in the EL display apparatus in FIG. 1.

FIG. 5 is a schematic diagram to illustrate the action of the optical device 20, such that in the region 20b (excluding circumference), the light injected into the transparent substrate 1 is within the critical-angle at the exit face, and in the region 20a (including the circumference), the light injected into the transparent substrate 1 is not less than the critical angle at the exit face. As shown in FIG. 5, the optical device 20 produces an effect to diffract incident light injected through the region 20a at a not-less-than-critical-angle to be output in a direction opposite to the point source O, and to transmit the incident light injected through the region 20b at a less-than-critical-angle to be output in a direction opposite the point source O.

Therefore, the optical device 20 diffracts at least a portion L1 of the light emitted from the light emitting layer 4 and injected into the transparent substrate 1 and forming a not-less-than-critical-angle at the exit face for delivery to the viewer, and a portion L3 of the light injected and forming a less-than-critical-angle is transmitted for delivery to the viewer, so that total reflection can be prevented while transmitting the frontal portion of the incident light (normal direction and its vicinity), thereby improving the frontal brightness.

Also, another example of the optical device 20 includes a device that scatters and diffracts at least a portion L1 of the light emitted from the light emitting layer 4 and injected into the transparent substrate land forming at a not-less-than-critical-angle at the exit face for external output, while the light L3 injected and forming a less-than-critical-angle is weakly scattered and/or transmitted for external output. This optical device 20 combines the effects explained above with reference to FIGS. 4 and 5.

Therefore, the optical device 20 scatters and diffracts at least a portion L1 of the light emitted from the light emitting layer 4 and injected into the transparent substrate 1 and forming a not-less-than-critical-angle at the exit face to be delivered to the viewer, and a portion L3 of the light injected and forming a less-than-critical-angle at the exit face is weakly scattered and/or transmitted to be delivered to the viewer. Consequently, total reflection can be prevented while permitting the frontal portion of the injected light (normal direction and its vicinity) to scatter minimally and/or to transmit so as to improve the frontal brightness.

Also, another example of the optical device 20 includes a device that scatters and/or diffracts at least a portion of the light emitted from the light emitting layer 4 and injected into the transparent substrate 1 that satisfies a condition $\beta1 \geq \sin^{-1}(1/m1)$, (where $\beta1$ refers to an inclination angle of the incident light from the normal direction H of the transparent substrate 1, the index of refraction of air is 1, and m1 refers to the refractive index of transparent substrate 1) for external output, while incident light that satisfies a condition $\beta1 < \sin^{-1}(1/m1)$ is weakly scattered and/or transmitted for external output.

The value of $\beta1$ for the incident light of not-less-than-critical-angle to the normal direction H of the transparent substrate 1 can be computed from the Snell's law (n1 sin $\theta1$=n2 sin $\theta2$), and by knowing that n1=m1, and that the refractive index of air is 1 so that n2=1, $\theta1=\beta1$, and, when the incident light is at the critical angle so that transmitted light becomes parallel to the surface of the transparent substrate 1, $\theta2$ to the normal direction H is 90 degrees, the condition $\beta1 \geq \sin^{-1}(1/m1)$ can be compute Therefore, if the optical device 20 scatters and/or diffracts at least a portion of incident light emitted from the light emitting layer 4 and injected into the transparent substrate 1 that satisfies the condition $\beta1 \geq \sin^{-1}(1/m1)$, and weakly scatters and/or transmits incident light that satisfies the condition $\beta1 < \sin^{-1}(1/m1)$, then, at least a portion L1 of the injected light, emitted from the light emitting layer 4 and injected into the transparent substrate 1 and forming a wide angle (not less than the critical angle) at the exit face to cause repeated total reflection, can be scattered and/or diffracted for external output, while other light portion L3 injected into the transparent substrate 1 and forming a narrow angle (less than the critical angle) at the exit face is weakly scattered and/or transmitted for external output.

Figure 11:
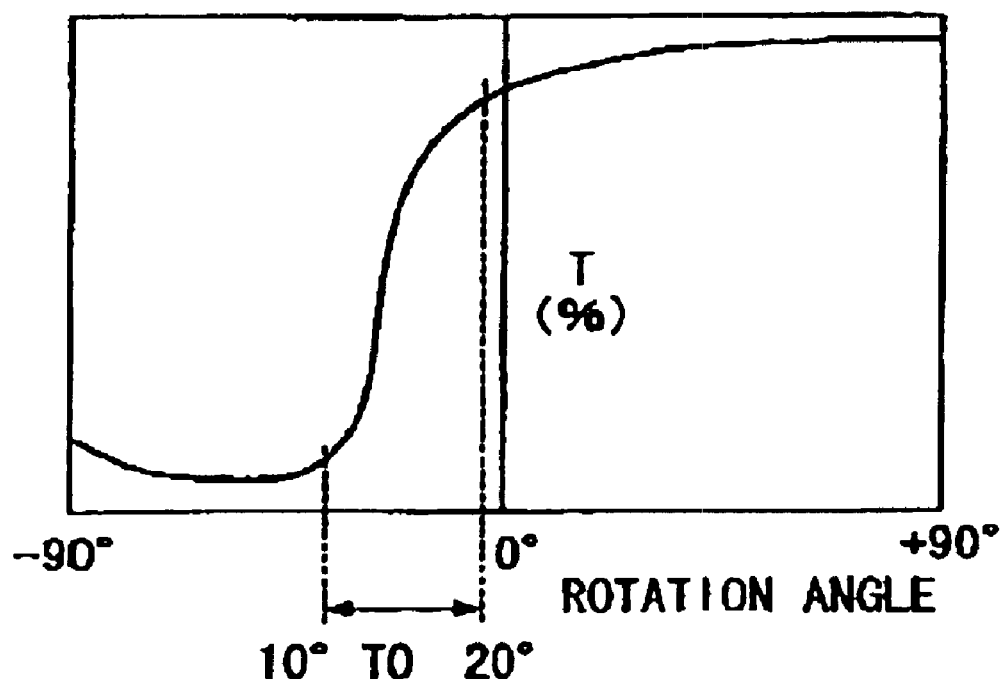
FIG. 11 is a diagram to show the scattering and/or diffracting characteristics of the optical device provided in the EL display apparatus in an embodiment of the present invention.

However, the optical device 20 exhibits a transition behavior of the injected light from a scattering and/or diffracting state to a weak scattering and/or transmitting state to occur over a range of 10 to 20 degrees, as shown in FIG. 11. Therefore, it is preferable to optimize the optical device 20 in such a way that the light that enters the transparent substrate 1 and forming an angle within a range of 10 degrees of the critical angle at the exit face can also be scattered or diffracted. In FIG. 11, the horizontal axis relates to the rotation angle (the inclination angle) of the optical device 20 and the vertical axis relates to the parallel beam transmittance T (in %).

Figure 7:
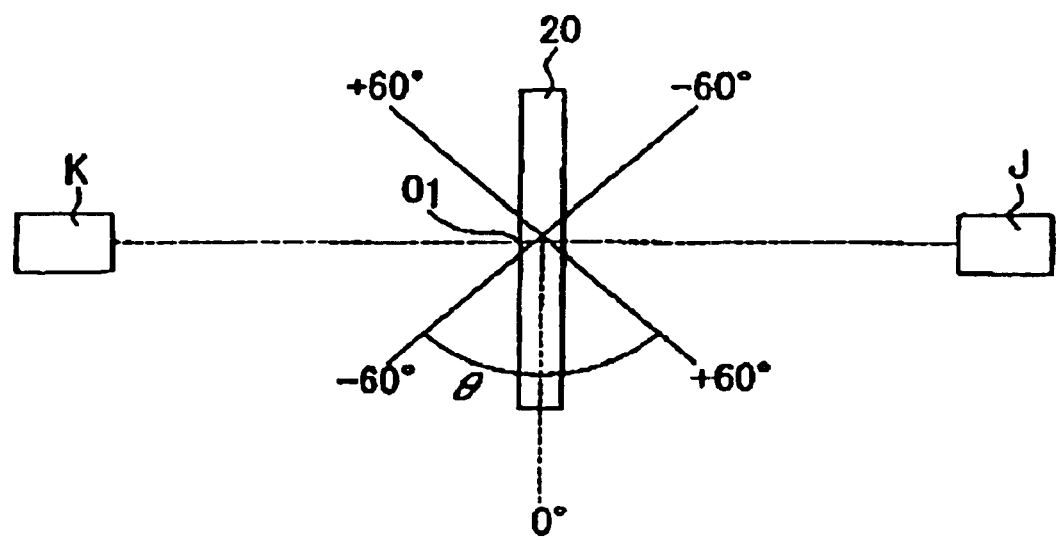
FIG. 7 is a diagram explaining the positions of the optical device, light source and light receiving section in measuring a parallel light transmittance.

The parallel beam transmittance is determined as shown in FIG. 7. In measuring the transmittance, incident light is emitted from a light source (light from the light emitting layer) K placed on the left of the optical device and is directed at the origin O1 in the center section, and the light transmitted straight through the optical device 20 is measured by a light receiving section such as a photosensor J. The optical device 20 was tilted during the measurement process so that the incident light was emitted from the light source K and input into optical device 20 positioned at various inclination angles and transmitted through the origin O1 of the optical device 20, and was received straight through in the light receiving section J for measurement of intensity. In FIG. 7, 0° refers to a perpendicular position of the optical device 20 with respect to the straight line that connects the light source K and the photosensor J, and the angle of inclination is designated as "+" for the clockwise direction of rotation and "−" for the anti-clockwise direction of rotation.

Figure 8:
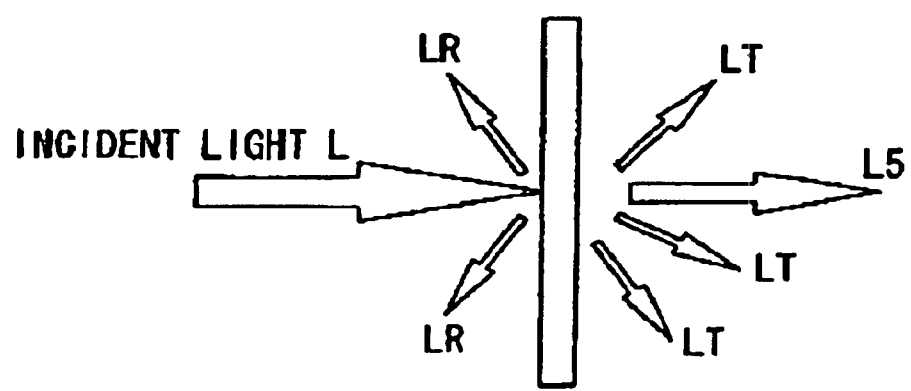
FIG. 8 is a diagram to explain the relation of the incident light injected into the optical device, parallel transmitted light, scattered transmitted light and back scattering light and front scattering light.

When the incident light L emitted from one surface side of the optical device 20 (left side in FIGS. 7 and 8) is transmitted through the optical device 20 and exits from the other surface side of the optical device 20 (right side in FIGS. 7 and 8), the light scattered from the one surface side (left side) is termed "back scattering light LR", and the light transmitted through the optical device 20 is termed "front scattering light". Then, regarding the front scattering light that is transmitted through the optical device 20, the parallel light transmittance T to indicate the optical power of front scattering light (parallel transmitted light) L5 propagating in the same direction as the propagation direction of the incident light L within ±2 degrees, is defined as a ratio of the transmitted power to the optical power of the incident light L, and further, the dispersive light transmittance to indicate the optical power of front scattering light (dispersive transmitted light) LT radiating at angles greater than ±2° is defined as a ratio of the transmitted power to the optical power of the incident light L, and the total light transmittance is defined as a power ratio of the total transmitted light to the incident light. From these definitions, it is possible to define parallel transmittance T as the difference obtained by subtracting the dispersive transmittance from the total transmittance.

Thus, in FIG. 7, for the angles that show low values of parallel transmittance T, scattering power is strong (scattering) while for the angles that show high values of parallel transmittance T, scattering power is weak (low scattering) and/or transmitted power (parallel transmitted light) is strong, and the transition region from the strong scattering state (scattering) to the weak scattering (low scattering) and/or high transmitted power state occurs over a range from 10 to 20 degrees.

It follows that it is preferable that the optical device 20 scatters and/or diffracts at least a portion of the incident light emitted from the light emitting layer 4 and injected into the transparent substrate 1 that satisfies the condition $\beta 1 \geq \sin^{-1}(1/m1)-10°$, (where $\beta 1$ refers to an inclination angle of the incident light from the normal direction H of the transparent substrate 1, the index of refraction of air is 1, and m1 refers to the refractive index of transparent substrate 1) for external output, while incident light that satisfies the condition $\beta 1 < \sin^{-1}(1/m1)-10°$ is weakly scattered and/or transmitted for external output.

Also, another example of the optical device 20 includes a device that scatters and/or diffracts at least a portion of the incident light emitted from the light emitting layer 4 and injected into the transparent substrate 1 that satisfies the condition $\beta 1 \geq 40°$ (where $\beta 1$ refers to the angle of inclination of the incident light from the normal direction of the transparent substrate 1) for external output while the incident tight that satisfies the condition $\beta 1 = 0°$ is weakly scattered and/or transmitted for external output.

To obtain specific values (approximation values) of the inclination angle $\beta 1$ to the normal direction H of the substrate 1 at the exit face that causes a not-less-than-critical angle for the light injected into the transparent substrate 1, it is permissible to use a glass substrate (refractive index of about 1.54) or a transparent resin including an acrylic resin (refractive index of about 1.49) for the transparent substrate 1, whose refractive index ranges from 1.49 to 1.6 (i.e., n1=1.49 to 1.6), and knowing that the refractive index of air is 1 (n2=1), and incident light entering at the critical angle produces transmitted light parallel to the surface of the transparent substrate 1 so that the angle $\theta 2$ of the transmitted light from normal direction H of the transparent substrate 1 is 90 degrees, and from Snell's law, $\theta 1$ is about 40 degrees. Therefore, the critical angle $\beta 1$ at the exit face of the light injected into the transparent substrates is about 40 degrees. Here, it should be noted that when a glass substrate (refractive index of about 1.54) is used as the transparent substrate 1, the critical angle $\beta 1$ is 40.5 degrees.

Therefore, if the optical device 20 scatters and/or diffracts at least a portion of incident light emitted from the light emitting layer 4 and injected into the transparent substrate 1 that satisfies the condition $\beta 1 \geq 40°$ at the exit face, and weakly scatters and/or transmits incident light that satisfies the condition $\beta 1 < 0$, then, at least a portion L1 of incident light, emitted from the light emitting layer 4 and injected into the transparent substrate 1 and forming such a wide angle (not less than critical angle) at the exit face to cause repeated total reflection, can be scattered and/or diffracted for external output, while the light portion L3 injected into the transparent substrate 1 in the normal direction can be weakly scattered and/or transmitted for external output.

Also, it is preferable that the optical device 20 scatter and/or diffract at least a portion of the light emitted from the light emitting layer 4 and injected into the transparent substrate 1 that satisfies the condition $\beta 1 \geq 40°$ at the exit face, (where $\beta 1$ refers to an inclination angle of the incident light from the normal direction of the transparent substrate 1 at the exit face) for external output, while incident light that satisfies the condition $\beta 1 < 40°$ at the exit face is weakly scattered and/or transmitted for external output. If the optical device 20 is a device that can satisfy these conditions, it is able to scatter and/or diffract at least a portion L1 of the injected light, emitted from the light emitting layer 4 and injected into the transparent substrate 1 and forming a wide angle (not less than critical angle) at the exit face to cause repeated total reflection, can be scattered and/or diffracted to be almost wholly output externally, while the light portion L3 injected into the transparent substrate 1 and forming a less-than-critical angle at the exit face can be weakly scattered and/or transmitted for external output.

Also, another example of the optical device 20 includes a device that scatters and/or diffracts at least a portion of the light emitted from the light emitting layer 4 and injected into the optical device 20 via the transparent substrate 1 that satisfies a condition $\beta 2 \geq \sin^{-1}(1/m2)$ at the exit face, (where $\beta 2$ refers to an angle of inclination of the incident light from the normal direction H of the optical device 20, the index of refraction of air is 1, and m2 refers to the refractive index of the optical device 20) for external output, while incident light that satisfies the condition $\beta 2 < \sin^{-1}(1/m2)$ at the exit face is weakly scattered and/or transmitted for external output.

The value of $\beta 2$ for the incident light of not-less-than-critical-angle to the normal direction H of the optical device 20 can be computed from Snell's law (n1 sin $\theta 1$=n2 sin $\theta 2$), and by knowing that n1=m2, and that refractive index of air is 1 so that n2=1, $\theta 1=\beta 2$, and, when the incident light is at the critical angle so that transmitted light becomes parallel to the surface of the transparent substrate 1, $\theta 2$ to the normal direction H of the transparent substrate 1 is 90 degrees, the condition $\beta 2 \geq \sin^{-1}(1/m2)$ can be computed.

Therefore, if the optical device 20 scatter and/or diffract at least a portion of the light emitted from the light emitting layer 4 and injected through the transparent substrate 1 into the optical device 20 that satisfies the condition $\beta 2 \geq \sin^{-1}(1/m2)$ at the exit face, and weakly scatters and/or transmits incident light that satisfies the condition $\beta 2 < \sin^{-1}(1/m2)$ at the exit face, then, at least a portion L1 of incident light, emitted from the light emitting layer 4 and injected through the transparent substrate 1 into the optical device 20 and forming such a wide angle (not less than the critical angle) at the exit face to cause repeated total reflection, can be scattered and/or diffracted for external output, while other light portion L3 injected into the optical device and forming a narrow angle (less than the critical angle) at the exit face can be weakly scattered and/or transmitted for external output.

Also, as described earlier, the transition region of the incident light injected into the optical device 20 to change from the scattering and/or diffracting state to the low diffracting state occurs over a range of 10 to 20 degrees, so that it is preferable to optimize the optical device 20 so that incident light injected through the transparent substrate 1 into the optical device 20 within an angle 10 degrees of the critical angle can also be subjected to scattering and/or diffracting.

It follows that it is preferable that the optical device 20 scatter and/or diffract at least a portion of the incident light emitted from the light emitting layer 4 and injected into the optical device 20 through the transparent substrate 1 that satisfies the condition $\beta 2 \geq \sin^{-1}(1/m2)-10°$ at the exit face, (where $\beta 2$ refers to an angle of inclination of the incident light from the normal of the optical device 20, the index of refraction of air is 1, and m2 refers to the refractive index of the optical device 20) for external output, while incident light that satisfies the condition $\beta 1 < \sin^{-1}(1/m1)-10°$ is weakly scattered and/or transmitted for external output.

Also, another example of the optical device 20 includes a device that scatters and/or diffracts at least a portion of the incident light emitted from the light emitting layer 4 and injected into the optical device 20 through the transparent substrate 1 that satisfies the condition $\beta 2 \geqq 40°$ at the exit face (where $\beta 2$ refers to the angle of inclination from the normal direction H of the optical device 20) for external output while the incident light that satisfies the condition $\beta 2=0°$ at the exit face is weakly scattered and/or transmitted for external output.

To obtain specific values (approximation values) of the inclination angle $\beta 2$ of an incident light to the normal direction H of the optical device 20 that causes a not-less-than-critical angle for the incident light injected from the light emitting layer 4 into the optical device 20 through the transparent substrate 1, by knowing that the optical device 20 has an average refractive index of about 1.57 (n1~1.57) and that the refractive index of air is 1 (n2=1), and incident light entering at the critical angle produces transmitted light parallel to the surface of the optical device 20 when $\theta 2$ is 90 degrees, and from Snell's law, $\theta 1$ is 39.6°, which is about 40 degrees, and therefore, the critical angle $\beta 2$ of the light injected into the optical device 20 is about 40 degrees.

Therefore, if the optical device 20 scatters and/or diffracts at least a portion of incident light emitted from the light emitting layer 4 and injected into the optical device 20 through the transparent substrate 1 that satisfies the condition $\beta 2 \geqq 40°$ at the exit, and weakly scatters and/or transmits incident light that satisfies the condition $\beta 2=0°$, then, at least a portion L1 of incident light, emitted from the light emitting layer 4 and injected into the optical device 20 through the transparent substrate 1 at such a wide angle (not less than the critical angle) at the exit face to cause repeated total reflection, can be scattered and/or diffracted for external output while the light portion frontally injected (normal direction) can be weakly scattered and/or transmitted for external output.

Also, it is preferable that the optical device 20 scatter and/or diffract at least a portion of the incident light emitted from the light emitting layer 4 and injected into the optical device 20 through the transparent substrate 1 that satisfies the condition $\beta 2 \geqq 40°$, (where $\beta 2$ refers to an angle of inclination of the incident light from the normal direction H of the optical device 20) for external output, while incident light that satisfies the condition $\beta 2<40°$ to be weakly scattered and/or transmitted for external output. If the optical device 20 is a device that can satisfy these conditions, it is able to scatter and/or diffract at least a portion L1 of incident light, emitted from the light emitting layer 4 and injected into the optical device 20 through the transparent substrate 1 and forming such a wide angle (not less than the critical angle) to cause repeated total reflection, can be scattered and/or diffracted to be almost wholly output externally, while the light portion L3 forming less than the critical angle can be weakly scattered and/or transmitted for external output.

In the present invention, scattering includes front scattering of the light that is injected into the transparent substrate or optical device and forming a wide angle (angle not less than the critical angle) at the exit face and is transmitted through the transparent substrate or optical device in the propagation direction to radiate out at an angle exceeding ±2°, which are termed dispersive transmitted light, as well as front scattering of the light that transmits through in the propagation direction within the deviation angle of ±2°, which is termed parallel transmitted light. One or both of these modes of transmission are included in the term, scattering.

Scattering refers to those cases of scattering exhibiting a haze value not less than 50%, and weak scattering refers to those exhibiting a haze value not more than 20%.

Also, diffraction refers to a phenomenon of changes in the direction of output light with respect to the direction of propagation of the light injected and forming a wide angle (not less than the critical value) at the exit face into the transparent substrate or optical device.

Transmission of light refers to a phenomenon of front scattering (parallel transmitted light) of the light injected into the transparent substrate or optical device and forming a narrow angle (less than the critical angle) at the exit face to propagate in the same direction within a deviation angle of less than ±2°.

As described above, the refractive index m1 of the transparent substrate 1 is 1.46 to 1.6, and the refractive index m2 of the optical device 20 is about 1.57 (average refractive index) so that the refractive index m1 of the transparent substrate 1 and the refractive index m2 of the optical device 20 are the same value or substantially the same value.

It is preferable that the refractive index m1 of the transparent substrate 1 and the refractive index m2 of the optical device 20 satisfy a relationship $m1 \leqq m2$ so that the light emitted from the light emitting layer 4 and injected into the transparent substrate 1 will not exhibit total reflection to enable to efficient delivery of the light emitted from the light emitting layer 4 externally (to the viewer).

Also, the optical device 20 may be a device to output externally the light emitted from the light emitting layer 4 and injected into the transparent substrate 1 and forming not-less-than-critical angle at the exit face at a haze value not less than 50%, and output externally the light injected and forming less-than-critical angle at the exit face at a haze value lower than 20%. Haze values are a measure of transmission used in the field of optics, and are values in % obtained by dividing the dispersive transmittance, explained above with reference to FIG. 8, by the total light transmittance, and defines a concept that is totally different from the parallel transmittance. The larger the haze value the stronger (more intense) the front scattering light (dispersive transmitted light); the smaller the haze value the stronger (more intense) the parallel transmitted light.

If the optical device 20 is able to perform in such a way that the light emitted from the light emitting layer 4 and injected into the transparent substrate 1 and forming an angle not less than the critical angle at the exit face is output externally with a haze value higher than 50%, then the light injected and forming a not less than critical angle at the exit face can be output externally due to scattering effects and the like caused by the optical device 20. Also, if the optical device is able to perform in such a way that the light emitted from the light emitting layer 4 and injected into the transparent substrate 1 and forming an angle less than the critical angle at the exit face can be output externally with haze value lower than 20%, then, the light injected and forming less than the critical angle can be transmitted without scattering or travel almost linearly by the optical device and can be output externally. Therefore, when the optical device 20 is provided, the frontal brightness (normal direction and its vicinity) is improved compared with the conventional devices that exhibit equal scattering characteristics in all incident directions, in other words, those optical devices having a scattering layer of isotropic scattering characteristics or those that rely on a roughened surface.

Figure 6:
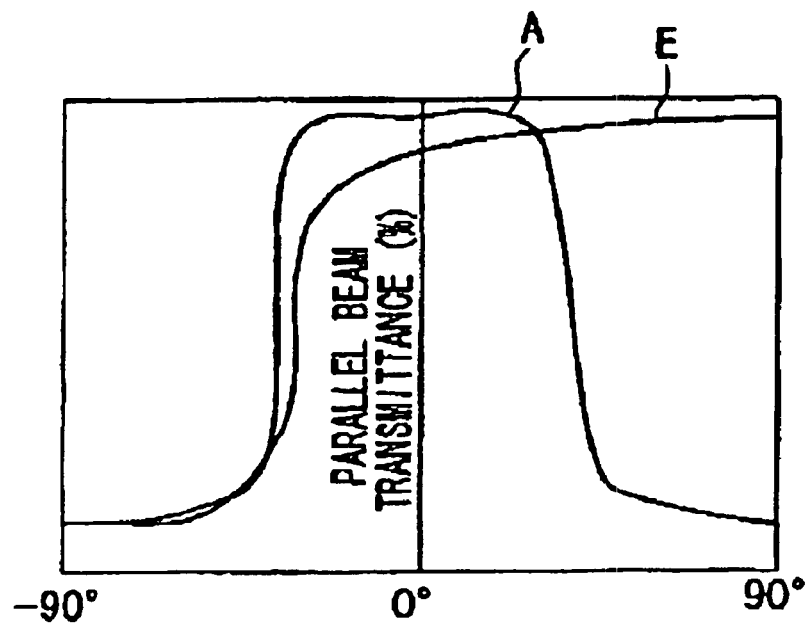
FIG. 6 is a diagram showing optical characteristics of the optical device used in an embodiment of the present invention and an optical film constituting the optical device.

The optical device 20 used in the present embodiment will be further explained in specific detail. For example, the optical device 20 exhibits optical properties such as those illustrated by curve A in FIG. 6, which shows a relationship between the rotation angle (to produce inclination angle) of the optical device 20 plotted on abscissa and the parallel transmittance T (in %) plotted on ordinate. The optical properties shown here were obtained by using the measuring system shown in FIG. 7 in a similar manner. It is possible to produce optical device 20 having such optical properties by laminating a plurality of optical films or a plurality of optical layers.

The front scattering films having directivity disclosed in Japanese Unexamined Patent Application, First Publication, Nos. 2000-35506, 2000-066026, 2000-180607 may be used, as necessary, from the viewpoint of basic structures. For example, as disclosed in the above-noted Japanese Unexamined Patent Application, First Publication, No. 2000-035506, potential optical films include the one comprising a resin sheet comprising a mixture of not less two types of light polymerizable monomers or oligomers of different refractive indexes, which is irradiated with ultraviolet light injected at an angle to the film so that scattering will be strong in a given wide angle direction; or, the online holographic dispersive sheet disclosed in the above-noted Japanese Unexamined Patent Application, First Publication, No. 2000-066026, is made by irradiating a photosensitive material for a hologram to produce local layered regions of differing refractive indexes.

Figure 9:
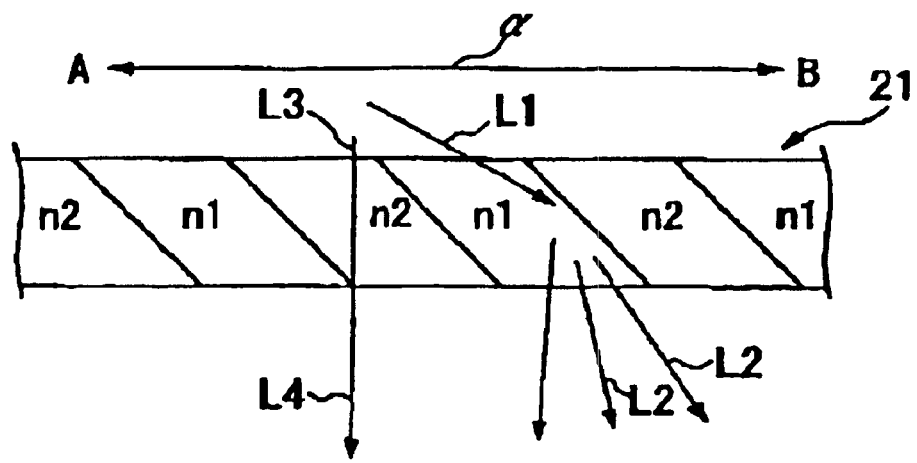
FIG. 9 is a schematic diagram of the cross sectional structure of an optical film, produced by a holographic technique, to constitute the optical device in an embodiment of the present invention.

FIG. 9 shows an example of the schematic cross sectional view of an optical film 21 made by the holographic technique mentioned above.

The optical film 21 has a cross sectional structure in which layers having a refractive index n1 alternate with layers of a refractive index n2 inclined at a given angle.

When the light L1 is injected with a wide angle (not less than critical angle) to the optical film 21, it is scattered and/or diffracted at the boundaries of individual layers of differing refractive indexes, and such rays are output from the opposite side (lower side in the diagram) as scattered or diffracted rays L2. When the light L3 is injected with a narrow angle (less than the critical angle) to the optical film 21, it is weakly scattered and/or transmitted at the boundaries of individual layers of differing refractive indexes, and such rays are output from the opposite side (lower side in the diagram) as weakly scattered or transmitted rays L4.

Optical properties of optical film 21 produced by the holographic technique described above are illustrated by curve E in FIG. 6. The optical properties shown here were obtained by using the measuring system shown in FIG. 7 in a similar manner. The optical properties shown by curve E refer to the properties exhibited along the A-B direction in the optical film 21 shown in FIG. 9, where the A-B direction relates to the directivity axis α of the parallel transmittance.

Figure 10:
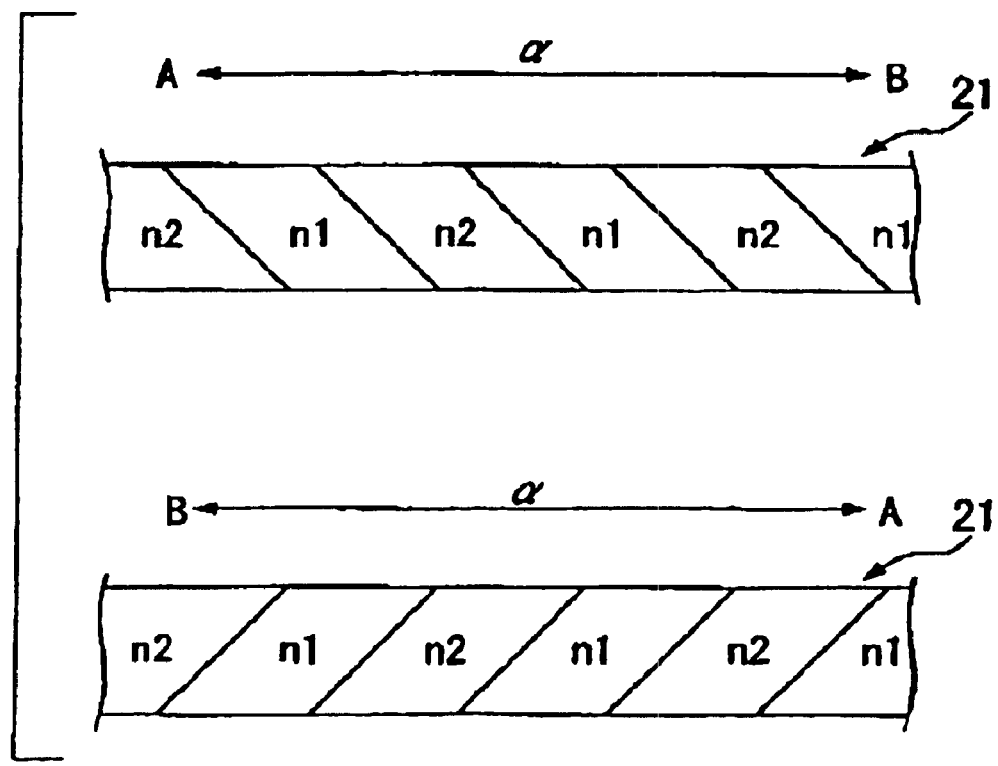
FIG. 10 is a schematic diagram showing a method for producing an optical device based on the optical film produced by the holographic technique shown in FIG. 9

Therefore, to obtain the optical device 20 having the optical properties shown by curve E using optical film 21, a plurality of optical films 21 should be prepared and laminated as shown in FIG. 10 by shifting the directivity axis α of the parallel transmittance for each lamination, and specifically, two such optical films 21 may be laminated so that the directivity axes a of the parallel transmittance are shifted by 180 degrees.

In the present EL display apparatus, by providing the optical device 20 having the structure described above on the other surface of the transparent substrate 1, at least a portion L1 of the light, emitted from the light emitting layer 4 and injected into the transparent substrate 1 and forming such an angle (a wide angle, not less than the critical angle) at the exit face to cause repeated total reflection, is scattered and/or diffracted towards the phase plate 41, and such scattered and/or diffracted light L2 is transmitted through the phase plate 41, polarizing plate 42 for external output Furthermore, other light L3 injected into the transparent substrate 1 and forming an angle (a narrow angle, less than the critical angle) at the exit face is weakly scattered and/or transmitted towards the phase plate 41, and such weakly scattered and/or transmitted light L4 is transmitted through the phase plate 41, and polarizing plate 42 for external output. Therefore, frontal brightness (normal direction and its vicinity) is improved compared with those conventional optical means based on a scattering layer having isotropic scattering characteristics or those that rely on a roughened surface.

That is, the EL display apparatus in the present embodiment is provided with the optical device 20, that scatters and/or diffracts at least a portion L1 of incident light injected and forming a wide angle (not less than the critical angle) at the exit face into the transparent substrate 1 and not to affect or weakly affect light L3 injected and forming a narrow angle (less than the critical angle) at the exit face, on the surface of transparent substrate 1 serving as the support plate for EL element 10, and therefore, not only is total reflection avoided but also frontal output light (normal direction and its vicinity) output is not subjected to scattering so that light generated in the light emitting layer 4 is delivered (emitted) efficiently to the external environment, thus leading to improved brightness.

Therefore, according to the present EL display apparatus, because the frontal brightness is improved, display viewed from the frontal direction (normal direction and its vicinity) appears bright so that its display quality is improved. Also, such an EL display apparatus does not need a separate illumination device, so that compared with liquid crystal display devices that require illumination, apparatus thickness can be reduced. Also, because the light appearing on the optical device 20 side of the EL display apparatus is generated in the light emitting layer, images produced by the light emitting elements provide a wider angle of view compared with the images produced by liquid crystal display apparatus. Further, this EL display apparatus provides higher response speed compared with liquid crystal display apparatuses.

Furthermore, in the present EL display apparatus, because the EL elements 10 comprises red-light emitting EL 11, green-light emitting EL element 12 and blue-light emitting EL element 13, images seen in the frontal direction (normal direction and its vicinity) are bright, and a full-color EL display is provided.

Also, in the present EL display apparatus, because the phase plate (λ/4 plate) 41 and a polarizing plate 42 are provided successively starting from the optical device 20 on the surface of the opposite side to the transparent substrate, when the surrounding light is intense (bright), the surrounding light is circularly polarized when it is transmitted the first time through the phase plate 41, and this light is reflected at the electrode 5 and is output as circularly polarized light in the reverse direction, and because this circularly polarized light in the reverse direction is not transmitted through the polarizing plate 42, black display can be observed.

Here, in the present EL display apparatus, the film thickness of transparent electrode 2R of red-light emitting EL element 11, the film thickness of transparent electrode 2G of green-light emitting EL element 12 and the film thickness of transparent electrode 2B of blue-light emitting EL element 13 are different from each other, but some of the transparent electrode 2 of the light-emitting EL elements 11, 12 and 13 may have the same film thickness, or all of the transparent electrodes 2 may have the same film thickness.

Also, in the present EL display apparatus, although the transparent electrodes 2 comprise ITO, they may comprise indium-zinc-oxide (referred to as IZO below).

Further, red-, green- and blue-light emitting EL elements 11, 12, 13 are not required to have a transparent electrode 2 comprising the same material, so that transparent electrodes containing ITO may be used in conjunction with transparent electrodes containing IZO.

Also, in the present EL display apparatus, an example of the EL element 10 comprises transparent electrode 2, hole transport layer 3, light emitting layer 4, and metal electrode 5, but the EL element used in the present invention is not limited to this example.

Embodiment 1 of Liquid Crystal Display Apparatus

Figure 12A:
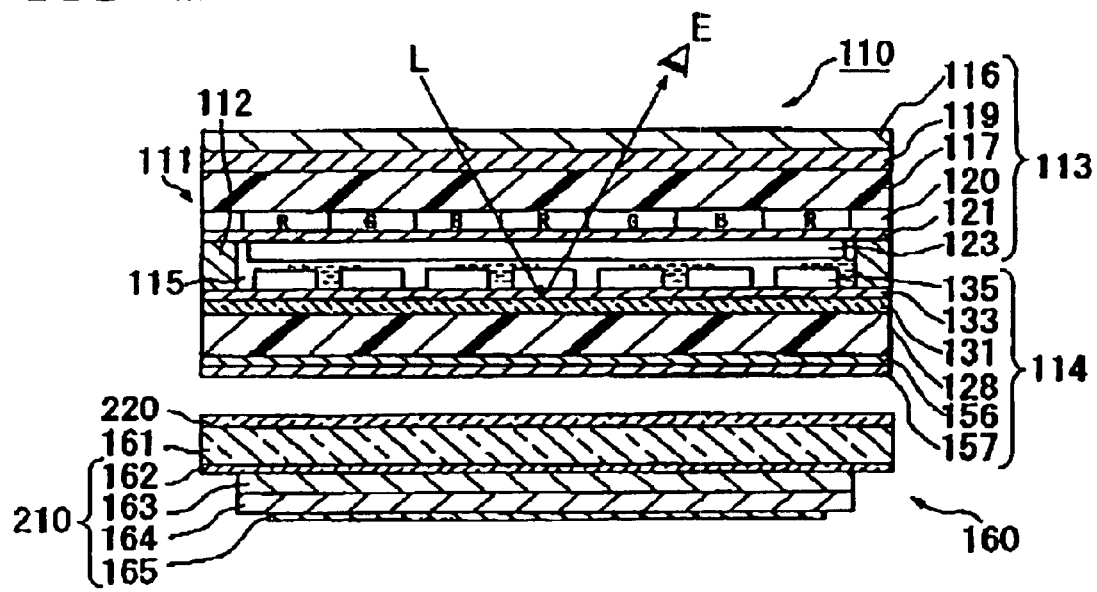
FIGS. 12A and 12B are cross sectional views of a liquid crystal apparatus provided with an EL illumination apparatus based on the EL device of the present invention when used as a reflective type and as a transmission type, respectively.
Figure 12B:
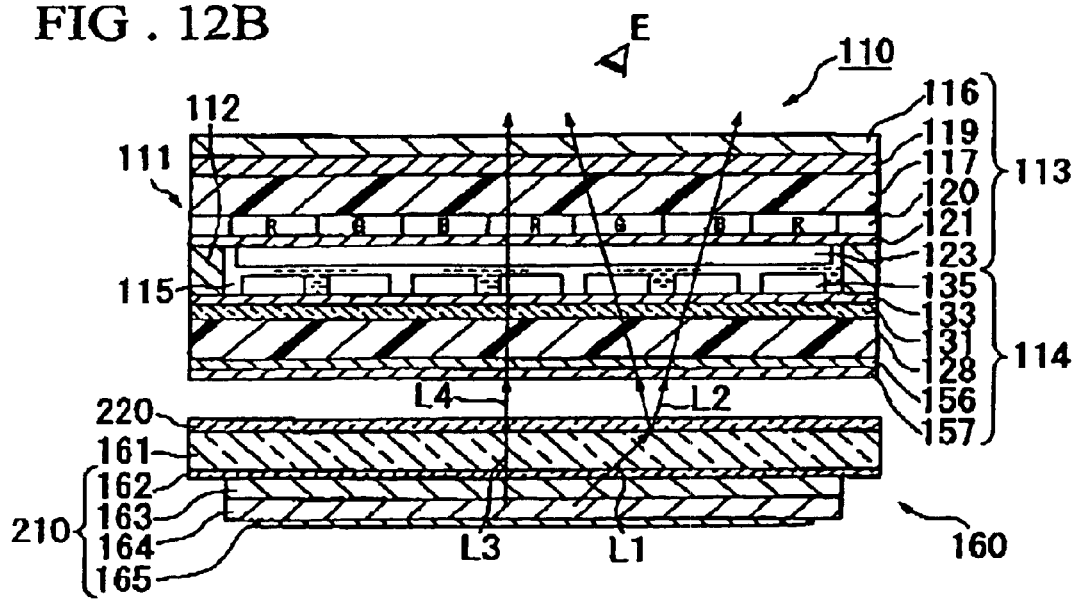
Figure 13:
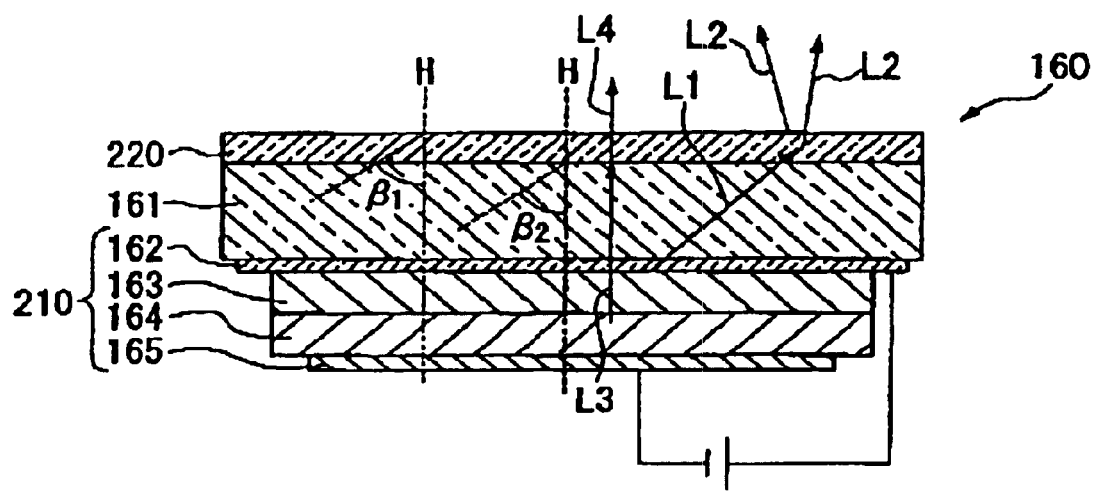
FIG. 13 is a schematic enlarged cross sectional view of the EL illumination apparatus provided in the liquid crystal apparatus shown in FIG. 12.

FIG. 12 show an EL illumination apparatus based on the present EL device, and FIG. 12A is a cross sectional view of an application based on the use of a reflective type device; FIG. 12B is a cross sectional view of an application based on the use of a transmission type device. FIG. 13 is a schematic enlarged diagram of an EL illumination apparatus provided in the liquid display apparatus shown in FIG. 12.

By mounting ancillary elements such as liquid crystal driving IC and support structure to the liquid crystal apparatus 110, a liquid crystal display apparatus (liquid crystal apparatus) can be provided as a finished commercial product.

The liquid crystal apparatus 110 is comprised primarily of a liquid crystal panel 111 comprising a pair of substrate units 113 and 114 of a roughly rectangular shape in its plan view that are attached with respective cell gaps to oppose each other through a ring-shaped sealing member 112; a liquid crystal layer 115 clamped therebetween with the sealing member 112; a phase plate 119 and a polarizing plate 116 provided on the upper surface side of the one substrate unit 113 (upper side in FIG. 12); and a phase plate 156 and a polarizing plate 157 provided on the lower surface side of other substrate unit 114 (lower side in FIG. 12); and an EL illumination apparatus 160 serving as a back-lighting apparatus provided below the liquid crystal panel 111.

The substrate unit 113 of the substrate units 113 and 114 is provided on the front side (upper side) of the apparatus 110 to face the viewer, and the unit 114 is provided on the back side (lower side) opposite to the front side.

The upper-side substrate unit 113 comprises: a transparent substrate 117 made of a transparent material such as glass; a phase plate 119 and a polarizing plate 116 successively formed on the front side (viewer side, upper side in FIG. 12); and a color filter layer 120, and an overcoating layer 121 successively laminated on the back side (i.e., liquid crystal layer 115 side), and a plurality of striped electrode layers 123 for driving the liquid crystal formed on the liquid crystal layer 115 side within the overcoating layer 121.

Liquid crystal layer 115 comprises nematic liquid crystal molecules having a twist angle θt of 240 to 255 degrees.

Here, it should be noted that, in the actual liquid crystal apparatus, an oriented film is formed on the liquid crystal 115 side of the electrode layer 123 and on the liquid crystal layer 115 side of the striped electrode layer 135 on the lower side of the substrate, but such orientation films are omitted in FIG. 12 as in the case of other embodiments to be explained later in turn. In the cross sectional structures shown in FIG. 12 and in succeeding diagrams, the layer thickness are shown not to scale so as to facilitate their viewing.

The driving electrode layer 123 formed on the upper substrate side comprises a transparent electrode material such as ITO in the present embodiment and appears stripe shaped in its plan view, and the number of stripes is matched to the size of the display area and the pixels.

The color layer 120 is provided on the lower surface (i.e., liquid crystal layer 115 side) of the upper substrate 117, in this embodiment, by forming black masking for light blocking and RGB patterns color displaying. Also, an overcoating layer 121 is formed as the transparent planar protective film for RGB patterns. Black masking is formed by such methods as sputtering and vapor deposition to produce metal film patterning using chrome film, for example, of 100 to 120 nm thickness. The RGB patterns comprise a red-color pattern (R), a green color pattern (G) and a blue color pattern (G) that are arranged in a suitable pattern, and are produced by pigment dispersion method, various printing methods, electro-deposition methods, printing methods and dyeing methods for example.

On the other hand, the lower-side substrate unit 114 comprises: a transparent substrate 128 made of a transparent material such as glass, a semi-transparent reflective layer 131 and an overcoating layer 133 successively formed on the front side (upper-side in FIG. 12, i.e., liquid crystal side), a plurality of striped electrode layers 135 formed on the liquid crystal layer 115 side of the overcoating layer 133 and a phase plate 156 and a polarizing plate 157 successively formed on the back side (lower-side in FIG. 12, i.e., opposite side to the liquid crystal layer 115) of the substrate 128. Similarly to the electrode layer 123, a necessary number of strip electrodes are formed according to the size of the display area of the liquid crystal panel 110 and the number of pixels.

Next, the semi-transparent reflective layer 131 in the present embodiment comprises a metallic material having superior reflectivity and electrical conductivity such as Ag or Al, and is applied on the substrate 128 by a sputtering method or vapor deposition method, etc. Also, the semi-transparent reflective layer 131 may be served by any semi-transparent reflective type devices used widely in liquid crystal display apparatus, such as the semi-transparent reflective layer of suitable thickness to transmit light generated by the EL illumination apparatus 160 provided below the liquid crystal panel 111, or a structure having numerous holes provided on a portion of the reflection layer to increase light transmissivity. However, it is not essential that the semi-transparent reflective layer 131 be electrically conductive so that another electrode layer may be provided separately from the semi-transparent reflective layer 131 for powering purposes to lead to respective structures for the semi-transparent reflective layer 131 and a powering electrode.

The EL illumination apparatus 160, as shown in FIGS. 12 and 13, comprises an EL element 210 having a pair of electrodes 162 and 165 opposing each other across a light emitting layer 164 disposed on one surface of the transparent substrate 161, where at least the electrode 162 of the pair of electrodes 162 and 165, located nearer to the transparent substrate 161, is made of a transparent electrode and is used to power the EL element 210 so that, when the EL element 210 is powered, the light emitted in the light emitting layer 164 is output towards the transparent substrate 161. Between the transparent electrode 162 and the light emitting layer 164 of the EL element 210 is formed a hole transport layer 163 to facilitate injection of holes from the transparent electrode 162.

The material to comprise each layer of the EL element 210 may be the same as those used in the layers of EL element 10 in the embodiment described earlier. It is preferable that white-light emitting material be used in the light emitting layer 164, in particular.

The optical device 220 is provided on the other surface (surface opposite to the side having the EL element 210) of the transparent substrate 161. The optical device 220 scatters and diffracts at least a portion of the incident light emitted from the light emitting layer 164 and injected into the transparent substrate 161 with an angle to cause total reflection for external output, and weakly scatters and/or transmits other light for external output. The optical device 220 used here is the same as that used in the EL display apparatus in the embodiment described earlier.

The EL illumination apparatus 160 is disposed so that the optical device 220 faces the liquid crystal panel 110, that is, the EL illumination apparatus 160 is placed below the liquid crystal panel 110 so as to illuminate the liquid crystal panel 110 from below the liquid crystal panel 110.

The action of the EL illumination apparatus will be explained next. When a pair of electrodes 162 and 165 are powered, light emitted from the light emitting layer 164 is emitted towards the transparent substrate 161 and is injected into the transparent substrate 161. At least a portion L1 of the incident light emitted from the light emitting layer 4 and injected into the transparent substrate 161 and forming such an angle to cause total reflection (light injected into transparent substrate 161 and forming a wide angle, not less than the critical angle at the exit face) reaches the optical device 220 to be scattered and/or diffracted in the optical device 220, and is emitted towards the liquid crystal panel 111, and the scattered and/or diffracted light L2 is output as illumination light from the lower side of the apparatus in FIG. 12 towards the liquid crustal panel 111.

In the meantime, another portion L3 of the light emitted from the light emitting layer 164 and injected into the transparent substrate 161 and forming a narrow angle (less than the critical angle at the exit face) also reaches the optical device 220 to be weakly scattered and/or transmitted in the optical device 220 for output to the liquid crystal panel 111 side, and weakly scattered and/or transmitted light L4 is output from the lower side of the apparatus in FIG. 12 as illumination light towards the liquid crystal panel 111.

The EL illumination apparatus 160 is not being powered constantly, but is energized by command from the user or sensor when little surrounding light (external lighting) is available. Therefore, when the EL illumination apparatus 160 is lighted, as shown in FIG. 12B, the light from the EL illumination apparatus 160 is transmitted through the semi-transparent reflective layer 131, so that it functions as a transmission type to provide transmission display. On the other hand, when the EL illumination apparatus 160 is not lighted, as shown in FIG. 12A, the light L entering from the upper surface (front surface of the polarizing plate 116) of the liquid crystal panel 111 is reflected from the semi-transparent reflective layer 131, so that it functions as a reflection type to provide reflection display.

The EL illumination apparatus 160 provided for the liquid crystal apparatus in the present embodiment produces improved frontal brightness (normal direction and its vicinity) because the optical device 220 is provided on the other surface of transparent substrate 161.

According to the present liquid crystal apparatus, because an EL illumination apparatus 160 having improved frontal brightness is provided, images are made clear and display quality is improved.

Here, in the present embodiment, EL element 210 provided in EL illumination apparatus 160 utilizes white light, but the EL element 210 may comprise more than one EL element to include red-light emitting EL element, green-light emitting EL clement, blue-light emitting EL element, and white-light emitting EL element. Such an EL illumination apparatus can efficiently produce red, green, blue, or white, or other colors depending on the EL element or a combination of EL elements chosen for use to provide an EL illumination apparatus of improved frontal brightness.

Also, the apparatus may be based on a blue-light emitting EL element for the EL element 210, and a means for wavelength converting the blue light generated in the light emitting layer 164 is provided between the EL element 210 and the transparent substrate 161, or between the transparent substrate 161 and the optical device 220, or on a surface of the optical device 220. Such an EL illumination apparatus produces white light efficiently and provides improved frontal brightness.

Here, in the above embodiment, the EL illumination apparatus is provided in the semi-transparent reflective type liquid crystal apparatus, but it way also be provided in the transmission type liquid crystal apparatus, and in such a case, the structure can be the same as the liquid crystal panel 111 shown in FIG. 12, except for the fact that the semi-transparent reflective layer 131 is not provided.

Also, in the present embodiment, the EL illumination apparatus is provided in the semi-transparent reflective type liquid crystal display apparatus of simple matrix type, but it is obvious that it may also be used in an active type matrix type semi-transparent reflective type liquid crystal display apparatus having a 2-terminal switching element or 3-terminal switching clement.

Also, in the liquid crystal display apparatuses provided with the present EL illumination apparatus explained above, the present invention is applied to the semi-transparent reflective type liquid crystal display apparatus having one phase plate 119 between the upper-side substrate 117 and the polarizing plate 116, but it is obvious that the present invention can be applied to a semi-transparent reflective type liquid crystal display apparatus having a plurality of phase plates.

Also, in the above embodiment, the present invention is applied to the semi-transparent reflective type liquid crystal display apparatus having a phase plate and a polarizing plate on the illumination apparatus 160 side of the lower substrate 128, but it is obvious that the present invention can be applied to a semi-transparent reflective type liquid crystal display apparatus having no phase plate and a polarizing plate on the illumination apparatus 160 side of the lower substrate 128.

Embodiment 2 of EL Display Apparatus

Figure 14:
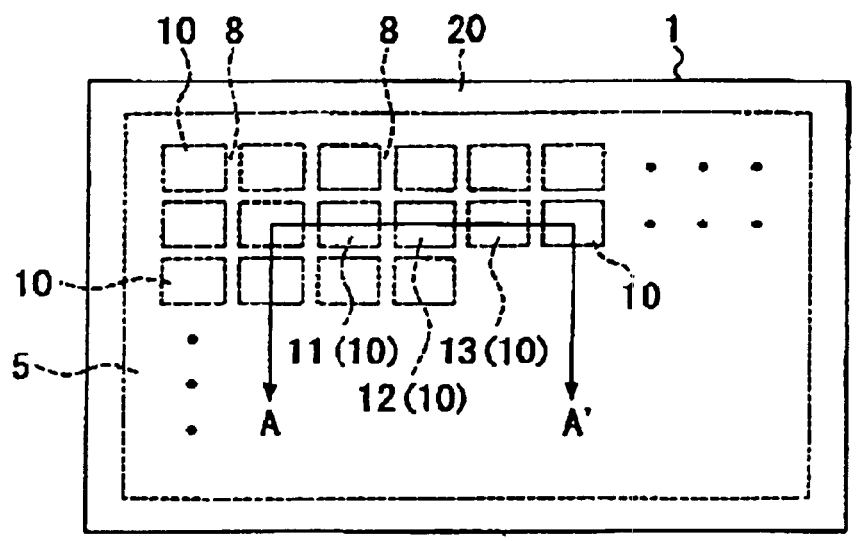
FIG. 14 is a diagram to show an EL display apparatus in Embodiment 2, having an EL device of the present invention, seen from the substrate side.
Figure 15:
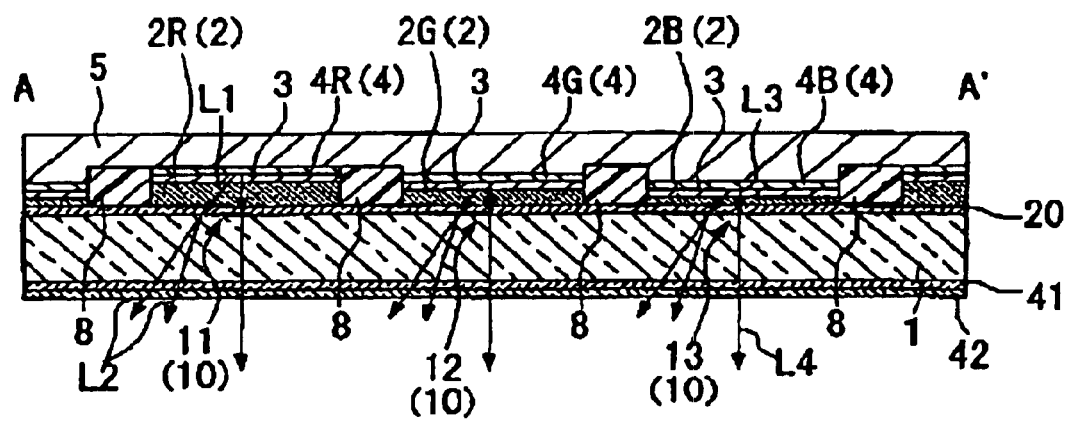
FIG. 15 is a schematic cross sectional diagram of a portion of the EL display apparatus in FIG. 14 seen through a plane A–A' in FIG. 14.
Figure 16:
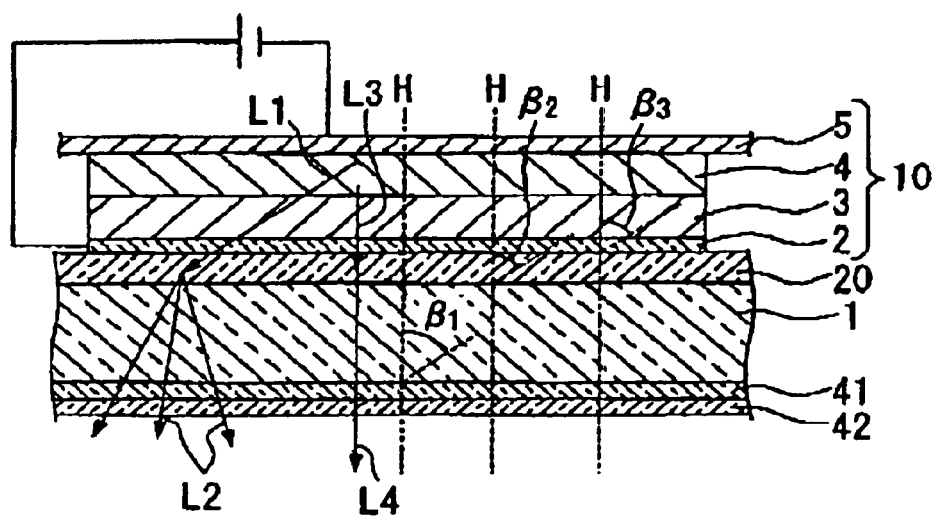
FIG. 16 is a schematic enlarged cross sectional view of an essential part of the EL display apparatus in FIG. 14 represented by one EL element and its vicinity.

FIG. 14 shows a plan view of Embodiment 2 of the EL display apparatus seen from the substrate side to which the present EL device is applied. FIG. 15 is a schematic cross sectional view of a portion of the EL display apparatus shown in FIG. 14 seen through a plane A—A. FIG. 16 shows a schematic enlarged cross sectional view of the essential parts of the EL display apparatus in FIG. 14 represented by one EL element and its vicinity.

In FIGS. 14 and 15, reference numeral 1 refers to a transparent substrate comprising a glass and the like. On one surface of the transparent substrate 1 is disposed an optical device 20, and further, on top of the optical device 20, a plurality of EL elements 10, each comprising a light emitting layer 4 is interposed between a pair of opposing electrodes 2 and 5 are placed in a matrix of EL elements 10 for generating either red, green or blue which can be independently powered by mutually intersecting electrodes 2 and 5 that are arranged in a lattice arrangement. Of the two electrodes 2 and 5, the electrode 2 disposed on the side of the transparent substrate 1 is an optically transparent electrode. This transparent electrode 2 is adjacent to the optical device 20.

Also, around each of the plurality of EL elements 10, isolation walls 8 made of resin black resist and the like are provided for isolation of the adjacent EL elements 10. In the EL display apparatus shown in FIGS. 14 and 15, EL elements 10 are referred by different reference numerals such that red-light emitting elements are designated by 11 in the light emitting layer 4R, green-light-emitting elements are designated by 12 in the light emitting layer 4G, and blue-light emitting elements are designated by 13 in the light emitting layer 4B.

The optical device 20 is constructed so that at least a portion of the light emitted from the light emitting layer 4 and injected into the transparent electrode 2 with such an angle to produce repeated total reflection, is output to transparent substrate 1 by scattering and/or diffracting, while the other incident light of other range of angles is weakly scattered and/or transmitted to the transparent substrate 1. Further, the optical device 20 is constructed so that at least a portion of light emitted from the light emitting layer 4 and injected into transparent substrate 1 and forming an angle to produce repeated total reflection at the exit face is scattered and/or diffracted and is output externally through the transparent substrate 1, and other light forming a narrow range of angles at the exit face is weakly scattered and/or transmitted externally through the transparent substrate 1.

The structure and action of the optical device 20 will be explained in detail later.

Also, as shown in FIG. 15, a phase plate (λ/4 plate) 41 and a polarizing plate 42 are provided successively starting from the optical device on a surface of the transparent substrate 1 opposite to the optical device 20. The phase plate (λ/4 plate) 41 and the polarizing plate 42 are omitted in FIG. 14.

As shown in FIG. 15, green-light-emitting EL element 12 comprises successive lamination of transparent electrode 20 comprising ITO film, a hole transport layer 3 for facilitating injection of holes from the transparent electrode 2G, light emitting layer 4G comprising an EL material, and a metal electrode 5, in such a way that the transparent electrode 2G and the metal electrode 5 are opposite to each other across the light emitting layer 4G.

In the EL element 12 shown in FIG. 15, the transparent electrode 2G serves as the anode, and the metal electrode 5 serves as the cathode. Then, by flowing a given magnitude of electrical current to the transparent electrode 2G and the metal electrode 5, green light is generated in the light emitting layer 40, and green light from the light emitting layer 4G is injected into the transparent electrode 2G.

The light injected into the transparent electrode 2G from the light emitting layer 4G reaches the optical device 20, and is acted on according to the incident angle when injected into the transparent electrode 2G and is output to the transparent substrate 1, and is further transmitted through the phase plate 41 and the polarizing plate 42, and is output externally from the bottom side of the EL display apparatus shown in FIG. 15. The action of the optical device 20 will be explained in detail later.

In the EL element 12 shown in FIG. 15, the film thickness of the transparent electrode 2G is constructed to be 150±20 nm.

Hole transport layer 3 may be served by conventional materials used for hole transport including triphenyl amine derivatives including: 4,4-bis (m-triphenyl amino) biphenyl (TPD); 4,4bis [N-(1 naphtyl)N-phenyl amino]biphenyl (α-NPD); 4,4',4"-tris[N-(3 methylphenyl)-N-phenyl amino] triphenyl amine (m-MTDATA) and the like; as well as polyvinylcarbazole; and polyethylene dioxythiophene. The material that can be used for hole transport layer 3 may comprise one material or several kinds of such materials.

Light emitting layer 4G may be served by organic EL materials used for green light emission in the conventional light emitting layer, including preferably such EL materials as quinacrydon and its derivatives. Also, the material that can be used for light emitting layer 4 may comprise one material or several kinds of such materials.

Materials for metal electrode 5 include conventional materials used for metal electrode, for example, aluminum, silver, silver alloys, and magnesium and the like.

Also, red-light emitting EL element 11 and blue-light emitting EL element 13 differ from the green-light emitting EL element 12 shown in FIG. 15 in the film thickness of transparent electrode 2 and the material used in the light emitting layer 4.

In the red-light emitting EL element 11, the film thickness of the transparent electrode 2R is constructed to be 180±20 nm.

Light emitting layer 4R may be made of organic EL materials used for red light emission in the conventional light emitting layer, including preferably such EL materials as rhodamine and its derivatives. Also, the material that can be used for light emitting layer 4R may comprise one material or several kinds of such materials.

In the blue-light emitting EL element 13, the film thickness of the transparent electrode 2B is constructed to be 120±20 nm.

Light emitting layer 4B may be made of organic EL materials used for blue light emission in the conventional light emitting layer, including preferably such EL materials as distyrylbiphenyl and its derivatives, coumarin and its derivatives and tetraphenyl butadiene and its derivatives. Also, the material that can be used for light emitting layer 4B may comprise one material or several kinds of such materials.

Next, the structure and action of the optical device 20 provided in the EL display apparatus of the present embodiment will be explained in detail in the following.

The optical device 20, as shown in FIGS. 15 and 16, is constructed so that at least a portion L1 of the light, emitted from the light emitting layer 4 (light emitting layers 4R, 4G; and 4B) and injected into the transparent electrode 2 that causes repeated total reflection, is scattered and/or diffracted for output to substrate 1, while the other light L3 is weakly scattered and/or transmitted for output to transparent substrate 1. Also, the optical device 20 is constructed so that at least a portion of the incident light L1 emitted from the light emitting layer 4 and injected into the transparent substrate 1 and forming a range of angles to cause total reflection (light input into the transparent substrate 1, i.e., output light from the device 20) is scattered and/or diffracted for external output (in this case, towards phase plate 41) through the transparent substrate 1, while the light L3 input and forming other range of angles (light input into the transparent substrate 1, i.e., output light from the device 20) is weakly scattered and/or transmitted for external output through the transparent substrate 1 (in this case, towards phase plate 41).

In this EL display apparatus, when a pair of electrodes 2 and 5 are energized, the light generated in the light emitting layer 4 is emitted towards the transparent electrode 2 and is input into the transparent electrode 2, however, at least a portion L1 (light injected into the transparent electrode 2 and forming a wide angle, i.e., not less than the critical angle at the exit face) of the light emitted from the light emitting layer 4 and injected in the transparent electrode 2 and forming such an angle at the exit face to cause repeated total reflection reaches optical device 20 to be scattered and/or diffracted in the optical device 20, and is output to the transparent substrate 1. The scattered and/or diffracted light L2 in the optical device 20 is injected into the transparent substrate 1 and forming less than the critical angle at the exit face, and the scattered and/or diffracted light L2 is output towards the phase plate 41 and the polarizing plate 42 for delivery to the viewer from the lower portion of the EL display apparatus shown in FIG. 15.

In the meantime, other light portion L3 of the light emitted from the light emitting layer 4 and injected in the transparent electrode 2 (that is, light injected into the transparent electrode 2 and forming a narrow angle, i.e., less than the critical angle at the exit face) also reaches optical device 20, and is weakly scattered and/or transmitted in the optical device 20. The weakly scattered and/or transmitted light L4 in the optical device 20 is input into the transparent substrate 1 and forming a less-than-critical angle at the exit face, and the weakly scattered and/or diffracted light L4 is further output towards the phase plate 41, and is transmitted through the phase plates 41 and the polarizing plate 42 for external output to the viewer from the lower portion of the EL display apparatus shown in FIG. 15.

Another specific example of the optical device 20 includes a device that scatters at least a portion of the incident light L1, emitted from each light emitting layer and injected into the transparent electrode 2 and forming a not-less-than-critical angle at the exit face, for output to the transparent substrate 1, while the light L3 forming a less-than-critical-angle at the exit face is weakly scattered or transmitted to the transparent substrate 1, and further, the optical device 20 is able to output at least a portion L1 of the light input into the transparent substrate 1 from the light emitting layer 4 and forming a not-less-than critical angle, is scattered for external output, and the light L3 and forming a less-than-critical angle at the exit face is weakly scattered and/or transmitted for external output.

Figure 17:
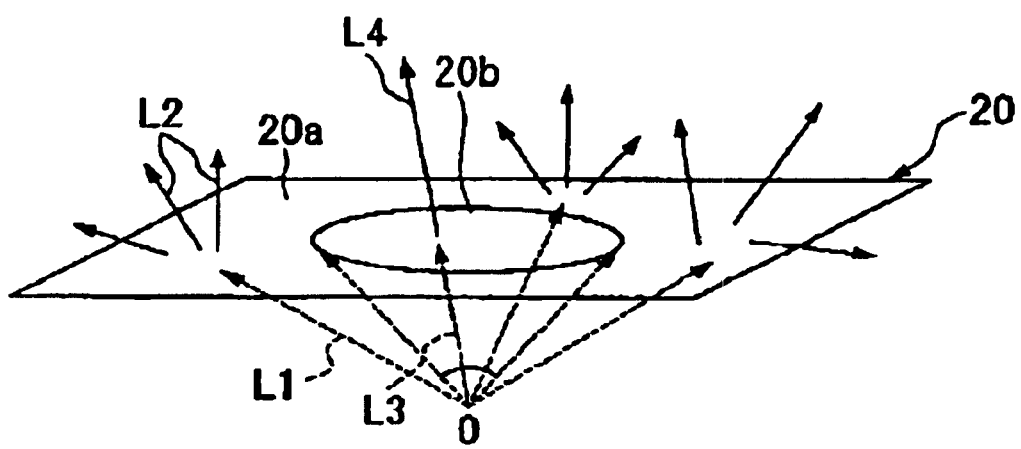
FIG. 17 is a schematic diagram of the action of an optical device provided in the EL display apparatus in FIG. 14.

FIG. 17 illustrates the action of the optical device 20 schematically for the light emitted from a point source O. The encircled region 20b (excluding circumference) relates to an angular region in which the light injected into the transparent electrode 2 or into the transparent substrate 1 is less than the critical angle at the exit face. The region shown by 20a outside the circular region (including circumference) is an angular region in which the light injected into the transparent electrode 2 or into the transparent substrate 1 is not less than the critical angle. As shown in FIG. 17, the optical device 20 produces an effect of scattering that portion of the light, emitted from the point source O and injected through the region 20a, is output in a direction opposite to the point source O, and produces an effect of weak scattering or transmitting that portion of the light, emitted from the point source O and injected through the region 20b, is output in a direction opposite the point source O.

Therefore, the optical device 20 scatters at least that portion L1 of the incident light, emitted from the light emitting layer 4 and injected into the transparent electrode 2 and forming a not-less-than-critical angle at the exit face, for output to the transparent substrate 1, and weakly scatters or transmits (without scattering) the incident light L3 and forming a less-than-critical angle at the exit face for output to the transparent substrate 1, and furthermore, at least a portion of incident light L1 emitted from the light emitting layer 4 and injected into the transparent substrate 1 and forming a not-less-than-critical angle at the exit face is scattered for external output, and the incident light L3 forming a less-than-critical angle at the exit face is weakly scattered or transmitted for external output, so that total reflection can be prevented while permitting little scattering or no scattering for the output frontal output light (normal direction and its vicinity), thereby improving frontal brightness.

Also, another example of the optical device 20 includes a device that diffracts at least a portion L1 of incident light emitted from the light emitting layer 4 and injected into the transparent electrode 2 and forming a not-less-than-critical angle at the exit face for output to the transparent substrate 1, and incident light L3 forming a less-than-critical angle at the exit face is transmitted to the transparent substrate 1, and further, the optical device 20 diffracts at least a portion L1 of the light input into the transparent substrate 1 from the light emitting layer 4 and forming a not-less-than-critical angle at the exit face for external output, and the incident light L3 forming a less-than-critical angle at the exit face is transmitted for external output.

Figure 18:
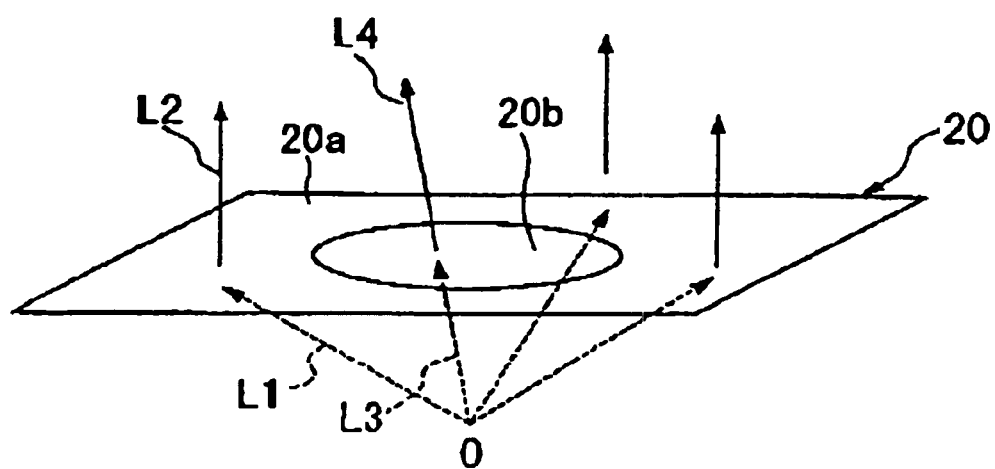
FIG. 18 is a schematic diagram of another action of an optical device provided in the EL display apparatus in FIG. 14.

FIG. 18 is a schematic diagram to illustrate the action of the optical device 20 operating on the light emitted from a point source O. The encircled region 20b (excluding circumference) relates to an angular region in which the light injected into the transparent electrode 2 or into the transparent substrate 1 forms a less-than-the-critical angle at the exit face. The region shown by 20a (including circumference) outside the circular region is an angular region in which the light injected into the transparent electrode 2 or into the transparent substrate 1 forms a not-less-than-the-critical angle. As shown in FIG. 18, the optical device 20 produces an effect of diffracting that portion of the incident light emitted from the point source O and injected through the region 20a to be output in a direction opposite to the point source O, and produces an effect of transmitting that portion of tie light emitted from the point source O and injected through the region 20b to be output in a direction opposite the point source O.

Therefore, the optical device 20 diffracts at least a portion L1 of the incident light, emitted from the light emitting layer 4 and injected into the transparent electrode 2 and forming a not-less-than-critical angle at the exit face, for output to the transparent substrate 1, and less-than-critical angle light L3 of the injected light is transmitted to the transparent substrate 1, and also, at least a portion L1 of incident light emitted from the light emitting layer 4 and injected into the transparent substrate 1 with a not-less-than-critical angle is diffracted for external output, and incident light forming a less-than-critical angle at the exit face is transmitted for external output, so that total reflection can be prevented while permitting to transmit the frontal portion of incident light (normal direction and its vicinity), thereby improving frontal brightness.

Also, another example of the optical device 20 includes a device that scatters and diffracts at least a portion L1 of incident light emitted from the light emitting layer 4 and injected into the transparent electrode 2 and forming a not-less-than-critical angle at the exit face for output to the transparent substrate 1, and incident light L3 forming a less-than-critical angle at the exit face is weakly scattered and or transmitted to the transparent substrate 1, and further, at least a portion L1 of light emitted from the light emitting layer 4 and input into the transparent substrate 1 and forming a not-less-than-critical angle at the exit face is scattered and diffracted for external output, and the incident light and forming a less-than-critical angle at the exit face is weakly scattered and/or transmitted externally.

This optical device 20 combines the effects explained with reference to FIGS. 17 and 18

Therefore, the optical device 20 scatters and diffracts at least a portion L1 of the incident light emitted from the light emitting layer 4 and injected into the transparent electrode 2 and forming a not-less-than-critical angle at the exit face for output to transparent substrate 1, and the light L3 forming a less-than-critical angle at the exit face is weakly scattered and/or transmitted to the transparent substrate 1, and further, at least a portion L1 of incident light injected into the transparent substrate 1 from the light emitting layer 4 and forming a not-less-than-critical angle at the exit face is scattered and diffracted for external output, and incident light L3 forming a less-than-critical-angle is weakly scattered and/or transmitted for external output, so that total reflection can be prevented while permitting the frontal portion of incident light (normal direction and its vicinity) to scatter minimally and/or to transmit, thereby improving frontal brightness.

Also, another example of the optical device 20 includes a device that scatters and/or diffracts at least a portion of the incident light emitted from the light emitting layer 4 and injected into the transparent electrode 2 that satisfies a condition $\beta 3 \geq \sin^{-1}(m2/m3)$, (where $\beta 3$ refers to an inclination angle of the incident light from the normal of the transparent electrode 2 at the exit face, m2 to the refractive index of the optical device and m3 refers to the refractive index of the transparent electrode 2) for output to the transparent substrate 1, while incident light that satisfies a condition $\beta 3 < \sin^{-1}(m2/m3)$ is weakly scattered and/or transmitted for output to the transparent substrate 1.

The value of $\beta 3$ for the incident light of not-less-than-critical angle to the normal direction H of the transparent electrode 2 can be computed from Snell's law (n1 sin θ1=n2 sin θ2), and by knowing that n1=m3, n2=m2, and β1=3, and, when the incident light is at the critical angle so that transmitted light becomes parallel to the surface of the transparent substrate 1, θ2 to the normal direction H is 90 degrees, the condition $\beta 3 \geq \sin^{-1}(m2/m3)$ can be computed.

Therefore, if the optical device 20 scatters and/or diffracts at least a portion of incident light emitted from the light emitting layer 4 and injected into the transparent electrode 2 that satisfies the condition $\beta 3 \geq \sin^{-1}(m2/m3)$, and weakly scatters and/or transmits incident light that satisfies the condition $\beta 3 < \sin^{-1}(m2/m3)$, then, at least a portion L1 of the light, emitted from the light emitting layer 4 and injected into the transparent electrode 2 and forming such a wide angle (not less than critical angle) at the exit face to cause repeated total reflection, can be scattered and/or diffracted for output to the transparent substrate 1, while other light portion L3 injected into the transparent electrode 2 and forming a narrow angle (less than critical angle) at the exit face can be weakly scattered and/or transmitted for output to the transparent substrate 1.

Figure 24:
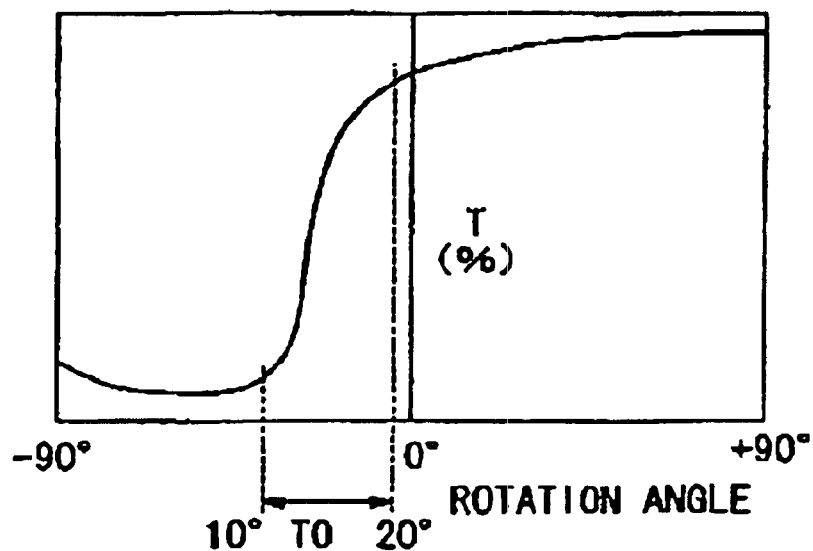
FIG. 24 is a diagram showing the scattering and/or diffracting characteristics of the optical device provided in the EL display apparatus in an embodiment of the present invention.

However, the optical device 20 exhibits a transition behavior of incident light injected into the optical device 20, from a scattering and/or diffracting state to a weak scattering and/or transmission state shown in FIG. 24, occurring over a range of 10 to 20 degrees. Therefore, it is preferable to optimize the optical device 20 in such a way that incident light that enters the transparent electrode 2 within A range of 10 degrees of the critical angle can also be scattered and/or diffracted. In FIG. 24, the horizontal axis relates to the rotation angle (inclination angle) of the optical device 20 and the vertical axis relates to the parallel beam transmittance T (in %).

Figure 20:
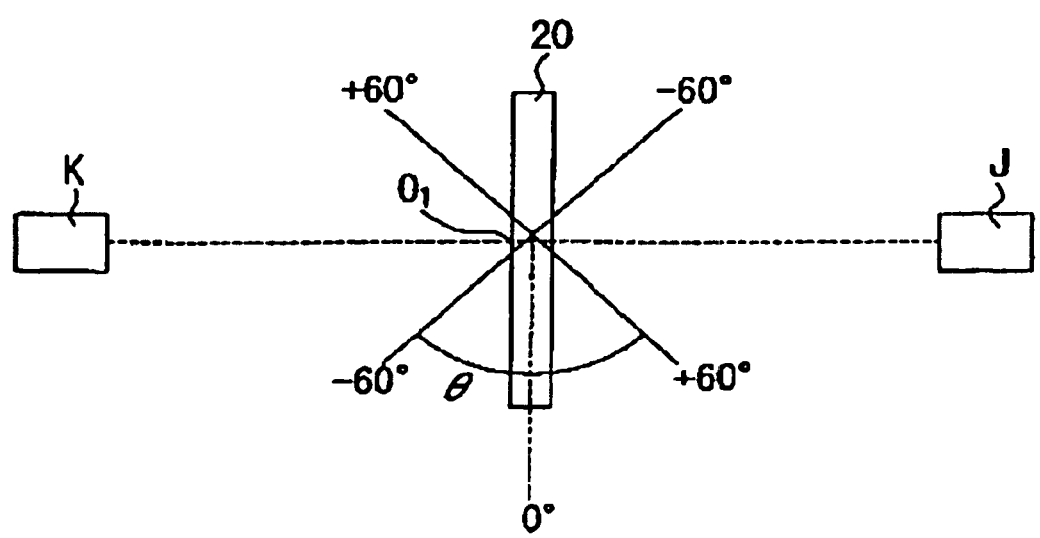
FIG. 20 is a diagram explaining the positions of an optical device, a light source, and a light receiving section in measuring parallel light transmittance.

The parallel beam transmittance is determined as shown in FIG. 20. In measuring the transmittance, incident light is emitted from a light source (light from the light emitting layer) K placed on the left of the optical device and is directed at the origin O1 in the center section, and the light transmitted straight through the optical device 20 is measured by a light receiving section such as photosensor J. The optical device 20 was rotated (inclined) during the measurement process so that, at various rotation angles (inclination angles), the incident light emitted from the light source K and input into optical device 20 and transmitted through the origin O1 of the optical device 20 was received straight through in the light receiving section J for intensity measurement. In FIG. 7, 0° refers to a perpendicular position of the optical device 20 with respect to the straight line connecting the light source K and the photosensor J, and the angle of inclination is assigned as + for the clockwise direction of rotation and − for the anti-clockwise direction of rotation.

Figure 21:
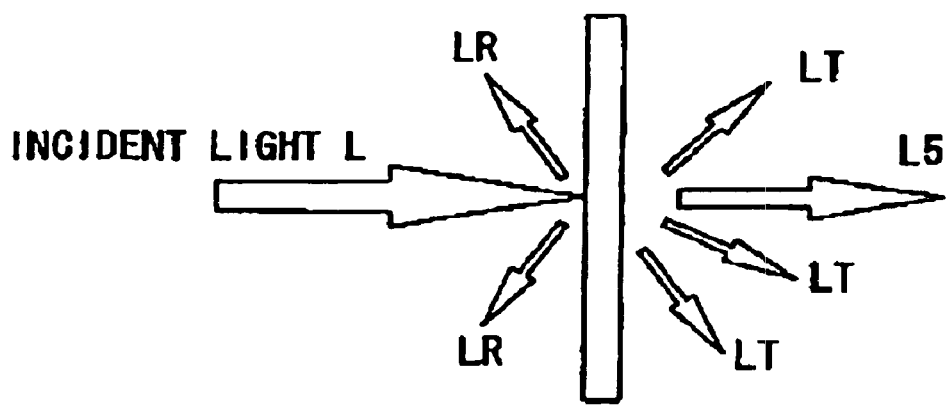
FIG. 21 is a diagram explaining the relation of the incident light injected into the optical device, parallel transmitted light, scattered transmitted light, and back scattering light and front scattering light

As shown in FIG. 21, when the incident light L emitted from one surface side of the optical device 20 (left side in FIGS. 20 and 21) is transmitted through the optical device 20 and exits from the other surface side of the optical device 20 (right side in FIGS. 20 and 21), the light scattered from the one surface side (left side) is termed "back scattering light LR", and the light transmitted through the optical device 20 is termed "front scattering light". Then, regarding the front scattering light that transmits through the optical device 20, the parallel light transmittance T to indicate the optical power of front scattering light (parallel transmitted light) L5 propagating in the same direction as the propagation direction of the incident light L within ±2 degrees, is defined as a ratio of the transmitted power to the optical power of the incident light L, and further, the dispersive light transmittance to indicate the optical power of front scattering light (dispersive transmitted light) LT emitted at angles not less than ±2 is defined as a ratio of the transmitted power to the optical power of the incident light L, and the total light transmittance is defined as the power ratio of the total transmitted light to the incident light. From these definitions, it is possible to define parallel transmittance T as the difference obtained by subtracting the dispersive transmittance from the total transmittance.

Thus, in FIG. 20, for the angles that show low values of parallel transmittance T, scattering power is strong (scattering) while for the angles that show high values of parallel transmittance T, scattering power is weak (low scattering) and/or transmitted power (parallel transmitted light) is strong, and the transition region from the strong scattering state (scattering) to the weak scattering (low scattering) and/or high transmitted power state occurs over a range from 10 to 20 degrees.

It follows that it is preferable that the optical device 20 scatter and/or diffract at least a portion of the incident light emitted from the light emitting layer 4 and be injected into the transparent electrode 2 that satisfies the condition $\beta 3 < \sin^{-1}(m2m3)-10°$, (where $\beta 3$ refers to an inclination angle of the incident light from the normal direction H of the transparent electrode 2 at the exit face) for output to the transparent substrate 1, while incident light that satisfies the condition $\beta 3 < \sin^{-1}(m2/m3)-10°$ is weakly scattered and/or transmitted for output to the transparent substrate 1.

Also, another example of the optical device 20 includes a device that scatters and/or diffracts at least a portion of the incident light emitted from the light emitting layer 4 and injected into the transparent electrode 2 that satisfies the condition $\beta 3 \geq 55°$ (where $\beta 3$ refers to the angle of inclination of the incident light from the normal direction H of the transparent electrode 2) for output to the transparent substrate 1 while the incident light that satisfies the condition $\beta 3 = 0°$ is weakly scattered and/or transmitted for output to the optically transparent substrate 1.

To obtain specific values (approximation values) of the inclination angle $\beta 3$ of an incident light from the normal direction H of the transparent electrode 2 that causes a not-less-than-critical angle for the incident light injected into the transparent electrode 2, it is permissible to use a ITO or IZO whose refractive index ranges from 1.8 to 2.0 (n1=1.82 to 2.0), and the refractive index of the optical device 20 is 1.57 (n2=1.57), and knowing that the incident light entering at the critical angle produces transmitted light parallel to the surface of the transparent electrode 2 so that the angle θ2 between the transmitted light and the normal direction H of the transparent substrate 1 is 90 degrees, then from Snell's law, θ1 is about 55 degrees. Therefore, the critical angle β3 of the light injected into the transparent electrode 2 is about 55 degrees.

Therefore, if the optical device 20 scatters and/or diffracts at least a portion of incident light emitted from the light emitting layer 4 and injected into the transparent electrode 2 that satisfies the condition β3≧55°, and weakly scatters and/or transmits incident light that satisfies the condition β3=0°, then, at least a portion of the light, emitted from the light emitting layer 4 and injected into the transparent electrode 2 and forming a wide angle (not less than the critical angle) at the exit face to cause repeated total reflection, can be scattered and/or diffracted for output to the transparent substrate 1, while the light portion injected into the transparent substrate 1 in the normal direction can be weakly scattered and/or transmitted is output to the transparent substrate 1.

Also, it is preferable that the optical device 20 scatter and/or diffract at least a portion of the incident light emitted from the light emitting layer 4 and injected into the transparent substrate 2 that satisfies a condition β3≧55° (where β3 refers to the angle of inclination of the incident light from the normal direction of the transparent electrode) for output to the transparent substrate 1 while weakly scattering and/or transmitting the incident light that satisfies a condition β3<55° for output to the transparent substrate 1.

Therefore, if the optical device is able to satisfy such conditions, then, at least a portion L1 of the incident light emitted from the light emitting layer 4 and injected into the transparent electrode 2 and forming such a wide angle (not less than he critical angle) at the exit face to cause repeated total reflection, can be scattered and/or diffracted for output to the transparent substrate 1, while the light portion L3 of the incident light forming a less-than-critical angle can be weakly scattered and/or transmitted almost wholly for output to the transparent substrate 1.

Also, another example of the optical device 20 includes a device that scatters and/or diffracts at least a portion of the incident light emitted from the light emitting layer 4 and injected into the optical device 20 through the transparent electrode 2 that satisfies a condition β2≧sin$^{-1}$(m1/m2), (where β2 refers to an inclination angle of the incident light from the normal direction H of the optical device 20, m1 to the refractive index of the transparent substrate 1 and m2 refers to the refractive index of the optical device 20) for output to the transparent substrate 1, while incident light that satisfies a condition β2<sin$^{-1}$(m1/m2) is weakly scattered and/or transmitted for output to the transparent substrate 1.

The value of β2 for the incident light of not-less-than-critical angle to the normal direction H of the transparent electrode 2 can be computed from Snell's law (n1 sin θ1=n2 sin θ2), and by knowing that n1=m2, n2=m1, and θ1=β2, and that, when the incident light is at the critical angle so that transmitted light becomes parallel to the surface of the transparent substrate 1, the angle of the transmitted light θ2 to the normal direction H is 90 degrees, the condition β3≧sin$^{-1}$(m1/m2) can be computed.

Therefore, if the optical device 20 scatters and/or diffracts at least a portion of incident light emitted from the light emitting layer 4 and injected into the optical device 20 through the transparent electrode 2 that satisfies the condition β2≧sin$^{-1}$(m1/m2), and weakly scatters and/or transmits incident light that satisfies the condition β2<sin$^{-1}$(m1/m2), then, at least a portion of incident light, emitted from the light emitting layer 4 and injected into the optical device 20 through the transparent electrode 2 and forming such a wide angle (not less than critical angle) at the exit face to cause repeated total reflection, can be scattered and/or diffracted to the transparent substrate 1, while other light portion injected into the optical device 20 and forming a narrow angle (less than the critical angle) at the exit face can be weakly scattered and/or transmitted for output to the transparent substrate 1.

However, as described earlier, the optical device 20 exhibits a transition behavior of incident light, emitted from the light emitting layer 4 and injected into the optical device 20 through the transparent electrode 2, from a scattering and/or diffracting state to a weak scattering and/or transmission state, occurring over a range of 10 to 20 degrees. Therefore, it is preferable to optimize the optical device 20 in such a way that incident light emitted from the light emitting layer 4 and injected into the optical device 20 through the transparent electrode 2 within a range of 10 degrees from the critical angle at the exit face can also be scattered and/or diffracted.

It follows that it is preferable that the optical device 20 scatter and/or diffract at least a portion of the incident light emitted from the light emitting layer 4 and injected into the optical device 20 through the transparent electrode 2 that satisfies the condition β2<sin$^{-1}$(m1/m2)−10°, (where β2 refers to an angle of inclination of the incident light from the normal direction H of the optical device 20, m1 to the refractive index of the transparent substrate 1 and m2 refers to the refractive index of the optical device 20) for output to the transparent substrate 1, while incident light that satisfies the condition β2<sin$^{-1}$(m1/m2)−10° is weakly scattered and/or transmitted to the transparent substrate 1.

Also, another example of the optical device 20 includes a device that scatters and/or diffracts at least a portion of the incident light emitted from the light emitting layer 4 and injected into the optical device 20 through the transparent electrode 2 that satisfies the condition β2≧70° (where β2 refers to the angle of inclination of the incident light from the normal of the optical device 20) for output to the transparent substrate 1 while the incident light that satisfies the condition β2=0° is weakly scattered and/or transmitted for output to the transparent substrate 1.

To obtain specific values (approximation values) of the inclination angle β2 of the incident light to the normal direction H of the optical device that causes a not-less-than-critical angle for the incident light injected into the transparent electrode 2, knowing that the optical device 20 has an average refractive index of 1.57 (n1≈1.57), and knowing that the incident light entering at the critical angle produces transmitted light parallel to the surface of the optical device 20 so that the angle θ2 between the transmitted light and the normal direction H of the optical device is 90 degrees; then from Snell's law, θ1 is about 70 degrees. Therefore, the critical angle β2 of the light injected into the optical device 20 is about 70 degrees.

Therefore, if the optical device 20 scatters and/or diffracts at least a portion of incident light emitted from the light emitting layer 4 and injected into the optical device 20 through the transparent electrode 2 that satisfies the condition β2≧70°, and weakly scatters and/or transmits incident light that satisfies the condition β2=0°, then, at least a portion of incident light, emitted from the light emitting layer 4 and injected into the optical device 20 through the transparent electrode 2 and forming such a wide angle (not less than critical angle) at the exit face to cause repeated total reflection, can be scattered and/or diffracted to the transparent substrate 1, while the light portion injected into the optical device 20 in the normal direction can be weakly scattered and/or transmitted is output to the transparent substrate 1.

Also, it is preferable that the optical device 20 scatter and/or diffract at least a portion of the incident light emitted from the light emitting layer 4 and injected into the optical device 20 through the transparent electrode 2 that satisfies a condition $\beta 2 \geq 70°$, (where $\beta 2$ refers to the angle of inclination of the incident light from the normal of the optical device 20) for output to the transparent substrate 1, while incident light that satisfies a condition $\beta 2 < 70°$ is weakly scattered and/or transmitted for output to the transparent substrate 1. If the optical device 20 is a device that can satisfy these conditions, it is able to scatter and/or diffract at least a portion of incident light, emitted from the light emitting layer 4 and injected into the optical device 20 through the transparent electrode 2 and forming a such wide angle (not less than critical angle) at the exit face to cause repeated total reflection, can be scattered and/or diffracted for output to the transparent substrate 1, while the light portion L3 of less than the critical angle can be weakly scattered and/or transmitted for output to the transparent substrate 1.

Also, another example of the optical device 20 includes a device that scatters and/or diffracts at least a portion of the incident light emitted from the light emitting layer 4 and injected into the transparent substrate 1 that satisfies a condition $\beta 1 \geq \sin^{-1}(1/m1)$, (where $\beta 1$ refers to an inclination angle of the incident light from the normal direction H of the transparent substrate 1, the index of refraction of air is 1, and m1 refers to the refractive index of transparent substrate 1) for external output, while incident light that satisfies a condition $\beta 1 < \sin^{-1}(1/m1)$ is weakly scattered and/or transmitted for external output.

The value of $\beta 1$ fox the incident light injected into the transparent substrate 1 at an angle not-less-than-critical angle to the normal direction H of the transparent substrate 1 can be computed from Snell's law (n1 sin $\theta 1$=n2 sin $\theta 2$), and by knowing that n1=m1, and that the refractive index of air is 1 so that n2=1, $\theta 1 = \beta 1$, and, when the incident light is at the critical angle so that transmitted light becomes parallel to the surface of the transparent substrate 1, the angle $\theta 2$ of the transmitted light to the normal direction H is 90 degrees, the condition $\beta 1 \geq \sin^{-1}(1/m1)$ can be computed.

Therefore, if the optical device 20 scatters and/or diffracts at least a portion of incident light emitted from the light emitting layer 4 and injected into the transparent substrate 1 that satisfies the condition $\beta 1 \geq \sin^{-1}(1/m1)$, and weakly scatters and/or transmits incident light that satisfies the condition $\beta 1 < \sin^{-1}(1/m1)$, then, at least a portion L1 of incident light, emitted from the light emitting layer 4 and injected into the transparent substrate 1 and forming such a wide angle (not less than the critical angle) at the exit face to cause repeated total reflection, is scattered and/or diffracted for external output, while other light portion L3 incident to the transparent substrate 1 at a narrow angle (less than the critical angle) is weakly scattered and/or transmitted for external output.

In the optical device 20, the transition behavior of incident light injected into the optical device 20, from a scattering and/or diffracting state to a weak scattering and/or transmission state, occurs over a range of 10 to 20 degrees. Therefore, it is preferable to optimize the optical device 20 in such a way that incident light that enters the transparent substrate 1 within a range of 10 degrees from the critical angle can also be scattered and/or diffracted.

It follows that it is preferable that the optical device 20 scatter and/or diffract at least a portion of the incident light emitted from the light emitting layer 4 and injected into the transparent substrate 1 that satisfies the condition $\beta 1 \geq \sin^{-1}(1/m1) - 10°$, (where $\beta 1$ refers to an inclination angle of the incident light from the normal direction H of the transparent substrate 1, the refractive index of air is 1, and m1 refers to the refractive index of the transparent substrate 1) for external output, while incident light that satisfies the condition $\beta 1 < \sin^{-1}(1/m1) - 10°$ is weakly scattered and/or transmitted for external output.

Also, another example of the optical device 20 includes a device that scatters and/or diffracts at least a portion of the incident light emitted from the light emitting layer 4 and injected into the transparent substrate 1 that satisfies a condition $\beta 1 \geq 40°$ (where $\beta 1$ refers to the angle of inclination of the incident light from the normal direction H of the transparent substrate 1) for external output while the incident light that satisfies a condition $\beta 1 = 0°$ is weakly scattered and/or transmitted for external output.

To obtain specific values (approximation values) of the inclination angle $\beta 1$ of the incident light to the normal direction H of the transparent substrate 1 that causes a not-less-than-critical angle, it is permissible to use a glass substrate or a transparent resin e.g., acrylic resin etc., whose refractive index ranges from 1.49 to 1.6 (i.e., n1=1.49 to 1.6), and knowing that the refractive index of air is 1 (n2=1), and incident light entering at the critical angle produces transmitted light parallel to the surface of the transparent substrate 1 so that the angle $\theta 2$ between the transmitted light and the normal direction H of the transparent substrate 1 is 90 degrees, then from Snell's law, $\theta 1$ is about 40 degrees, and therefore, the critical angle $\beta 1$ of the light injected into the transparent substrate 1 is about 40 degrees. Here, it should be noted that, when a glass substrate (refractive index is about 1.54) is used as the transparent substrate 1, the critical angle $\beta 1$ is 40.5 degrees.

Therefore, if the optical device 20 scatters and/or diffracts at least a portion of incident light emitted from the light emitting layer 4 and injected into the transparent substrate 1 that satisfies the condition $\beta 1 \geq 40°$, and weakly scatters and/or transmits incident light that satisfies the condition $\beta 1 = 0°$, then, at least a portion of incident light, emitted from the light emitting layer 4 and injected into the transparent substrate 1 and forming such a wide angle (not less than critical angle) at the exit face to cause repeated total reflection, is scattered and/or diffracted almost wholly for external output, while the light portion incident to the transparent substrate 1 in the normal direction is weakly scattered and/or transmitted for external output.

Also, it is preferable that the optical device 20 scatter and/or diffract at least a portion of the incident light emitted from the light emitting layer 4 and injected into the transparent substrate 1 that satisfies a condition $\beta 1 \geq 40°$, (where $\beta 1$ refers to an inclination angle of the incident light from the normal direction H of the transparent substrate 1 at the exit face) for external output, while incident light that satisfies a condition $\beta 1 < 40°$ is weakly scattered and/or transmitted for external output. If the optical device 20 is a device that can satisfy these conditions, it is able to scatter and/or diffract at least a portion L1 of incident light, emitted from the light emitting layer 4 and injected into the transparent substrate 1 and forming such a wide angle (not less than critical angle) at the exit face to cause repeated total reflection, can be scattered and/or diffracted to be almost wholly output externally, while the light portion L3 incident to the transparent substrate 1 with a less-than-critical angle can be weakly scattered and/or transmitted almost wholly for external output.

In the present invention, scattering includes a case where front scattering light (diffusive transmitted light) is produced from incident light that is injected into the transparent electrode or optical device or transparent substrate and forms a wide angle (angle not less than the critical angle) at the exit face and transmitted through the transparent electrode or optical device or transparent substrate in the propagation direction to be emitted at an angle exceeding ±2°, as well as a case where front scattering light (parallel transmitted light) is produced from incident light that is transmitted through in the propagation direction within the deviation angle of ±2°. One or both of these modes of transmission are included in the term "scattering".

Also, scattering refers to those cases of scattering exhibiting haze values higher than 50%, and weak scattering refers to those exhibiting haze values lower than 20%. Also, diffraction refers to a phenomenon of changes in the direction of output light with respect to the direction of propagation of the incident light injected into the transparent electrode or transparent substrate or optical device and forming a wide angle (not less than the critical angle) at the exit face.

Transmission of light refers to a phenomenon where front scattering light (parallel transmitted light) is produced from incident light being injected into the transparent substrate or optical device at a narrow angle (less than the critical angle) at the exit face and propagating in the same direction within a deviation angle of less than ±2°.

As described above, the refractive index m1 of the transparent substrate 1 is 1.46 to 1.6, and the refractive index m2 of the optical device 20 is about 1.57 (average refractive index) so that the refractive index m1 of the transparent substrate 1 and the refractive index m2 of the optical device 20 are the same or substantially the same.

It is preferable that the refractive index m1 of the transparent substrate 1 and the refractive index m2 of the optical device 20 satisfy the relationship m1 ≧ m2 so that the incident light emitted from the light emitting layer 4 and injected into the optical device 20 will not exhibit total reflection to enable to efficiently deliver the light emitted from the light emitting layer 4 externally (to the viewer).

Also, the optical device 20 may be a device to output at least a portion of the light emitted from the light emitting layer 4 and injected into the transparent electrode 2 and forming a not-less-than-critical angle at the exit face at a haze value not less than 50% to the transparent substrate 1, and to output the light injected and forming less than the critical angle to the transparent substrate 1 at a haze value lower than 20%. The haze value refers to a measure of transmission used in the field of optics and represents a value in % obtained by dividing the dispersive transmittance, explained above with reference to FIG. 21, by the total light transmittance, and defines a concept that is totally different than the parallel transmittance. The larger the haze value, the stronger (more intense) the front scattering light (dispersive transmitted light); the smaller the haze value the stronger (more intense) the parallel transmitted light.

If the optical device 20 is able to perform in such a way that at least a portion of the incident light emitted from the light emitting layer 4 and injected into the transparent electrode 2 and forming an angle not less than the critical angle at the exit face is output to the transparent substrate 1 with a haze value not less than 50%, then at least a portion of the incident light forming not less than the critical angle at the exit face can be output to the transparent substrate 1 due to scattering effects and the like caused by the optical device 20. Also, if the optical device is able to perform in such a way that the incident light emitted from the light emitting layer 4 and injected into the transparent substrate 1 and forming an angle less than the critical angle at the exit face can be output externally with a haze value lower than 20%, then, the incident light injected at less than the critical angle at the exit face can be transmitted (without scattering) or hardly scattered and travel nearly straight for output to the transparent substrate 1 by the optical device. Therefore, when the optical device 20 is provided, the frontal brightness (normal direction and its vicinity) is improved compared with the conventional devices that exhibit equal scattering characteristics in all incident directions, in other words, those optical devices having a scattering layer of isotropic scattering characteristics or those that rely on a roughened surface.

Also, the optical device 20 may be a device to output externally the incident light emitted from the light emitting layer 4 and injected into the transparent electrode 2 at an angle not less than the critical angle at a haze value not less than 50%, and to output the incident light injected at less than the critical angle externally at a haze value lower than 20%.

If the optical device 20 is able to perform in such a way that at least a portion of the incident light emitted from the light emitting layer 4 and injected into the transparent electrode 2 and forming an angle not less than the critical angle at the exit face is output to the transparent substrate 1 with a haze value higher than 50%, then at least a portion of the light injected and forming an angle not less than the critical angle at the exit face can be output externally through the transparent substrate 1 due to scattering effects and the like caused by the optical device 20. Also, if the optical device 20 is able to perform in such a way that the incident light emitted from the light emitting layer 4 and injected into the transparent substrate 1 and forming an angle less than the critical angle at the exit face can be output to the transparent substrate 1 with a haze value lower than 20%, then, the incident light injected and forming less than the critical angle at the exit face can be transmitted (without scattering) or hardly scattered and travel nearly straight for output externally by the optical device through the transparent substrate 1.

Therefore, when the optical device 20 is provided, the frontal brightness (normal direction and its vicinity) is improved compared with the conventional devices that exhibit equal scattering characteristics in all incident directions, in other words, those optical devices having a scattering layer of isotropic scattering characteristics or those that rely on a roughened surface.

Here, it should be noted that the optical device 20 used in the present embodiment is provided between the transparent substrate 1 and the transparent electrode 2 so that it is preferable to use a thermally-resistant material. This is because, to manufacture the present EL display apparatus, lamination process proceeds in the order of, for example, transparent substrate 1, optical device 20, transparent electrode 2, hole transport layer 3, light emitting layer 4 and the metal electrode 5, and in depositing ITO to form the transparent electrode 2, the temperature of sputtering is between 150 to 230° C. so that the optical device 20 is subjected to heating.

Figure 19:
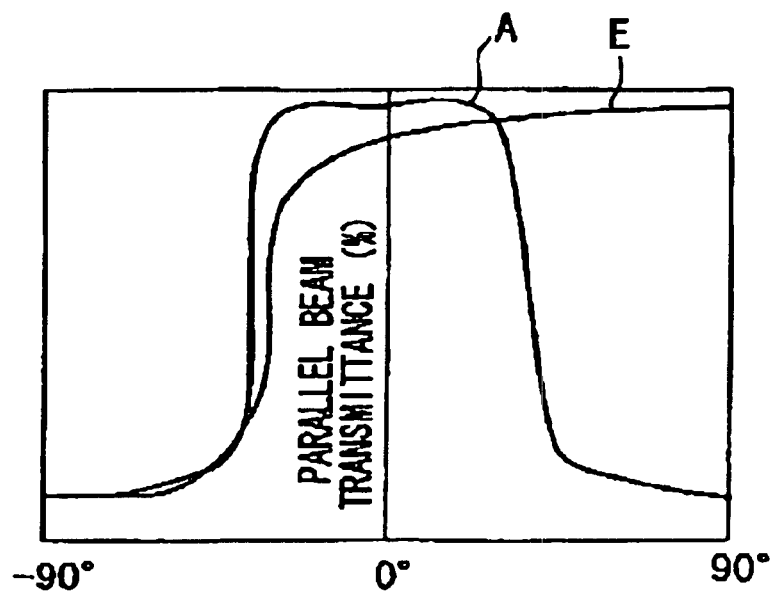
FIG. 19 is a diagram showing optical characteristics of an optical device used in an embodiment of the present invention and an optical film constituting the optical device.

The optical device 20 used in the present embodiment will be further explained in specific detail. For example, the optical device 20 exhibits optical properties such as those illustrated by curve A in FIG. 19, which shows a relationship between the rotation angle (to produce inclination angle) of the optical device 20 plotted on the abscissa and the parallel transmittance T (in %) plotted on the ordinate. The optical properties shown here were obtained by using the measuring system shown in FIG. 20 in a similar manner. It is possible to produce optical device 20 having such optical properties by laminating a plurality of optical films or a plurality of optical layers.

The front scattering films having directivity disclosed in Japanese Unexamined Patent Application, First Publication, Nos. 2000-035506, 2000-066026, 2000-180607 may be used, as necessary, from the viewpoint of basic structures. For example, as, potential optical films include the one disclosed in the above-noted Japanese Unexamined Patent Application, First Publication, No. 2000-035506, comprising a resin sheet comprising a mixture of not less than two types of light polymerizable monomers or oligomers of different refractive indexes, which is irradiated with ultraviolet light at an angle to the film so that scattering will be strong in a given wide angle direction; or, the online holographic dispersive sheet disclosed in the above-noted Japanese Unexamined Patent Application, First Publication, No. 2000-066026, is made by irradiating a photosensitive material for a hologram to produce local layered regions of differing refractive indexes.

Figure 22:
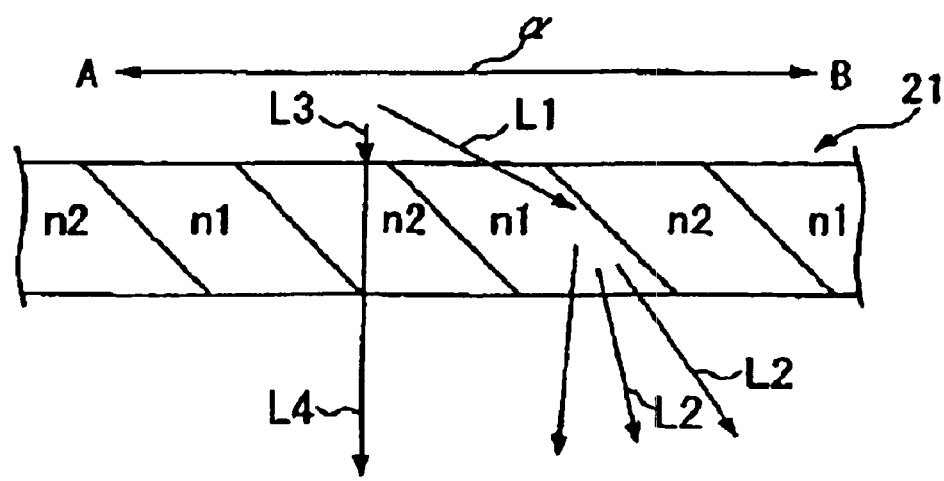
FIG. 22 is a schematic diagram of the cross sectional structure of an optical film, produced by a holographic technique, to constitute the optical device in an embodiment of the present invention.

FIG. 22 shows an example of the schematic cross sectional view of an optical film 21 made by the holographic technique mentioned above.

The optical film 21 has a cross sectional structure in which layers having a refractive index n1 alternate with layers having a refractive index n2 at a given angle of inclination. When the incident light L1 (at least a portion of incident light) is injected with a wide angle (not less than critical angle) at the exit face to the optical film 21, it is scattered and/or diffracted at the boundaries of individual layers of differing refractive indexes, and such rays are output from the opposite side (lower side in the diagram) as scattered or diffracted rays L2. When the incident light L3 is injected with a narrow angle (less than critical angle) to the optical film 21, it is weakly scattered and/or transmitted at the boundaries of individual layers of differing refractive indexes, and such rays are output from the opposite side (lower side in the diagram) as weakly scattered or transmitted rays L4.

Optical properties of optical film 21 produced by the holographic technique described above are illustrated by curve E in FIG. 19. The optical properties shown here were obtained by using the measuring system shown in FIG. 20 in a similar manner. The optical properties shown by curve E refer to the properties exhibited along the A-B direction in the optical film 21 shown in FIG. 22, where the A-B direction relates to the directivity axis α of the parallel transmittance.

Figure 23:
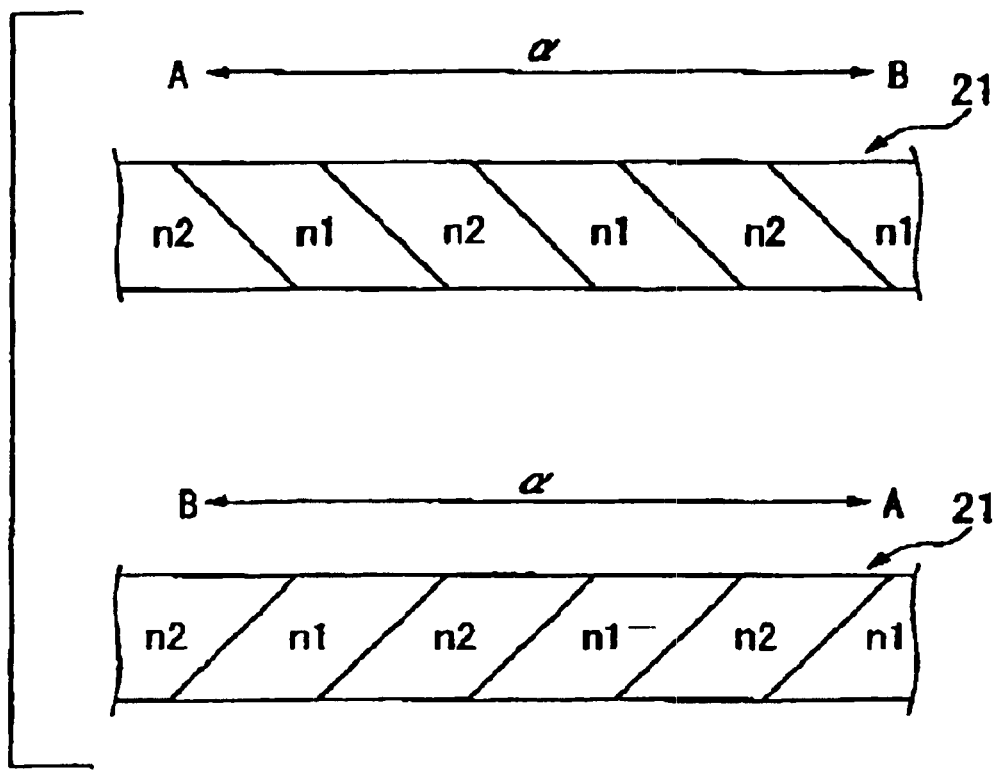
FIG. 23 is a schematic diagram showing a method for producing an optical device based on the optical film produced by the holographic technique shown in FIG. 22.

Therefore, to obtain the optical device 20 having the optical properties shown by curve E using optical film 21, a plurality of optical films 21 should be readied and laminated by shifting the directivity axis α of the parallel transmittance for each lamination, and specifically, two such optical films 21 may be laminated as shown in FIG. 23 while shifting the directivity axis α of the parallel transmittance by 180 degrees.

In the present EL display apparatus, by providing the optical device 20 having the structure described above between the transparent substrate 1 and the transparent electrode 2, at least a portion L1 of the incident light, emitted from the light emitting layer 4 and injected into the transparent electrode 2 with such an angle (wide angle, not less than the critical angle) at the exit face to cause repeated total reflection, is scattered and/or diffracted to the transparent substrate 1, and another light L3 injected with an angle (narrow angle, less than the critical angle) at the exit face into the transparent substrate 1 is weakly scattered and/or transmitted to the transparent substrate 1. Further, the optical device 20 scatters and/or diffracts at least a portion L1 of incident light injected into the transparent substrate 1 and forming an angle to cause total reflection (wide angle, not less than the critical angle) at the exit face for external output through the transparent substrate 1, while other light L3 injected and forming a low angle (less than critical angle) is weakly scattered and/or transmitted for external output through the transparent substrate 1. Therefore, frontal brightness (normal direction and its vicinity) is improved compared with those conventional optical means based on a scattering layer having isotropic scattering characteristics or those that rely on a roughened surface.

That is, in the EL display apparatus in the present embodiment, by providing the optical device 20 between the transparent substrate, serving as the support substrate to the EL element, and the optically transparent electrode 2, not only is total reflection avoided but also frontal output light (normal direction H and its vicinity) is not subjected to scattering so that light generated in the light omitting layer 4 is delivered (emitted) efficiently to external environment, thus leading to improved frontal brightness.

Therefore, according to the present EL display apparatus, because the frontal brightness is improved, display viewed from the frontal direction (normal direction and its vicinity) appears bright so that its display quality is improved.

Also, in the present EL display apparatus, by considering that the EL device is being applied to an EL display apparatus, the optical device 20 is provided between the transparent substrate 1 and the transparent electrode 2, so that clear images are obtained by eliminating blurring caused by parallax.

Also, such an EL display apparatus does not need a separate illumination device so that, compared with liquid crystal display devices that require illumination, apparatus thickness can be reduced. Also, because the light appearing on the optical device 20 side of the EL display apparatus is generated in the light emitting layer 4, images produced by the light emitting elements provide a wider angle of view compared with the images produced by liquid crystal display apparatus. Further, this EL display apparatus provides higher response speed compared with liquid crystal display apparatus.

Furthermore, in the present EL display apparatus, because the EL elements 10 comprises red-light emitting EL element 11, green-light emitting EL element 12 and blue-light emitting EL element 13, images seen in the frontal direction (normal direction H and its vicinity) are bright, to enable a full-color display. Also, in the full-color display, because the optical device 20 is provided in an optical location, color mixing caused by parallax is eliminated and clear color images are enabled.

Also, in the present EL display apparatus, because the phase plate (λ/4 plate) 41 and a polarizing plate 42 are provided successively, starting from the transparent substrate 1 side, on the surface opposite side to the optical device 20 of the transparent substrate 1, when the surrounding light is intense (bright), the surrounding light is circularly polarized when it is transmitted first time through the phase plate 41, and this light is reflected at the electrode 5 and is exited as circularly polarized light in the reverse direction, and because this circularly polarized light in the reverse direction is not transmitted through the polarizing plate 42, black display can be viewed.

Here, in the EL display apparatus of the present embodiment, the film thickness of transparent electrode 2R of red-light emitting EL element 11, the film thickness of transparent electrode 2G of green-light emitting EL element 12 and the film thickness of transparent electrode 2B of blue-light emitting EL element 13 are different from each other, but some of the transparent electrode 2 of the red-, green-, and blue-light-emitting EL elements 11, 12, and 13 may have a same film thickness, or all of the transparent electrodes 2 may have a same film thickness.

Also, in the present EL display apparatus, although the transparent electrodes 2 comprise ITO, they may comprise indium-zinc-oxide (referred to as IZO below).

Further, red-, green- and blue-light emitting EL elements 11, 12, and 13 are not required to have a transparent electrode 2 comprising the same material, so that transparent electrodes containing ITO may be used in conjunction with transparent electrodes containing IZO.

Also, as shown in FIGS. 15 and 16, in the present EL display apparatus, an example of the EL element 10 comprises transparent electrode 2, hole transport layer 3, light emitting layer 4 and metal electrode 5, but the EL element used in the present invention is not limited to this example.

Embodiment 2 of Liquid Crystal Display Apparatus

Figure 25A:
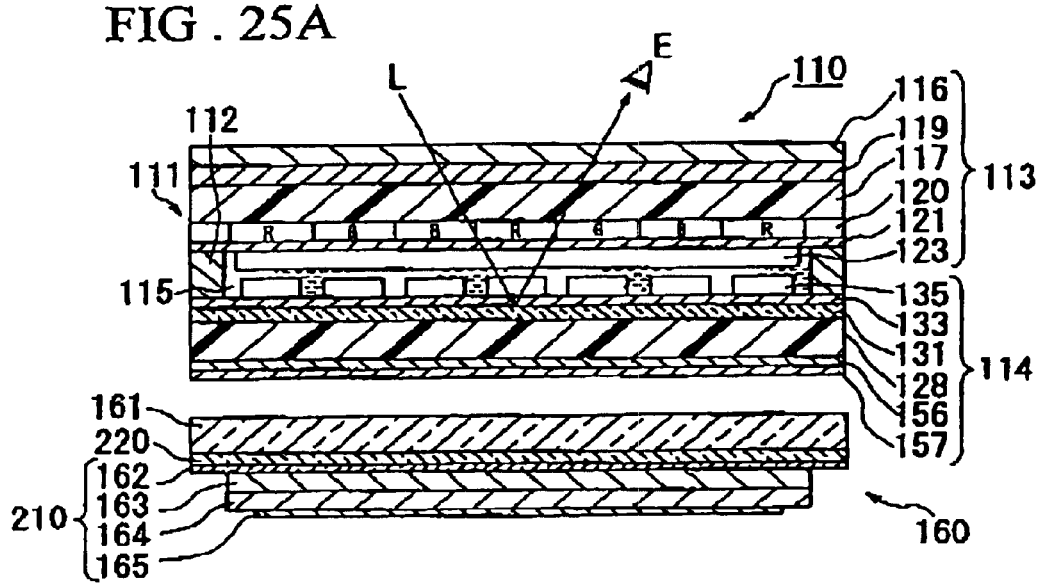
FIGS. 25A and 25B are cross sectional views of a liquid crystal apparatus provided with an EL illumination apparatus based on the EL device of the present invention when used as a reflective type and as a transmission type, respectively.
Figure 25B:
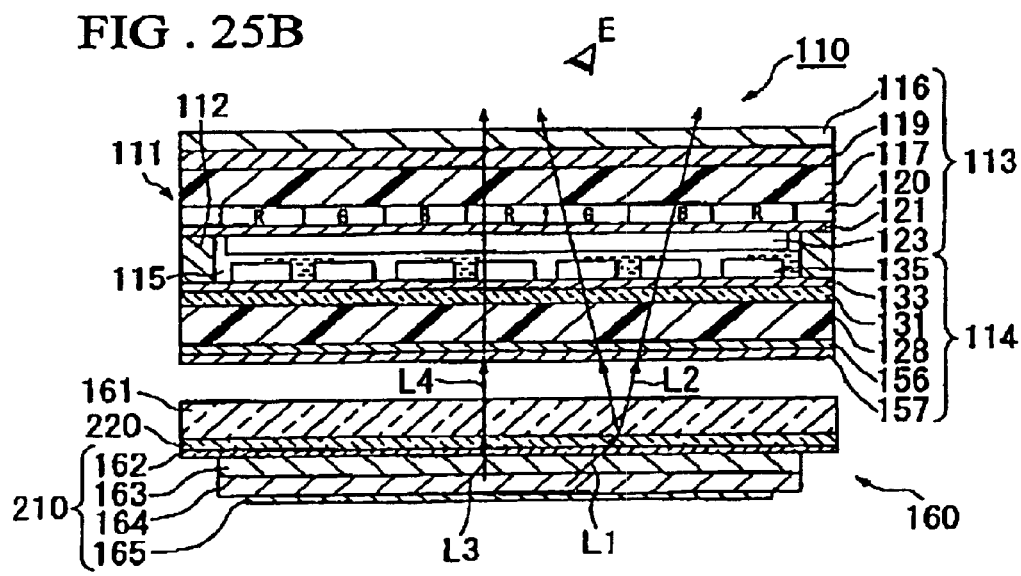
Figure 26:
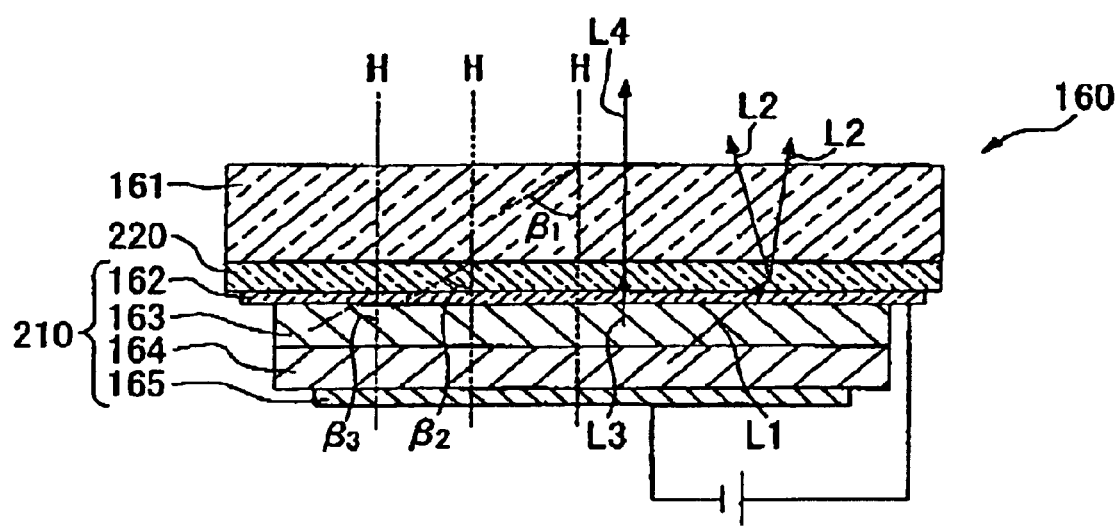
FIG. 26 is a schematic enlarged cross sectional view of the EL illumination apparatus provided in the liquid crystal apparatus shown in FIG. 25.

FIGS. 25A and 25B show an EL illumination apparatus based on the present EL device, and FIG. 25A is a cross sectional view of an application based on the use of a reflective type device; FIG. 25B is a cross sectional view of an application based on the use of a transmission type device. FIG. 26 is a schematic enlarged diagram of an EL illumination apparatus provided in the liquid display apparatus shown in FIG. 25.

By mounting ancillary elements such as liquid crystal driving IC and support structure to the liquid crystal apparatus 110, a liquid crystal display apparatus (liquid crystal apparatus) can be provided as a finished commercial product.

The liquid crystal apparatus 110 is comprised primarily by a liquid crystal panel 111 comprising a pair of substrate units 113 and 114 of a roughly rectangular shape in its plan view that are attached with respective cell gaps to oppose each other through a ring-shaped sealing member 112; a liquid crystal layer 115 clamped therebetween with the sealing member 112; a phase plate 119 and a polarizing plate 116 provided on the upper surface side of the one substrate unit 113 (upper-side in FIG. 25); and a phase plate 156 and a polarizing plate 157 provided on the lower surface side of other substrate unit 114 (lower-side in FIG. 25); and an EL illumination apparatus 160 serving as a back-lighting apparatus provided below the liquid crystal panel 111.

The substrate unit 113 of the substrate units 113 and 114 is provided on the front side (upper side) of the apparatus 110 to face the viewer, and the unit 114 is provided on the back side (lower side) opposite to the front side.

The upper side substrate unit 113 comprises: a transparent substrate 117 made of a transparent material such as glass; a phase plate 119 and a polarizing plate 116 successively formed on the front side (viewer side, upper side in FIG. 25), and a color filter layer 120, an overcoating layer 121 successively laminated on the back side (i.e., liquid crystal layer 115 side), and a plurality of striped electrode layers 123 for driving the liquid crystal formed on the liquid crystal layer 115 side within the overcoating layer 121.

Liquid crystal layer 115 comprises nematic liquid crystal molecules having a twist angle θt of 240 to 255 degrees.

Here, it should be noted that, in the actual liquid crystal apparatus, an orientation film is formed on the liquid crystal 115 side of the electrode layer 123 and on the liquid crystal layer 115 side of the striped electrode layer 135 on the lower side of the substrate, but such orientation films are omitted in FIG. 25 as in the case of other embodiments to be explained later in turn. In the cross sectional structures shown in FIG. 25 and in succeeding diagrams, the layer thicknesses are shown not to scale so as to facilitate their viewing.

The driving electrode layer 123 formed on the upper substrate side comprises a transparent electrode material such as no in the present embodiment and appears stripe shaped in its plan view, and the number of stripes is matched to the size of the display area and the pixels.

The color layer 120 is provided on the lower surface (i.e., liquid crystal layer 115 side) of the upper substrate 117, in this embodiment, by forming black masking for light blocking and RGB patterns color displaying. Also, an overcoating layer 121 is formed as the transparent planar protective film for RGB patterns. Black masking is formed by such methods as sputtering and vapor deposition to produce metal film patterning using chrome film, for example, of 100 to 120 nm thickness. The RGB patterns comprise a red-color patter (R), a green color pattern (G) and a blue color pattern (G) that are arranged in a suitable pattern, and are produced by pigment dispersion method, various printing methods, electro-deposition methods, printing methods and dyeing methods for example.

On the other hand, the lower side substrate unit 114 comprises: a transparent substrate 128 made of a transparent material such as glass, a semi-transparent reflective layer 131 and an overcoating layer 133 successively formed on the front side (upper-surface side, FIG. 25, i.e., liquid crystal side), a plurality of striped electrode layers 135 formed on the liquid crystal layer 115 side of the overcoating layer 133 and a phase plate 156 and a polarizing plate 157 successively formed on the back side (lower-side, i.e., opposite side to the liquid crystal layer 115, FIG. 25) of the substrate 128. Similarly to the electrode layer 123, necessary number of stripes are formed according to the size of the display area of the liquid crystal panel 110 and the number of pixels.

Next, the semi-transparent reflective layer 131 in the present embodiment comprises a metallic material having superior reflectivity and electrical conductivity such as Ag or Al, and is applied on the substrate 128 by sputtering method or vapor deposition method, etc. Also, the semi-transparent reflective layer 131 may be served by any semi-transparent reflective type devices used widely in a liquid crystal display apparatus, such as the semi-transparent reflective layer of suitable thickness to transmit light generated by the EL illumination apparatus 160 provided below the liquid crystal panel 111, or a structure having numerous holes provided on a portion of the reflection layer to increase light transmissivity. However, it is not essential that the semi-transparent reflective layer 131 be electrically conductive so that another electrode layer may be provided separately from the semi-transparent reflective layer 131 for powering purposes to lead to respective structures for the semi-transparent reflective layer 131 and a powering electrode.

As shown in FIGS. 25 and 26, EL illumination apparatus 160 is provided with an optical device 220 on one surface of the transparent substrate 161, and on top of the optical device 220 is provided an EL element 210 having a pair of opposing electrodes 162 and 165 with an intervening light emitting layer 164, and the light generated in the light emitting layer 164 when the EL element 210 is powered is emitted towards the transparent substrate 161. A hole transport layer 163 is provided between the transparent electrode 162 and the light emitting layer 164 for facilitating injection of holes from the transparent electrode 162. At least the electrode 162 of the pair of electrodes 162 and 165, located on the optical device 220 side is made of a transparent electrode.

The material to comprise the EL element 210 may be the same as the materials used in the layers that comprise the EL element 10, but it is preferable to use a material that can generate white light for the light emitting layer 164 in particular.

The optical device 220 is constructed so that at least a portion L1 of light emitted from the light emitting layer 164 and injected into the transparent electrode 162 and forming an angle to cause repeated total reflection at the exit face is scattered and/or diffracted for output to the transparent substrate 161, and the incident light L3 with other range of angles is weakly scattered and/or transmitted for output to the transparent substrate 161. Further, the optical device 220 is constructed so that at least a portion L1 of light emitted frog the light emitting layer 164 and injected into the transparent substrate 161 with an angle to cause repeated total reflection is scattered and/or diffracted for external output through the transparent substrate 161, and the incident light L3 with other range of angles is weakly scattered and/or transmitted for external output through the transparent substrate 161. The optical device 220 used in this example is the same as that used for the EL display apparatus described in the previous embodiment.

The EL illumination apparatus 160 is disposed so that the optical device 220 faces the liquid crystal panel 110, that is, the EL illumination apparatus 160 is placed below the liquid crystal panel 110 so as to illuminate the liquid crystal panel 110 from below the liquid crystal panel 110.

The action of the EL illumination apparatus 160 will be explained next. When a pair of electrodes 162 and 165 are powered, light emitted from the light emitting layer 164 is emitted towards the transparent electrode 162 and is injected into the transparent electrode 162, but at least a portion L1 of the incident light (into the transparent electrode 162) emitted from the light emitting layer 4 and injected into the transparent electrode 162 and forming such an angle (a wide angle, not less than critical angle) at the exit face to cause total reflection reaches the optical device 220, is scattered and/or diffracted in the optical device 220 and is emitted towards the transparent substrate 161. The scattered and/or diffracted light L2 is output into the transparent substrate 1, and output towards the liquid crystal panel 111, as illumination light from the lower side of the panel 111, as shown in FIG. 25B.

In the meantime, other light portion L3 of the light emitted from the light emitting layer 4 and injected in the transparent electrode 162 (that is, light injected into the transparent electrode 162 and forming a narrow angle, i.e., less than the critical angle at the exit face) also reaches optical device 220, and is weakly scattered and/or transmitted in the optical device 220. The weakly scattered and/or transmitted light L4 in the optical device 220 is input into the transparent substrate 161 at a less-than-critical angle, and the weakly scattered and/or diffracted light L4 is further output towards the liquid crystal panel 111 side as illumination light from the lower side of the panel 111, as shown in FIG. 25B.

The EL illumination apparatus 160 is not being powered constantly, but is energized by command from the user or sensor when little surrounding light (external lighting) is available. Therefore, when the EL illumination apparatus 160 is lighted, as shown in FIG. 25B, the light from the EL illumination apparatus 160 is transmitted through the semi-transparent reflective layer 131, so that it functions as a transmission type to provide transmission display. On the other hand, when the EL illumination apparatus 160 is not lighted (surrounding light is intense), as shown in FIG. 25A, the light L entering from the upper surface (front surface of the polarizing plate 116) of the liquid crystal panel 111 is reflected from the semi-transparent reflective layer 131, resulting that it functions as a reflection type to provide reflection display.

The EL illumination apparatus 160 provided for the liquid crystal apparatus in the present embodiment produces improved frontal brightness (normal direction H and its vicinity) because the optical device 220 is provided between the transparent substrate 161 and the transparent electrode 162.

According to the present liquid crystal apparatus, because the present EL illumination apparatus 160 having improved frontal brightness, images are clear and display quality is improved.

Here, in the present embodiment, EL element 210 provided in EL illumination apparatus 160 utilizes white-light emitting EL element, but the EL element 210 may comprise at least one EL element to include red-light emitting EL element, green-light emitting EL element, blue-light emitting EL element and white-light emitting EL clement Such an EL illumination apparatus can efficiently produce red, green, blue or white or other colors depending on EL element or a combination of EL elements chosen for use to provide an EL illumination apparatus of improved frontal brightness.

Also, the apparatus may be based on a blue-light emitting EL element for the EL element 210, and a means for wavelength converting of the blue light generated in the light emitting layer 164 is provided between the transparent electrode 162 and the optical device 220, or between the optical device 220 and the transparent substrate 161, or on a surface of the transparent substrate 161 opposite to the optical device 220. Such an EL illumination apparatus produces white light efficiently and provides improved frontal brightness.

Here, in the above embodiment, the EL illumination apparatus is provided in the semi-transparent reflective type liquid crystal apparatus, but it may also be provided in the transmission type liquid crystal apparatus, and in such a case, the structure can be the same as the liquid crystal panel 111 shown in FIG. 25, excepting the fact that the semi-transparent reflective layer 131 is not provided.

Also, in the present embodiment, the EL illumination apparatus is provided in the semi-transparent reflective type liquid crystal display apparatus of simple matrix type, but it is obvious that it may also be used in an active type matrix type semi-transparent reflective type liquid crystal display apparatus having 2-terminal switching element or 3-terminal switching element.

Also, in the liquid crystal display apparatuses provided with the present EL illumination apparatus explained above, the present invention is applied to the semi-transparent reflective type liquid crystal display apparatus having one phase plate 119 between the upper-side substrate 117 and the polarizing plate 116, but it is obvious that the present invention can be applied to a semi-transparent reflective type liquid crystal display apparatus having a plurality of phase plates.

Also, in the above embodiment, the present invention is applied to the semi-transparent reflective type liquid crystal display apparatus having a phase plate and a polarizing plate on the illumination apparatus 160 side of the lower substrate 128, but it is obvious that the present invention can be applied to a semi-transparent reflective type liquid crystal display apparatus having no phase plate and a polarizing plate on the illumination apparatus 160 side of the lower substrate 128.

Electronic Device Embodiments

Next, specific examples of electronic devices provided with the above EL display apparatus or the liquid crystal apparatus having the EL illumination apparatus will be explained.

Figure 27A:
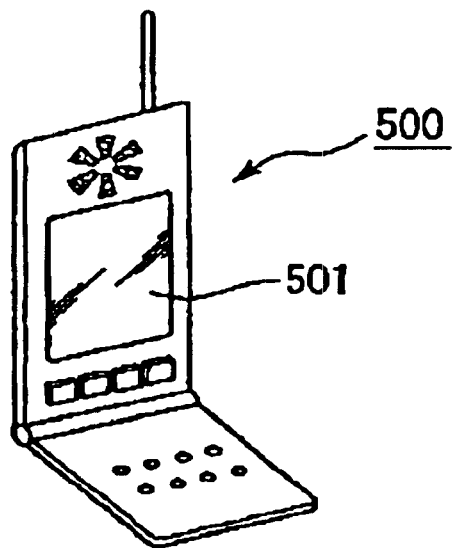
FIGS. 27A, 27B, and 27C are perspective views of an example of the electronic device having the liquid crystal apparatus based on an EL illumination apparatus or an EL display of the present invention, represented respectively by a portable phone and a portable information processing apparatus, and a wrist-watch type electronic device.

FIG. 27A shows a perspective view of an example of portable phone. In FIG. 27A, 500 indicates a phone main body, 501 to an EL display section (display means) provided with the EL display apparatus of Embodiment 1 or 2, or a liquid crystal apparatus having the EL illumination apparatus described in Embodiment 1 or 2.

Figure 27B:
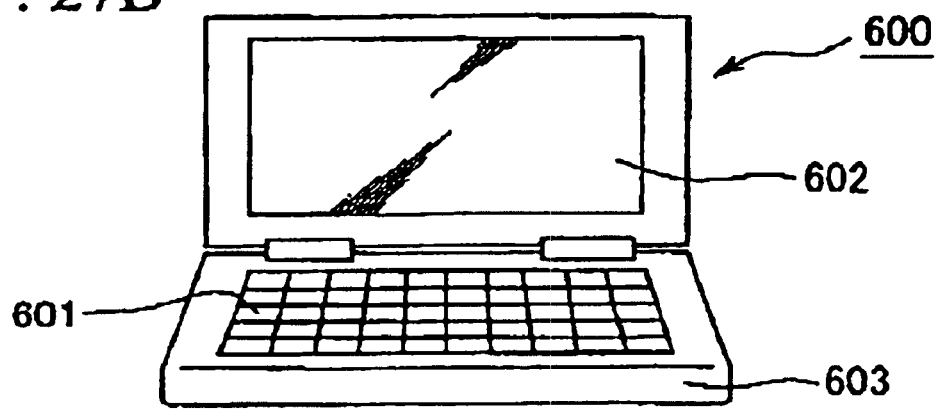

FIG. 27B shows a perspective view of an example of portable information processing apparatus such as word processor and PC In FIG. 27B, 600 indicates an information processing apparatus, 601 to an input section such as keyboard, and 602 to an EL display section (display means) provided with the EL display apparatus described in Embodiment 1 or 2 or a liquid crystal apparatus having the EL illumination apparatus described in Embodiment 1 or 2.

Figure 27C:
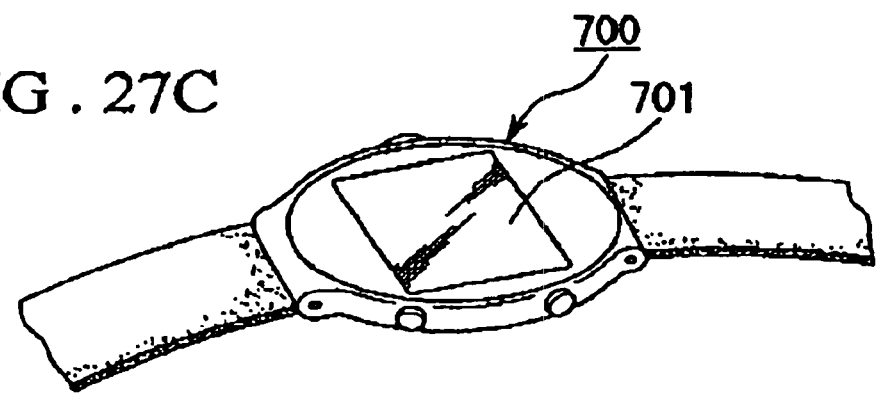

FIG. 27C shows a perspective view of an example of wrist watch type electronic device. In FIG. 27C, 700 indicates a watch main body, 701 to an EL display section (display means) provided with the EL display apparatus described in the Embodiment 1 or 2 or a liquid crystal apparatus having the EL illumination apparatus described in Embodiment 1 or 2.

The electronic devices shown in FIGS. 27A to C provide superior display quality because the display means is provided with a display section that are enabled by the EL display apparatus of Embodiment 1 or 2 or a liquid crystal apparatus provided with the present EL illumination apparatus described in Embodiment 1 or 2.

EXAMPLES

Test Example 1

Figure 28A:
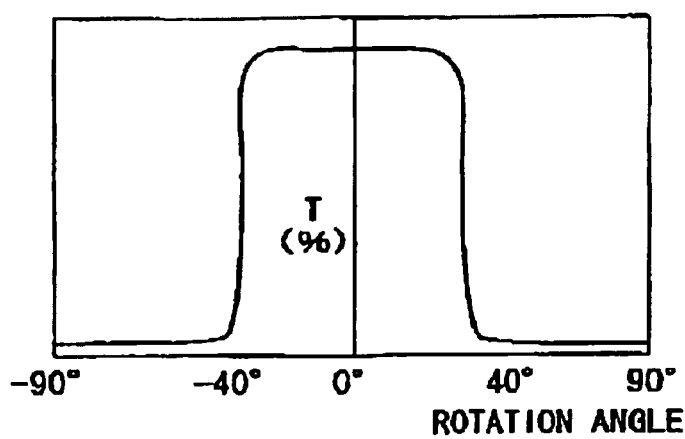
FIGS. 28A and 28B are diagrams explaining optical properties of an optical film of an example of the present invention and a direction used in measuring the optical properties.
Figure 28B:
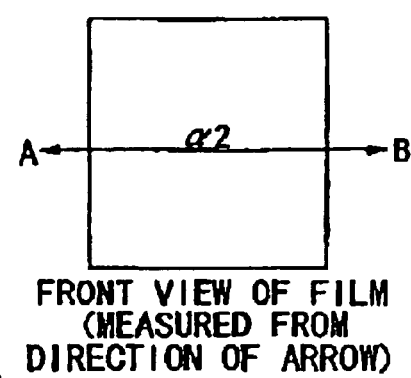

A plurality of optical films having the optical properties shown in FIG. 28A were produced. In FIG. 28A, the horizontal axis relates to rotation angles (inclination angle) of the optical film, and the vertical axis relates to the parallel light transmittance T (in %). The optical properties shown by the curve in FIG. 28A refers to the properties exhibited along the A-B direction in the optical film 21 shown in FIG. 22B, where the A-B direction relates to the directivity axis α2 of the parallel light transmittance. These optical properties were determined in a similar manner using the measurement system shown in FIG. 7.

An optical device was prepared using between one and four pieces of optical films having optical properties shown in FIG. 28A. When using a plurality of optical films, the directivity axis α2 is shifted by 45 degrees for each lamination of optical film in the optical device. The optical device so produced was provided for the EL display apparatus described in Embodiment 1, and the frontal brightness was determined. The results are shown in Table 1. In Table 1, the number 0 for the optical film means that the optical film was not used.

Figure 31:
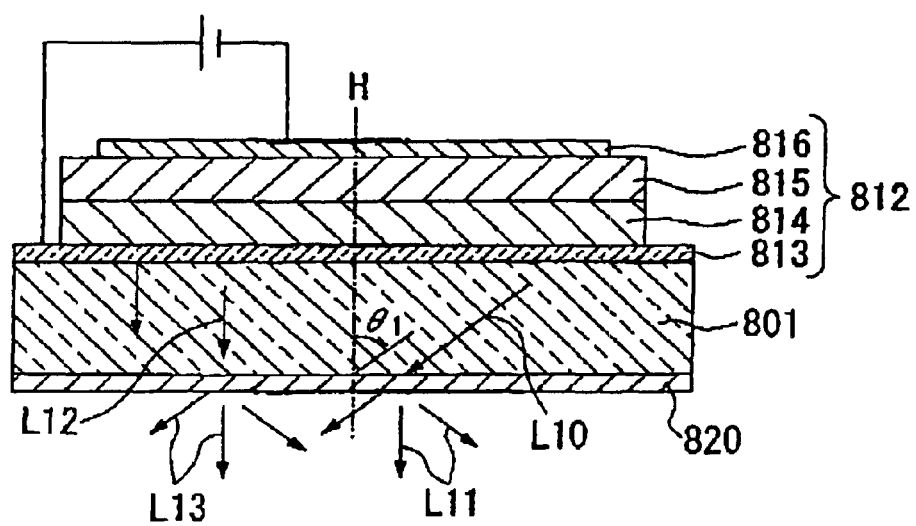
FIG. 31 is a schematic cross sectional diagram of a conventional EL display apparatus.

Also, the results of frontal brightness obtained on a comparative sample of EL display apparatus (the surface of the transparent substrate 801 is roughened instead of providing a scattering layer 820 in the conventional EL display apparatus shown in FIG. 31) are shown in Table 2.

TABLE 1

| | No. of optical films | | | | |
|---|---|---|---|---|---|
| | 0 | 1 | 2 | 3 | 4 |
| Present Frontal brightness (cd/m$^2$) | 50.1 | 58.1 | 68.9 | 79.2 | 86.9 |

TABLE 2

| Comparative Frontal brightness (cd/m$^2$) | 53.4 |
|---|---|

From the results shown in Tables 1 and 2, the EL display apparatus using the present optical films as the optical device produces higher frontal brightness and clearer images compared with the conventional EL display apparatus whose transparent substrate surface has been roughened. Also, it can be seen in the EL display apparatus provided with laminated optical films, whose directivity axes are shifted successively, that frontal brightness increases as the number of optical films is increased to result in clear images.

Test Example 2

Figure 30A:
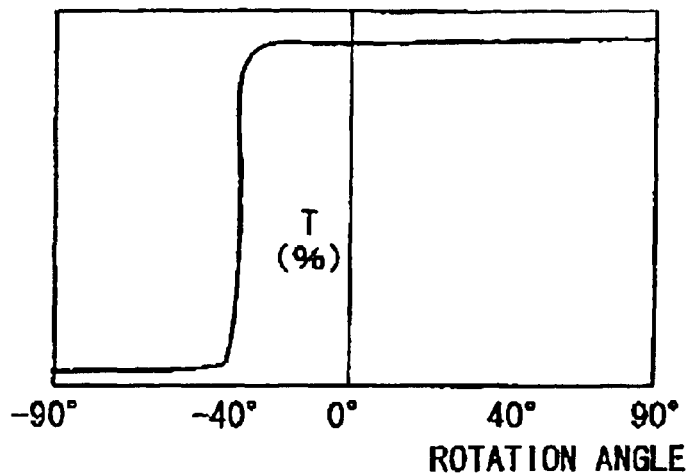
FIGS. 30A and 30B are diagrams, respectively, showing the optical properties of the optical film of an example of the present invention and a direction used in measuring the optical properties.
Figure 30B:
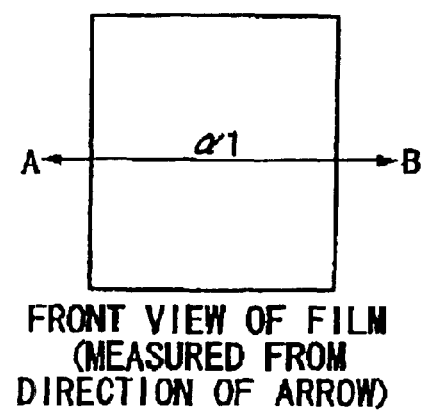

A plurality of optical films having the optical properties shown in FIG. 30A were produced. In FIG. 30A, the horizontal axis relates to rotation angles (inclination angle) of the optical Elm, and the vertical axis relates to the parallel light transmittance T (in %). The optical properties shown by the curve in FIG. 30A refers to the properties exhibited along the A-B direction in the optical film 21 shown in FIG. 30B, where the A-B direction relates to the directivity axis α1 of the parallel transmittance. These optical properties were determined in a similar manner using the measurement system shown in FIG. 7.

Figure 29:
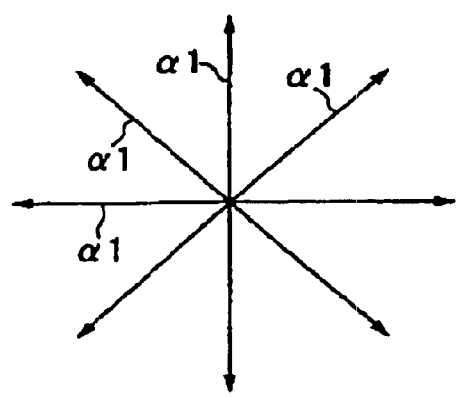
FIG. 29 is a diagram to explain a lamination method of the optical film in an example of the present invention which shows the positional relation of the axes of directivity seen from the top of the optical device obtained by laminating the optical films.

An optical device was prepared using between one and eight pieces of optical films having optical properties shown in FIG. 30A. When using a plurality of optical films, the directivity axis α1 is shifted by 45 degrees for each lamination of optical film in the optical device, as shown in FIG. 29. The optical device so produced was provided for the EL display apparatus in Embodiment 1, and the frontal brightness was determined. The results are shown in Tables 3 and 4. In Table 3, the number 0 for the optical film means that the optical film was not used.

Also, the results of frontal brightness obtained on a comparative sample of EL display apparatus (the surface of the transparent substrate 801 is roughened instead of providing a scattering layer 820 in the conventional EL display apparatus shown in FIG. 31) are shown in Table 5.

TABLE 3

| | No. of optical films | | | | |
|---|---|---|---|---|---|
| | 0 | 1 | 2 | 3 | 4 |
| Present Frontal brightness (cd/m$^2$) | 50.1 | 53.2 | 57.9 | 61.5 | 65.8 |

TABLE 4

| | No. of optical films | | | |
|---|---|---|---|---|
| | 5 | 6 | 7 | 8 |
| Present Frontal brightness (cd/m$^2$) | 68.9 | 73.2 | 77.5 | 81.5 |

TABLE 5

| Comparative Frontal brightness (cd/m$^2$) | 53.4 |
|---|---|

From the results shown in Tables 3 to 5, the EL display apparatus using the present optical films as the optical device produces higher frontal brightness and clearer images compared with the conventional EL display apparatus whose transparent substrate surface has been roughened. Also, it can be seen in the EL display apparatus provided with laminated optical films, whose directivity axes are shifted successively, that frontal brightness increases as the number of optical films is increased to result in clear images.

Test Example 3

Various optical devices were produced using a plurality of optical films having different optical properties produced by the holographic technique. The haze values (in %) of the various optical devices were determined for incidence angles not less than the critical angle and for incidence angles less than the critical angle (c.a.). The haze values were obtained by dividing the dispersive light transmittance by the total light transmittance obtained from the front scattering light (dispersive transmitted light) and the optical power of the incident light L determined using the measuring system shown in FIG. 7.

The optical device so produced was provided for the EL display apparatus in Embodiment 1, and its frontal brightness was determined. The results are shown in Tables 6, 7 and 8. Table 8 relates to the results obtained from the EL display apparatus that does not have the present optical device.

Also, the results of frontal brightness obtained on a comparative sample of EL display apparatus (the surface of the transparent substrate 801 is roughened instead of providing a scattering layer 820 in the conventional EL display apparatus shown in FIG. 31 ) are shown in Table 9.

TABLE 6

| Haze value for not less than c.a.(%) | 30 | 40 | 5 | 60 | 70 | 80 |
|---|---|---|---|---|---|---|
| Haze value for less than c.a.(%) | 5 | 5 | 5 | 5 | 5 | 5 |
| P. Frontal brightness (cd/m$^2$) | 51.6 | 52.3 | 55.4 | 60.3 | 62.3 | 63.9 |

TABLE 7

| Haze value for not less than c.a.(%) | 70 | 70 | 70 | 70 | 70 | 70 |
|---|---|---|---|---|---|---|
| Haze value for less than c.a.(%) | 5 | 10 | 15 | 20 | 25 | 30 |
| P. Frontal brightness (cd/m$^2$) | 62.3 | 62.1 | 61.4 | 60.5 | 56.9 | 53.1 |

TABLE 8

| | No. of optical films 0 |
|---|---|
| Present Frontal brightness (cd/m$^2$) | 50.1 |

TABLE 9

| Comparison Frontal brightness (cd/m$^2$) | 53.4 |
|---|---|

From the results shown in Tables 6 to 9, the EL display apparatus having an optical device having a haze value higher than 50% for not less than the critical angle light produces higher frontal brightness compared with the EL display apparatus not having the present optical device (Table 8) or the conventional EL display apparatus (Table 9) whose transparent substrate surface has been roughened. Also, it can be seen in the EL display apparatus provided with the optical device having a haze value higher than 60% for not-less-than-the-critical angle light to result in higher frontal brightness by at least 20%.

Also, the EL display apparatus having the optical device having a haze value less than 20% for less than the critical angle light produces higher frontal brightness compared with the EL display apparatus not having the present optical device (Table 8) or the conventional EL display apparatus (Table 9) whose transparent substrate surface has been roughened.

Test Example 4

Similar to Test Example 1, an optical device was produced using one to four optical films having the optical properties shown in FIG. 28A, and this optical device was used in the EL display apparatus in Embodiment 2, between the transparent substrate and the transparent electrode, and the frontal brightness was determined. The results are shown in Table 10. In Table 10, the number 0 for the optical film means that the optical film was not used.

Also, the results of frontal brightness obtained on a comparative sample of EL display apparatus, wherein the surface of the transparent substrate 801 is roughened instead of providing a scattering layer 820 in the conventional EL display apparatus shown in FIG. 31, are shown in Table 11.

TABLE 10

| | No. of optical films | | | | |
|---|---|---|---|---|---|
| | 0 | 1 | 2 | 3 | 4 |
| Present Frontal brightness (cd/m$^2$) | 50.1 | 58.1 | 68.9 | 79.2 | 86.9 |

TABLE 11

| Comparative Frontal brightness (cd/m$^2$) | 53.4 |
|---|---|

From the results shown in Tables 10 and 11, the EL display apparatus using the present optical films as the optical device produces higher frontal brightness and clearer images compared with the conventional EL display apparatus whose transparent substrate surface has been roughened. Also, it can be seen in the EL display apparatus provided with laminated optical films, whose directivity axes are shifted successively, that frontal brightness increases as the number of optical films is increased to result in clear images.

Test Example 5

Similar to Test Example 2, an optical device was produced using one to eight optical films having the optical properties shown in FIG. 30A, and this optical device was used in the EL display apparatus in Embodiment 2, between the transparent substrate and the transparent electrode, and the frontal brightness of the EL display apparatus was determined. The results are shown in Table 12 and 13. In Table 12, the number 0 for the optical film means that the optical film was not used.

Also, the results of frontal brightness obtained on a comparative EL display apparatus, wherein the surface of the transparent substrate 801 is roughened instead of providing a scattering layer 820 in the conventional EL display apparatus shown in FIG. 31, are shown in Table 14.

TABLE 12

| | No. of optical films | | | | |
|---|---|---|---|---|---|
| | 0 | 1 | 2 | 3 | 4 |
| Present Frontal brightness (cd/m²) | 50.1 | 53.2 | 57.9 | 61.5 | 65.8 |

TABLE 13

| | No. of optical films | | | |
|---|---|---|---|---|
| | 5 | 6 | 7 | 8 |
| Present Frontal brightness (cd/m²) | 68.9 | 73.2 | 77.5 | 81.5 |

TABLE 14

| Comparative Frontal brightness (cd/m²) | 53.4 |
|---|---|

From the results shown in Tables 12 to 14, the EL display apparatus using the present optical films as the optical device produces higher frontal brightness and clearer images compared with the conventional EL display apparatus whose transparent substrate surface has been roughened. Also, it can be seen in the EL display apparatus provided with laminated optical films, whose directivity axes are shifted successively, that frontal brightness increases as the number of optical films is increased to result in clear images.

Test Example 6

Various optical devices were produced using a plurality of optical films having different optical properties produced by the holographic technique. The haze values (in %) of the various optical devices were determined for incidence angles not less than the critical value and for incidence angles less than the critical angle. The haze values were obtained by dividing the dispersive light transmittance by the total light transmittance obtained from the front scattering light (dispersive transmitted light) and the optical power of the incident light L determined using the measuring system shown in FIG. 7.

The optical device so produced was provided for the EL display apparatus in Embodiment 2, and its frontal brightness was determined. The results are shown in Tables 15, 16, and 17.

Table 17 relates to the results obtained from the EL display apparatus that does not have the present optical device according to Embodiment 2.

Also, the results of frontal brightness obtained on a Comparative sample of EL display apparatus, wherein the surface of the transparent substrate 801 is roughened instead of providing a scattering layer 820 in the conventional EL display apparatus shown in FIG. 31 are shown in Table 18.

TABLE 15

| Haze value for not less than c.a.(%) | 30 | 40 | 50 | 60 | 70 | 80 |
|---|---|---|---|---|---|---|
| Haze value for less than c.a.(%) | 5 | 5 | 5 | 5 | 5 | 5 |
| P. Frontal brightness (cd/m²) | 51.6 | 52.3 | 55.4 | 60.3 | 62.3 | 63.9 |

TABLE 16

| Haze value for not less than c.a.(%) | 70 | 70 | 70 | 70 | 70 | 70 |
|---|---|---|---|---|---|---|
| Haze value for less than c.a.(%) | 5 | 10 | 15 | 20 | 25 | 30 |
| P. Frontal brightness (cd/m²) | 62.3 | 62.1 | 61.4 | 60.5 | 56.9 | 53.1 |

TABLE 17

| | No. of optical films |
|---|---|
| | 0 |
| Frontal brightness (cd/m²) | 50.1 |

TABLE 18

| Comparison Frontal brightness (cd/m²) | 53.4 |
|---|---|

From the results shown in Tables 15 to 18, the EL display apparatus having an optical device having a haze value higher than 50% for not less than critical angle light produces higher frontal brightness compared with the EL display apparatus not having the present optical device (Table 17) or the conventional EL display apparatus (Table 18) whose transparent substrate surface has been roughened. Also, it can be seen in the EL display apparatus provided with the optical device having a haze value higher than 60% for not less than the critical angle light to result in higher frontal brightness by at least 20%.

Also, the EL display apparatus having the optical element having a haze value lower than 20% for less than the critical angle light produces higher frontal brightness compared with the EL display apparatus not having the present optical device (Table 17) or the conventional EL display apparatus (Table 18) whose transparent substrate surface has been roughened.

What is claimed is:

1. An electroluminescent device comprising a plurality of electroluminescence elements, each element comprising a pair of electrodes opposing each other across at least one organic layer including a light emitting layer, arranged in a matrix pattern on one surface of an optically transparent substrate so as to power electroluminescence elements individually, at least one electrode of the pair of electrodes located on the optically transparent substrate side comprising an optically transparent electrode such that a light emitted from a light emitting layer energized is emitted towards the optically transparent substrate; and an optical device provided on another surface of the optically transparent substrate so as to scatter, diffract, or scatter and diffract, for external output, at least a portion of incident light emitted from the light emitting layer and injected into the optically transparent substrate and forming an angle to cause repeated total reflection at an exit face, while weakly scattering, transmitting, or scattering and transmitting other incident light for external outputs, wherein said optical device comprises a plurality of optical films laminated, with directivity axes thereof for a parallel light transmittance shifted relative to each other.

2. An electroluminescent device according to claim 1, wherein the refractive index m1 of the optically transparent substrate and the refractive index m2 of the optical device are equal to each other or substantially equal to each other.

3. An electroluminescent device according to claim 1, wherein the refractive index m1 of the optically transparent substrate and the refractive index m2 of the optical device are related such that m1£m2.

4. An electroluminescent display apparatus having an electroluminescent device according to claim 1.

5. An electroluminescent display apparatus having an electroluminescent device according to claim 1 provided with a red-light-emitting element, a green-light-emitting element and a blue-light-emitting element.

6. An electroluminescent display apparatus having an electroluminescent device according to claim 1 provided with a phase plate and a polarizing plate, successively provided starting from an optical device side, on a surface of the optical device opposite to an optically transparent substrate.

7. An electroluminescent display apparatus having an electroluminescent device according to claim 1 whose electroluminescent element includes a red-light-emitting element, a green-light-emitting element and a blue-light-emitting element, and has a phase plate and a polarizing plate, successively provided starting from an optical device side, on a surface of the optical device opposite to an optically transparent substrate.

8. An electronic device comprising a display means based on an electroluminescent display apparatus provided with an electroluminescent device according to claim 1.

9. An electroluminescent device according to claim 1, wherein the incident light at least a portion of which is scattered, diffracted, or scattered and diffracted includes incident light emitted from the light emitting layer and injected into the optically transparent substrate and forming an angle not less than a critical angle at the exit face for external output, and the other incident light which is weakly scattered, transmitted, or scattered and transmitted includes incident light injected into the optically transparent substrate and forming an angle less than the critical angle at the exit face for external output.

10. An electroluminescent device according to claim 1, wherein said plurality of optical films each has a cross sectional structure in which layers having a refractive index alternate with layers of another refractive index inclined at a given angle.

11. An electroluminescent device according to claim 1, wherein said optical device comprises two optical films laminated, with directivity axes thereof for a parallel light transmittance shifted by 180 degrees relative to each other.

12. An electroluminescent device according to claim 1, wherein said plurality of optical films are a hologram.

13. An electroluminescent device comprising an electroluminescence element comprising a pair of electrodes opposing each other across at least one organic layer including a light emitting layer, arranged on one surface of an optically transparent substrate so as to power the electroluminescence element, at least an electrode of the pair of electrodes that is located on the optically transparent substrate side comprising an optically transparent electrode such that a light emitted from a light emitting layer energized is emitted towards the optically transparent substrate; and an optical device provided on another surface of the optically transparent substrate so that the optical device scatters, diffracts or scatters and diffracts, for external output, at least a portion of the incident light emitted from the light emitting layer and injected into the optically transparent substrate and forming an angle to cause repeated total reflection at an exit face, while weakly scattering, transmitting, or scattering and transmitting other incident light for external output, wherein said optical device comprises a plurality of optical films laminated, with directivity axes thereof for a parallel light transmittance shifted relative to each other.

14. An electroluminescent illumination apparatus having an electroluminescent device according to claim 13.

15. An electroluminescent illumination apparatus comprising an electroluminescent device according to claim 13, whose electroluminescent element comprises not less than one of a red-light-emitting element, a green-light-emitting element, a blue-light-emitting element and a white-light-emitting element.

16. An electroluminescent illumination apparatus comprising an electroluminescent device according to claim 13 whose electroluminescent element is a blue-light-emitting element, and a means for wavelength converting of a blue light emitted from the light emitting layer is provided between the electroluminescent element and an optically transparent substrate, or between the optically transparent substrate and an optical device, or on a surface of the optical device.

17. A liquid crystal apparatus comprising a liquid crystal panel having a pair of substrates and a liquid crystal layer held between the pair of substrates, and an electroluminescent illumination apparatus having an electroluminescent device according to claim 13 on a side opposite to the liquid crystal layer of one substrate of the liquid crystal panel.

18. A liquid crystal apparatus comprising a liquid crystal panel having a pair of substrates and a liquid crystal layer held between the pair of substrates, and an electroluminescent illumination apparatus provided with an electroluminescent device according to claim 13 on a side opposite to the liquid crystal layer of one substrate of the liquid crystal panel, wherein a semi-transparent reflective layer is provided on a liquid crystal layer side of the one substrate.

19. An electronic device comprising a display means based on a liquid crystal apparatus comprising a liquid crystal panel having a pair of substrates and a liquid crystal layer held between the pair of substrates, and an electroluminescent illumination apparatus having an electroluminescent device according to claim 13 provided on a side opposite to the liquid crystal layer of the one substrate of the liquid crystal panel.

20. An electroluminescent device comprising a plurality of electroluminescent elements, each element comprising a pair of electrodes opposing each other across at least one organic layer including a light emitting layer, arranged in a matrix on one surface of an optically transparent substrate so as to power for electroluminescent elements individually, at least an electrode of the pair of electrodes that is located on the optically transparent substrate side comprising an optically transparent electrode such that a light emitted from a light emitting layer energized is emitted towards the optically transparent substrate; and an optical device provided between the optically transparent substrate and the optically transparent electrode so as to scatter, diffract, or scatter and diffract, at least a portion of an incident light emitted from the light emitting layer and injected into the optically transparent electrode and forming a range of angles at the exit face to cause repeated total reflection for output to the optically transparent substrate, while weakly scattering, transmitting, or scattering and transmitting an incident light emitted from the light emitting layer and injected into the optically transparent electrode and forming another range of angles at the exit face for output to the optically transparent substrate, said optical device further scattering, diffracting, or scattering and diffracting at least a portion of an incident light injected into the optically transparent substrate and forming a range of angles to cause repeated total reflection at the exit face for external output through the optically transparent substrate, while weakly scattering, transmitting, or scattering and transmitting an incident light injected into the optically transparent substrate and forming another range of angles at an exit face for external output through the optically transparent substrate.

21. An electroluminescent device according to claim 20, wherein the refractive index m1 of the optically transparent substrate and the refractive index m2 of the optical device are equal to each other or substantially equal to each other.

22. An electroluminescent device according to claim 20, wherein the refractive index m1 of the optically transparent substrate and the refractive index m2 of the optical device are related such that $m1_3m2$.

23. An electroluminescent display apparatus comprising an electroluminescent device according to claim 20.

24. An electroluminescent display apparatus comprising an electroluminescent device according to claim 20, wherein the electroluminescent elements comprise a red-light-emitting element, a green-light-emitting element and a blue-light-emitting element.

25. An electroluminescent display apparatus comprising an electroluminescent device according to claim 20 having a phase plate and a polarizing plate, successively provided starting from an optically transparent substrate side, on a surface of the optically transparent substrate opposite to the optical device.

26. An electroluminescent display apparatus comprising an electroluminescent device according to claim 20, wherein the electroluminescent elements include a red-light-emitting element, a green-light-emitting element and a blue-light-emitting element, and a phase plate and a polarizing plate are successively provided starting from an optically transparent substrate side, on a surface of the optically transparent substrate opposite to the optical device.

27. An electronic device comprising, as a display means, an electroluminescent display apparatus having an electroluminescent device according to claim 20.

28. An electronic device comprising, as a display means, a liquid crystal apparatus comprising a liquid crystal panel having a pair of substrates and a liquid crystal layer held between the pair of substrates, and an electroluminescent illumination apparatus, having an electroluminescent device according to claim 20, provided on a side opposite to the liquid crystal layer of one substrate of the liquid crystal panel.

29. An electroluminescent device according to claim 20, wherein said optical device comprises a plurality of optical films laminated, with directivity axes thereof for a parallel light transmittance shifted relative to each other.

30. An electroluminescent device according to claim 20, wherein the incident light injected into the optically transparent electrode, at least a portion of which is scattered, diffracted, or scattered and diffracted, includes incident light injected into the optically transparent electrode and forming an angle not less than a critical angle at the exit face for output to the optically transparent substrate while the incident light which is weakly scattered, transmitted, or scattered and transmitted includes incident light injected into the optically transparent electrode and forming an angle less than the critical angle at the exit face for output to the optically transparent substrate.

31. An electroluminescent device according to claim 20, wherein said plurality of optical films each has a cross sectional structure in which layers having a refractive index alternate with layers of another refractive index inclined at a given angle.

32. An electroluminescent device according to claim 20, wherein said optical device comprises two optical films laminated, with directivity axes thereof for a parallel light transmittance shifted by 180 degrees relative to each other.

33. An electroluminescent device according to claim 20, wherein said plurality of optical films are a hologram.

34. An electroluminescent device comprising an electroluminescent element comprising a pair of electrodes opposing each other across at least one organic layer including a light emitting layer, arranged on one surface of an optically transparent substrate so as to power the electroluminescent element, at least an electrode of the pair of electrodes that is located on the optically transparent substrate side comprising an optically transparent electrode such that a light emitted from a light emitting layer energized is emitted towards the optically transparent substrate; and an optical device provided between the optically transparent substrate and the optically transparent electrode so as to scatter, diffract, or scatter and diffract, at least a portion of an incident light emitted from the light emitting layer and injected into the optically transparent electrode and forming a range of angles at the exit face to cause repeated total reflection for output to the optically transparent substrate, while weakly scattering, transmitting, or scattering and transmitting, an incident light emitted from the light emitting layer and injected into the optically transparent electrode and forming another range of angles for output to the optically transparent substrate, said optical device further scattering, diffracting, or scattering and diffracting at least a portion of an incident light injected into the optically transparent substrate and forming a range of angles to cause repeated total reflection at the exit face for external output through the optically transparent substrate while weakly scattering, transmitting, or scattering and transmitting, an incident light injected into the optically transparent substrate and forming another range of angles at an exit face for external output through the optically transparent substrate.

35. An electroluminescent illumination apparatus comprising an electroluminescent device according to claim 34.

36. An electroluminescent illumination apparatus comprising an electroluminescent device according to claim 34, wherein electroluminescent elements comprise not less than one of a red-light-emitting element, a green-light-emitting element, a blue-light-emitting element and a white-light-emitting element.

37. An electroluminescent illumination apparatus comprising an electroluminescent device according to claim 34, wherein the electroluminescent elements comprise a blue-light-emitting element, and a means for wavelength converting a blue light emitted from the light emitting layer is provided between the optically transparent electrode and the optical device or between the optical device and an optically transparent substrate, or on a side of the optically transparent substrate opposite to the optical device.

38. A liquid crystal apparatus comprising a liquid crystal panel having a pair of substrates and a liquid crystal layer held between the pair of substrates, and an electroluminescent illumination apparatus, provided with an electroluminescent device according to claim 34, on a side opposite to the liquid crystal layer of one substrate of the liquid crystal panel.

39. A liquid crystal apparatus comprising a liquid crystal panel having a pair of substrates and a liquid crystal layer held between the pair of substrates, and an electroluminescent illumination apparatus, provided with an electroluminescent device according to claim 34, on a side opposite to the liquid crystal layer of one substrate of the liquid crystal panel, wherein a semi-transparent reflective layer is provided on a liquid crystal layer side of the one substrate.

* * * * *